(12) United States Patent
Kanamori

(10) Patent No.: US 11,017,225 B2
(45) Date of Patent: May 25, 2021

(54) IMAGE SYNTHESIZING APPARATUS, IRIS AUTHENTICATION SYSTEM, IMAGE SYNTHESIZING METHOD, AND IRIS AUTHENTICATING METHOD

(71) Applicant: Panasonic Intellectual Property Management Co., Ltd., Osaka (JP)

(72) Inventor: Katsuhiro Kanamori, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 167 days.

(21) Appl. No.: 16/275,855

(22) Filed: Feb. 14, 2019

(65) Prior Publication Data
US 2019/0266398 A1    Aug. 29, 2019

(30) Foreign Application Priority Data
Feb. 28, 2018    (JP) .............................. JP2018-035941

(51) Int. Cl.
G06K 9/00    (2006.01)
G02F 1/01    (2006.01)
(Continued)

(52) U.S. Cl.
CPC ....... G06K 9/00604 (2013.01); G02F 1/0105 (2013.01); G06F 21/32 (2013.01); G06T 3/4038 (2013.01)

(58) Field of Classification Search
CPC .......... G06K 9/00604; G06K 9/00617; G06K 9/2036; G06K 9/00597; G06K 9/6289;
(Continued)

(56) References Cited
U.S. PATENT DOCUMENTS
5,291,560 A    3/1994 Daugman
2003/0152252 A1    8/2003 Kondo et al.
(Continued)

FOREIGN PATENT DOCUMENTS
JP    3307936    7/2002
JP    2004-30564    1/2004
(Continued)

OTHER PUBLICATIONS

Yuichi Ichihashi, Shuichi Kawabata, Kazuo Ishikawa, and Toyohiko Hatada, "Polarization Characteristics in an Eyeball Imaging System and an Analysis of the Polarization Characteristics", Journal of Japanese Ophthalmological Society, 1989, vol. 10, No. 1, p. 87 to 92, with English Abstract.
(Continued)

*Primary Examiner* — Alex Kok S Liew
(74) *Attorney, Agent, or Firm* — Wenderoth, Lind & Ponack, L.L.P.

(57) ABSTRACT

An image synthesizing apparatus includes an illuminating device that outputs linearly polarized light having a first polarization direction and linearly polarized light having a second polarization direction, a camera that captures an image in a third polarization direction including a plurality of pixels and an image in a fourth polarization direction including a plurality of pixels, and a control circuit that synthesizes, on a pixel-by-pixel basis, the image in the third polarization direction and the image in the fourth polarization direction into an authentication image for iris authentication. The first, the second, the third and the fourth polarization directions are different from one another. The camera acquires the image in the third polarization direction using the linearly polarized light in the first polarization direction and acquires the image in the fourth polarization
(Continued)

direction using the linearly polarized light in the second polarization direction.

7 Claims, 37 Drawing Sheets

(51) Int. Cl.
  *G06T 3/40* (2006.01)
  *G06F 21/32* (2013.01)
(58) Field of Classification Search
  CPC ............... G06K 9/2027; G06K 9/0061; G06K 9/00899; G06K 9/2054; G06K 9/52; G06F 21/32; G06F 21/83; G06F 2221/2117; G06F 1/1605; G06F 3/011; G06F 3/013; G06F 3/015; G06F 3/0346; G02B 27/286; G02B 2027/0116; G02B 2027/0178; G02B 2027/0187; G02B 27/0093; G02B 27/0176; G02B 3/005; G02B 5/3025; G02B 5/3083
  See application file for complete search history.

(56) References Cited

U.S. PATENT DOCUMENTS

| | | | |
|---|---|---|---|
| 2006/0050933 A1 | 3/2006 | Adam et al. | |
| 2014/0198957 A1* | 7/2014 | Aoki | G06K 9/00046 382/115 |
| 2017/0316266 A1* | 11/2017 | Kawabata | G06K 9/00617 |

FOREIGN PATENT DOCUMENTS

| | | |
|---|---|---|
| JP | 3586456 | 11/2004 |
| JP | 2008-504606 | 2/2008 |
| WO | 94/09446 | 4/1994 |
| WO | 2006/023046 | 3/2006 |

OTHER PUBLICATIONS

Tomohiro Yamazaki et al., "Four-Directional Pixel-Wise Polarization CMOS Image Sensor Using Air-Gap Wire Grid on 2.5-μm Back-Illuminated Pixels", IEDM, Dec. 2016.

* cited by examiner

RIGHT OPPOSED NAKED EYE

EYEGLASS EYE

OBLIQUE NAKED EYE

IMAGE L0C90

IMAGE L0C90 IMAGE

LINEARLY POLARIZED ILLUMINATION L90   CAMERA POLARIZING FILTER C0

IMAGE L90C0

LINEARLY POLARIZED ILLUMINATION L135   CAMERA POLARIZING FILTER C45

IMAGE L135C45

LUMINANCE IN SPECULAR REFLECTION ON CORNEA
(POLARIZED STATE IS MAINTAINED)

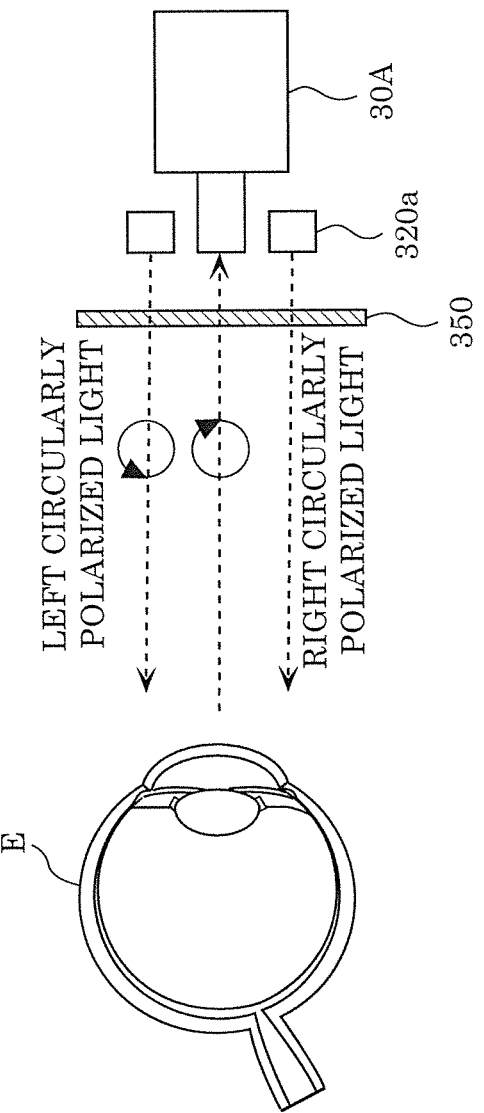

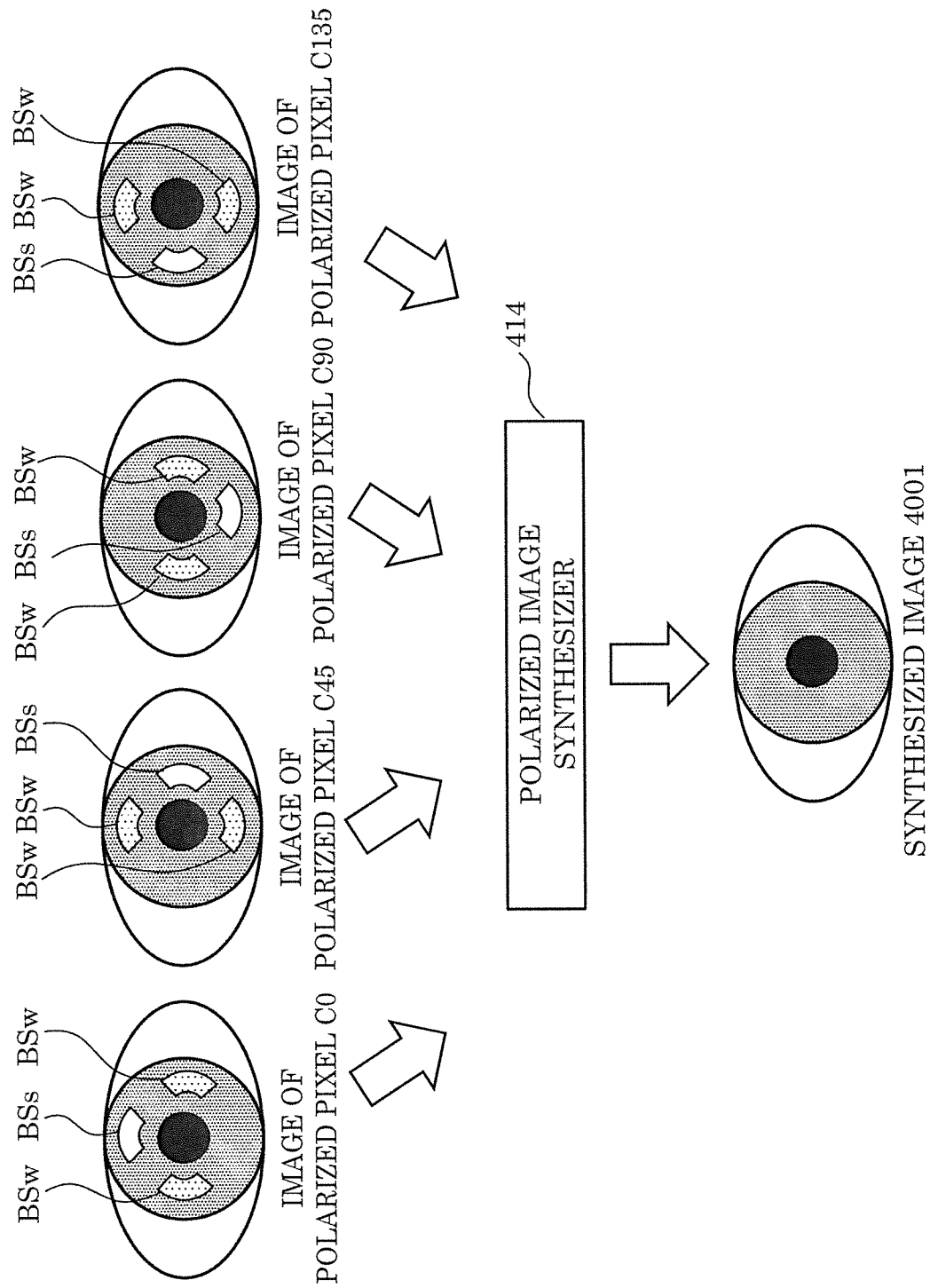

US 11,017,225 B2

IMAGE SYNTHESIZING APPARATUS, IRIS AUTHENTICATION SYSTEM, IMAGE SYNTHESIZING METHOD, AND IRIS AUTHENTICATING METHOD

CROSS REFERENCE TO RELATED APPLICATION

This application claims the benefit of priority of Japanese Patent Application Number 2018-035941 filed on Feb. 28, 2018, the entire content of which is hereby incorporated by reference.

BACKGROUND

1. Technical Field

The present disclosure relates to an image synthesizing apparatus, an iris authentication system, an image synthesizing method, and an iris authenticating method.

2. Description of the Related Art

In recent years, authentication techniques for performing personal authentication from a face of a person imaged by a camera have rapidly progressed. As one of such authentication techniques, there is an iris authentication technique. The iris authentication technique is a method with an extremely low rate of erroneously recognizing another person as a person in question (false accept rate FAR). For example, Japanese Patent No. 3307936 (Patent Literature 1) discloses a technique for extracting an iris in an image of a face of a person and determining identity of the iris from similarity between a code of the iris and a code of a reference iris. Japanese Patent No. 3586456 (Patent Literature 2) discloses an iris authentication technique for preventing deterioration in authentication accuracy due to reflection of external light on an iris. Specifically, authentication of an iris image with respect to registered iris data is performed using a plurality of iris images in which reflecting positions of external light are different and the registered iris data.

Related art is also disclosed in Yuichi Ichihashi, Shuichi Kawabata, Kazuo Ishikawa, and Toyohiko Hatada, "Polarization Characteristics in an Eyeball Imaging System and an Analysis of the Polarization Characteristics", Journal of Japanese Ophthalmological Society, 1989, Volume 10, No. 1, p. 87 to 92 (Non Patent Literature 1) The technique of Patent Literature 1 does not consider reflection of external light on an iris. In the technique of Patent Literature 2, a direction of a face of a person in photographing an iris image is designated. Both of the techniques target a limited iris image and are not considered to have high iris authentication accuracy.

SUMMARY

Therefore, the present disclosure provides an image synthesizing apparatus, an iris authentication system, an image synthesizing method, and an iris authenticating method for improving iris authentication accuracy.

An image synthesizing apparatus according to an aspect of the present disclosure includes: an illuminating device that outputs linearly polarized light having a first polarization direction and linearly polarized light having a second polarization direction; a camera that captures an image in a third polarization direction including a plurality of pixels and an image in a fourth polarization direction including a plurality of pixels; and a control circuit that synthesizes, on a pixel-by-pixel basis, the image in the third polarization direction and the image in the fourth polarization direction into an authentication image for iris authentication, wherein the first polarization direction, the second polarization direction, the third polarization direction, and the fourth polarization direction are different from one another, and the camera acquires the image in the third polarization direction using the linearly polarized light in the first polarization direction and acquires the image in the fourth polarization direction using the linearly polarized light in the second polarization direction.

An image synthesizing apparatus according to an aspect of the present disclosure includes: an illuminating device that outputs linearly polarized light having a first polarization direction and linearly polarized light having a 10 second polarization direction; a camera that captures an image in a third polarization direction including a plurality of pixels and an image in a fourth polarization direction including a plurality of pixels; and a control circuit that synthesizes, on a pixel-by-pixel basis, the image in the third polarization direction and the image in the fourth polarization direction into an authentication image for iris authentication, wherein the first polarization direction and the second polarization direction are different from each other, the third polarization direction and the fourth polarization direction are different from each other, and the camera acquires the image in the third polarization direction using the linearly polarized light in the first polarization direction and the linearly polarized light in the second polarization direction and acquires the image in the fourth polarization direction using the linearly polarized light in the first polarization direction and the linearly polarized light in the second polarization direction.

An image synthesizing apparatus according to an aspect of the present disclosure includes: an illuminating device that outputs right circularly polarized light and left circularly polarized light; a camera that captures an image in a right polarization direction including a plurality of pixels and an image in a left polarization direction including a plurality of pixels; and a control circuit that synthesizes, on a pixel-by-pixel basis, the image in the right polarization direction and the image in the left polarization direction into an authentication image for iris authentication, wherein the camera acquires the image in the right polarization direction using the right circularly polarized light and the left circularly polarized light and acquires the image in the left polarization direction using the right circularly polarized light and the left circularly polarized light.

An image synthesizing apparatus according to an aspect of the present disclosure includes: an illuminating device that simultaneously outputs first linearly polarized light having a first polarization direction, second linearly polarized light having a second polarization direction, third linearly polarized light having a third polarization direction, and fourth linearly polarized light having a fourth polarization direction; a camera that captures a fifth image in the first polarization direction including a plurality of pixels, a sixth image in the second polarization direction including a plurality of pixels, a seventh image in the third polarization direction including a plurality of pixels, and an eighth image in the fourth polarization direction including a plurality of pixels; and a control circuit that synthesizes, on a pixel-by-pixel basis, the fifth image, the sixth image, the seventh image, and the eighth image into an authentication image for iris authentication, wherein the first polarization direction, the second polarization direction, the third polarization direction, and the fourth polarization direction are different from one another by 45 degrees, and the camera acquires the fifth image, the sixth image, the seventh image, and the eighth image respectively using the first linearly polarized light, the second linearly polarized light, the third linearly polarized light, and the fourth linearly polarized light.

An iris authentication system according to an aspect of the present disclosure includes: the image synthesizing apparatus according to the above aspect; and an iris authentication circuit, wherein the iris authentication circuit acquires iris authentication information in which a plurality of user identifications (IDs) and a plurality of reference images are associated with each other and identifies a user ID with reference to the authentication image and the iris authentication information.

An image synthesizing method according to an aspect of the present disclosure includes: sequentially outputting first linearly polarized light having a first polarization direction and second linearly polarized light having a second polarization direction; when the first linearly polarized light is output, capturing an image to acquire a third image in a third polarization direction including a plurality of pixels; when the second linearly polarized light is output, capturing an image to acquire a fourth image in a fourth polarization direction including a plurality of pixels; and synthesizing, on a pixel-by-pixel basis, the third image and the fourth image into an authentication image for iris authentication, wherein the first polarization direction, the second polarization direction, the third polarization direction, and the fourth polarization direction are different from one another, and at least one of the sequential outputting, the capturing of the image to acquire the third image, the capturing of the image to acquire to the fourth image, and synthesizing is executed by at least one control circuit.

An image synthesizing method according to an aspect of the present disclosure includes: outputting first linearly polarized light having a first polarization direction and second linearly polarized light having a second polarization direction together; capturing an image when the first linearly polarized light and the second linearly polarized light are output; acquiring, from the image, a third image in a third polarization direction including a plurality of pixels and a fourth image in a fourth polarization direction including a plurality of pixels; and synthesizing, on a pixel-by-pixel basis, the third image and the fourth image into an authentication image for iris authentication, wherein the first polarization direction and the second polarization direction are different from each other, the third polarization direction and the fourth polarization direction are different from each other, and at least one of the outputting, the capturing the image, the acquiring, and synthesizing is executed by at least one control circuit.

An image synthesizing method according to an aspect of the present disclosure includes: outputting right circularly polarized light and left circularly polarized light together; capturing an image when the right circularly polarized light and the left circularly polarized light are output; acquiring, from the image, an image in a right polarization direction including a plurality of pixels and an image in a left polarization direction including a plurality of pixels; and synthesizing, on a pixel-by-pixel basis, the image in the right polarization direction and the image in the left polarization direction into an authentication image for iris authentication, wherein at least one of the outputting, the capturing, the acquiring, and synthesizing is executed by at least one control circuit.

An image synthesizing method according to an aspect of the present disclosure includes: simultaneously outputting first linearly polarized light having a first polarization direction, second linearly polarized light having a second polarization direction, third linearly polarized light having a third polarization direction, and fourth linearly polarized light having a fourth polarization direction; capturing an image when the first linearly polarized light, the second linearly polarized light, the third linearly polarized light, and the fourth linearly polarized light are output; acquiring, from the image, a fifth image in the first polarization direction including a plurality of pixels, a sixth image in the second polarization direction including a plurality of pixels, a seventh image in the third polarization direction including a plurality of pixels, and an eighth image in the fourth polarization direction including a plurality of pixels; synthesizing, on a pixel-by-pixel basis, the fifth image, the sixth image, the seventh image, and the eighth image into an authentication image for iris authentication, wherein the first polarization direction, the second polarization direction, the third polarization direction, the fourth polarization direction are different from each other by 45 degrees, and at least one of the simultaneously outputting, the capturing, the acquiring, and synthesizing is executed by at least one control circuit.

An iris authenticating method according to an aspect of the present disclosure includes: acquiring the authentication image generated by the image synthesizing method according to the above aspect; acquiring iris authentication information in which a plurality of user IDs and a plurality of reference images are associated with each other; identifying a user ID with reference to the authentication image and the iris authentication information, wherein at least one of the acquiring of the authentication image, the acquiring of the iris authentication information, and the identifying is executed by at least one control circuit.

The comprehensive and specific forms explained above may be realized as a system, an apparatus, a method, an integrated circuit, a computer program, or a computer-readable recording medium such as a recording disk or may be realized as any combination of the system, the apparatus, the method, the integrated circuit, the computer program, and the recording medium. The computer-readable recording medium includes a nonvolatile recording medium such as a CD-ROM (Compact Disc-Read Only Memory).

With the image synthesizing apparatus and the like of the present disclosure, it is possible to improve iris authentication accuracy.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 20A is a diagram showing, as in FIG. 2, an example of an iris authenticating apparatus of related art that performs iris authentication using circularly polarized light;

FIG. 31 is a schematic diagram showing an example of processing of a polarized image synthesizer for removing a bright spot of specular reflection.

DETAILED DESCRIPTION OF THE EMBODIMENTS

[Knowledge of the Inventor]

Figure 1:
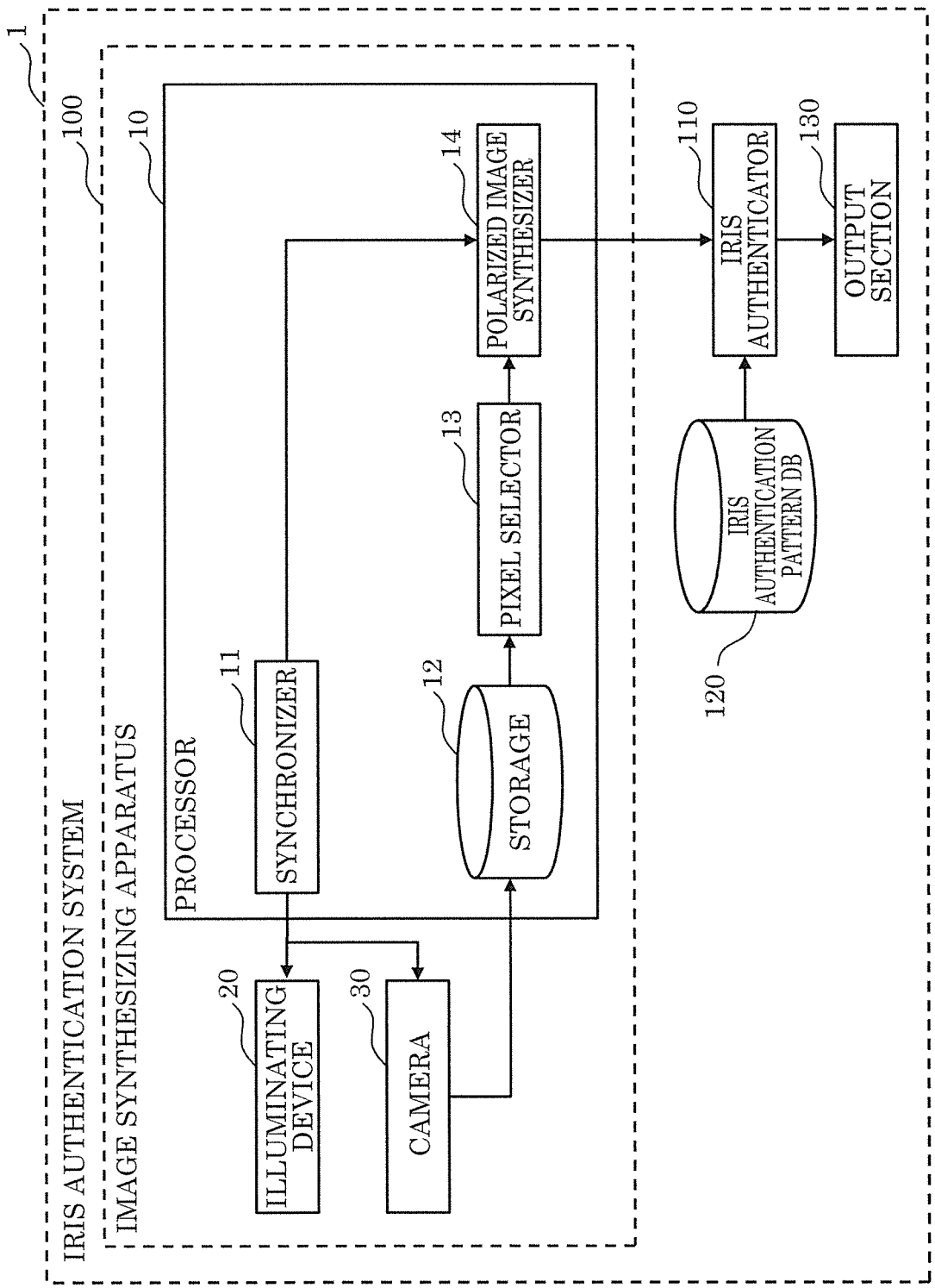
FIG. 1 is a block diagram showing an example of a functional configuration of an iris authentication system according to the first embodiment.

First, knowledge of the inventor is explained. As explained in the background, in recent years, a face recognition technique for performing personal authentication from a face of a person imaged by a camera has attracted attention and rapidly progressed. As a method of authenticating a person, there are techniques for authenticating a person using various kinds of biometrics such as fingerprint authentication, vein authentication, and retina authentication. However, in recent years, among various kinds of face authentication, a request for a casual authentication technique has been increasing. The casual authentication means authenticating a person to be authenticated in an unaware state who does not take a predetermined position, a predetermined direction, a predetermined posture, and the like with respect to an authenticating apparatus. In the casual authentication of a face, there is an increasing need for a technique for authenticating a person to be authenticated unaware of a camera by imaging the person to be authenticated with a camera in a noncontact manner from a distance of several meters. However, in the face authentication, wrong recognition due to hiding of a face by a mask or the like or fluctuation of a face due to extreme facial expression could occur. Further, in the face authentication, it is sometimes difficult to distinguish an extremely similar face such as faces of twins. That is, in the face authentication, there is an essential problem that another person is easily misrecognized as a person in question.

Therefore, the inventor focused on an iris authentication technique conventionally used as a method with an extremely low false accept rate FAR, which is a rate of misrecognition of another person as a person in question, and examined highly accurate casual authentication performed by combining the iris authentication technique and the face authentication. For example, an iris authentication pattern is obtained by carrying out special frequency emphasis processing on an iris image captured by a camera. Such an iris authentication pattern is image information having extremely high randomness. In the field of the iris authentication technique, the iris authentication pattern is considered to have an FAR of 1/10000 even in the entire population on the Earth. Therefore, in the iris authentication technique using the iris authentication pattern, another person is never misrecognized as a person in question even in the case of eyes of twins. In the iris authentication pattern, fluctuation due to aged deterioration, injury, and the like in an individual is little. An authentication function can be maintained.

Patent Literature 1 discloses a basic technique in the iris authentication technique in the past. In the technique, first, a pupil center and an iris center are detected from an eyeball image. The pupil and the iris are modeled as circles having different centers and radiuses. Subsequently, a doughnut-shaped iris image is developed into a rectangular image using a polar coordinate axis set in the pupil center and is converted into a binary iris authentication pattern using a Gabor filter or the like. Authentication processing is determined according to a humming distance of a signal between iris authentication patterns.

The iris authentication technique in the past is based on IR (infrared) imaging using IR (infrared) illumination. Reflection of reflected light of illumination light on an eyeball or an eyeglass during imaging often occurred. For example, Patent Literature 2 discloses an iris authentication technique adopted when cooperation of a person to be authenticated during authentication of the person to be authenticated can be obtained. In the iris authentication technique of Patent Literature 2, with active cooperation of the person to be authenticated, an angle and a distance of imaging for the person to be authenticated are adjusted to prevent unintended reflected light of illumination from being reflected on an iris authentication pattern. However, in the casual iris authentication technique focused by the inventor, while a person to be authenticated is unaware of IR illumination and an IR camera, a face image of the person to be authenticated is captured from a far distance using the IR illumination and the IR camera. Iris authentication is performed using the face image. In this case, even if IR illumination light reflects on a cornea or a lens of an eyeglass and hides a pupil or an iris of an eyeball, cooperation for avoiding the hiding is not obtained from the person to be authenticated. Therefore, the inventor examined contrivance of illumination light on an illuminating device side and examined irradiation of the person to be authenticated with linearly polarized light using a polarizer. Further, the inventor examined contrivance on an imaging side and examined setting of an analyzer, which is a polarizing plate, in the camera. The inventor focused on removing reflected light of illumination from an image by making a polarization direction of the linearly polarized light and a polarization direction of the polarizing plate orthogonal. However, as described in Non Patent Literature 1, in eyeball photographing using the orthogonal polarization technique explained above, a birefringence pattern (called "black cross pattern (Polarization Cross)" as well) of a light and shade stripe shape is caused by a birefringence characteristic of an originally transparent cornea that covers an iris surface. The birefringence pattern is superimposed on an original iris pattern. Therefore, iris authentication fails.

That is, in the casual iris authentication in which cooperation of a person to be authenticated is not obtained during authentication, a pattern of an artifact due to the birefringence characteristic of the cornea appears with respect to an attempt to remove reflection of illumination light from the cornea and the eyeglass using the linearly polarized light. Authentication by the iris authentication technique in the past cannot be performed because of the influence of the pattern. The inventor invented a technique described below in order to enable highly accurate iris authentication by solving the various problems described above.

An image synthesizing apparatus according to a first aspect of the present disclosure includes: an illuminating device that outputs linearly polarized light having a first polarization direction and linearly polarized light having a second polarization direction; a camera that captures an image in a third polarization direction including a plurality of pixels and an image in a fourth polarization direction including a plurality of pixels; and a control circuit that synthesizes, on a pixel-by-pixel basis, the image in the third polarization direction and the image in the fourth polarization direction into an authentication image for iris authentication, wherein the first polarization direction, the second polarization direction, the third polarization direction, and the fourth polarization direction are different from one another, and the camera acquires the image in the third polarization direction using the linearly polarized light in the first polarization direction and acquires the image in the fourth polarization direction using the linearly polarized light in the second polarization direction.

According to the first aspect, in the image in the third polarization direction acquired using the linearly polarized light in the first polarization direction different from the third polarization direction, an image of specular reflection due to positive reflection in a cornea of an eyeball can be reduced. In the image in the fourth polarization direction acquired using the linearly polarized light in the second polarization direction different from the fourth polarization direction, the image of the specular reflection in the cornea of the eyeball can be reduced. In the image in the third polarization direction and the image in the fourth polarization direction in the different polarization directions, even when images due to birefringence of the cornea appear, the images can appear in different positions. Therefore, in an authentication image obtained by combining the image in the third polarization direction and the image in the fourth polarization direction, an image of the specular reflection of the cornea and an image due to the birefringence of the cornea are reduced. Therefore, an iris region of the authentication image can be an image suitable for authentication. For example, the first polarization direction of the linearly polarized light can be set to 90 degrees and the second polarization direction of the linearly polarized light can be set to 135 degrees. The third polarization direction of the image can be set to 0 degree and the fourth polarization direction of the image can be set to 45 degrees.

According to the first aspect of the present disclosure, it is possible that the first polarization direction is different from the second polarization direction by 45 degrees, that the third polarization direction is a linear direction different from the first polarization direction by 90 degrees, and that the fourth polarization direction is a linear direction different from the second polarization direction by 90 degrees.

According to the first aspect, since the difference between the first polarization direction and the third polarization direction is 90 degrees, a removal rate of the image of the specular reflection of the cornea in the image in the third polarization direction is improved. Since the difference between the second polarization direction and the fourth polarization direction is 90 degrees, a removal rate of the image of the specular reflection of the cornea in the image in the fourth polarization direction is improved. Further, since the difference between the first polarization direction and the second polarization direction is 45 degrees, a region where the image due to the birefringence of the cornea is superimposed decreases between the image in the third polarization direction and the image in the fourth polarization direction. Accordingly, a removal rate of the image due to the birefringence of the cornea is improved in an iris region of the authentication image.

According to the first aspect of the present disclosure, it is possible that the illuminating device includes: at least one first light source; at least one second light source; a first polarizing plate having the first polarization direction and located in front of the first light source; and a second polarizing plate having the second polarization direction and located in front of the second light source, that the first light source outputs the linearly polarized light having the first polarization direction via the first polarizing plate, and that the second light source outputs the linearly polarized light having the second polarization direction via the second polarizing plate.

According to the first aspect, the linearly polarized light having the first polarization direction is irradiated by lighting the first light source. The linearly polarized light having the second polarization direction is irradiated by lighting the second light source. It is easy to control the irradiation of the linearly polarized light having the first polarization direction and the linearly polarized light having the second polarization direction.

According to the first aspect of the present disclosure, it is possible that when the illuminating device outputs the linearly polarized light in the first polarization direction, the camera captures the image in the third polarization direction, and, when the illuminating device outputs the linearly polarized light in the second polarization direction, the camera captures the image in the fourth polarization direction.

According to the first aspect, it is possible to prevent an unnecessary image of linearly polarized light from being included in each of the image in the third polarization direction and the image in the fourth polarization direction.

According to the first aspect of the present disclosure, it is possible that in the synthesizing of the authentication image, the control circuit compares pixel values of pixels corresponding to each other between the image in the third polarization direction and the image in the fourth polarization direction and determines a larger pixel value of the pixel values of the corresponding pixels as a pixel value of a corresponding pixel in the authentication image.

According to the first aspect, a pixel value of the image due to the birefringence of the cornea decreases in each of the image in the third polarization direction and the image in the fourth polarization direction. A larger pixel value among pixel values of pixels corresponding to each other between the image in the third polarization direction and the image in the fourth polarization direction is highly likely not to be a pixel value of an image due to the birefringence of the cornea. By determining such a pixel value as a pixel value of a corresponding pixel in the authentication image, the image due to the birefringence of the cornea can be effectively removed in the authentication image.

According to the first aspect of the present disclosure, it is possible that in the synthesizing of the authentication image, the control circuit compares pixel values of pixels corresponding to each other between the image in the third polarization direction and the image in the fourth polarization direction and determines an average of the pixel values of the corresponding pixels as a pixel value of a corresponding pixel in the authentication image.

According to the first aspect, an average of pixel values of pixels corresponding to each other between the image in the third polarization direction and the image in the fourth polarization direction can be a value obtained by reducing the influence of the image due to the birefringence of the cornea. By determining such a pixel value as a pixel value of a corresponding pixel in the authentication image, the image due to the birefringence of the cornea can be effectively removed in the authentication image.

An image synthesizing apparatus according to a second aspect of the present disclosure includes: an illuminating device that outputs linearly polarized light having a first polarization direction and linearly polarized light having a second polarization direction; a camera that captures an image in a third polarization direction including a plurality of pixels and an image in a fourth polarization direction including a plurality of pixels; and a control circuit that synthesizes, on a pixel-by-pixel basis, the image in the third polarization direction and the image in the fourth polarization direction into an authentication image for iris authentication, wherein the first polarization direction and the second polarization direction are different from each other, the third polarization direction and the fourth polarization direction are different from each other, and the camera acquires the image in the third polarization direction using the linearly polarized light in the first polarization direction and the linearly polarized light in the second polarization direction and acquires the image in the fourth polarization direction using the linearly polarized light in the first polarization direction and the linearly polarized light in the second polarization direction.

According to the second aspect, since the image in the third polarization direction and the image in the fourth polarization direction are respectively images acquired using two linearly polarized lights in the different polarization direction, occurrence of the image due to the birefringence of the cornea is prevented. Further, in the image in the third polarization direction and the image in the fourth polarization direction in the different polarization directions, even when images of the specular reflection of the cornea appear, the images can appear in different positions. Accordingly, in the authentication image obtained by combining the image in the third polarization direction and the image in the fourth polarization direction, the image of the specular reflection of the cornea and the image due to the birefringence of the cornea are reduced. Therefore, an iris region of the authentication image can be an image suitable for authentication. For example, the first polarization direction of the linearly polarized light can be set to 0 degree and the second polarization direction of the linearly polarized light can be set to 90 degrees. The third polarization direction of the image can be set to 0 degree and the fourth polarization direction of the image can be set to 90 degrees.

According to the second aspect of the present disclosure, it is possible that the first polarization direction is different from the second polarization direction by 90 degrees, that the third polarization direction is a linear direction different from the first polarization direction by 90 degrees, and that the fourth polarization direction is a linear direction different from the second polarization direction by 90 degrees.

According to the second aspect, it is possible to reduce superimposition of a region where the image of the specular reflection of the cornea in the image in the third polarization direction can appear and a region where the image of the specular reflection of the cornea in the image in the fourth polarization direction can appear. Accordingly, in the authentication image, a removal rate of the image of the specular reflection of the cornea is improved.

According to the second aspect of the present disclosure, it is possible that the illuminating device includes: at least one light source; a first polarizing plate having the first polarization direction and located in front of the light source; and a second polarizing plate having the second polarization direction and located in front of the light source, that the light source outputs the linearly polarized light having the first polarization direction via the first polarizing plate, and that the light source outputs the linearly polarized light having the second polarization direction via the second polarizing plate.

According to the second aspect, the linearly polarized light having the first polarization direction and the linearly polarized light having the second polarization direction are irradiated together by lighting the light source. It is easy to control the irradiation of the linearly polarized light having the first polarization direction and the linearly polarized light having the second polarization direction.

According to the second aspect of the present disclosure, it is possible that the image synthesizing apparatus further includes a diffusing plate, wherein the diffusing plate is disposed in order of the illuminating device, the diffusing plate, and the first polarizing plate and in order of the illuminating device, the diffusing plate, and the second polarizing plate, and that when viewed along an optical axis of the illuminating device, the first polarizing plate and the second polarizing plate each have a size equal to or larger than a size of the diffusing plate, and the diffusing plate has a size equal to or larger than a size of the illuminating device.

According to the second aspect, the linearly polarized light diffused by the diffusing plate and thereafter transmitted through the first polarizing plate and the second polarizing plate can reduce luminance of the image of the specular reflection on the eyeglass or the cornea. Further, even when an extinction coefficient of the polarizing plate is low, it is possible to realize removal of the image of the specular reflection of the linearly polarized light. Since the first polarizing plate and the second polarizing plate are larger than the diffusing plate, the entire illumination light diffused by the diffusing plate can be made incident on the first polarizing plate or the second polarizing plate. Accordingly, the illumination light diffused by the diffusing plate is prevented from irradiating an object without receiving polarization by both of the first polarizing plate and the second polarizing plate.

According to the second aspect of the present disclosure, it is possible that in the synthesizing of the authentication image, the control circuit compares pixel values of pixels corresponding to each other between the image in the third polarization direction and the image in the fourth polarization direction and determines a smaller pixel value of the pixel values of the corresponding pixels as a pixel value of a corresponding pixel in the authentication image.

According to the second aspect, a pixel value of the image of the specular reflection of the cornea is large in each of the image in the third polarization direction and the image in the fourth polarization direction. A smaller pixel value among pixel values of pixels corresponding to each other between the image in the third polarization direction and the image in the fourth polarization direction is highly likely not to be a pixel value of an image of the specular reflection of the cornea. By determining such a pixel value as a pixel value of a corresponding pixel in the authentication image, the image of the specular reflection of the cornea can be effectively removed in the authentication image.

According to the second aspect of the present disclosure, it is possible that in the synthesizing of the authentication image, the control circuit compares pixel values of pixels corresponding to each other between the image in the third polarization direction and the image in the fourth polarization direction and determines an average of the pixel values of the corresponding pixels as a pixel value of a corresponding pixel in the authentication image.

According to the second aspect, an average of pixel values of pixels corresponding to each other between the image in the third polarization direction and the image in the fourth polarization direction can be a value obtained by reducing the influence of the image of the specular reflection of the cornea. By determining such a pixel value as a pixel value of a corresponding pixel in the authentication image, the image of the specular reflection of the cornea can be effectively removed in the authentication image.

An image synthesizing apparatus according to a third aspect of the present disclosure includes: an illuminating device that outputs right circularly polarized light and left circularly polarized light; a camera that captures an image in a right polarization direction including a plurality of pixels and an image in a left polarization direction including a plurality of pixels; and a control circuit that synthesizes, on a pixel-by-pixel basis, the image in the right polarization direction and the image in the left polarization direction into an authentication image for iris authentication, wherein the camera acquires the image in the right polarization direction using the right circularly polarized light and the left circularly polarized light and acquires the image in the left polarization direction using the right circularly polarized light and the left circularly polarized light.

According to the third aspect, the image of the right circularly polarized light and the image of the left circularly polarized light are respectively images acquired by using the right circularly polarized light and the left circularly polarized light. Therefore, occurrence of the image due to the birefringence of the cornea is prevented. Further, in the image of the right circularly polarized light and the image of the left circularly polarized light, even when images of specular reflection of the cornea appear, the images can appear in different positions. Accordingly, in the authentication image obtained by combining the image of the right circularly polarized light and the image of the left circularly polarized light, the image of the specular reflection of the cornea and the image due to the birefringence of the cornea are reduced. Therefore, an iris region of the authentication image can be an image suitable for authentication.

According to the third aspect of the present disclosure, it is possible that the illuminating device includes: at least one light source; a right polarizing plate having the right polarization direction and located in front of the light source; and a left polarizing plate having the left polarization direction and located in front of the light source, that the light source outputs the right circularly polarized light via the right polarizing plate, and that the light source outputs the left circularly polarized light via the left polarizing plate.

According to the third aspect, the right circularly polarized light and the left circularly polarized light are irradiated together by lighting the light source. It is easy to control the irradiation of the right circularly polarized light and the left circularly polarized light.

According to the third aspect of the present disclosure, it is possible that in the synthesizing of the authentication image, the control circuit compares pixel values of pixels corresponding to each other between the image in the right polarization direction and the image in the left polarization direction and determines a smaller pixel value of the pixel values of the corresponding pixels as a pixel value of a corresponding pixel in the authentication image.

According to the third aspect, a pixel value of the image of the specular reflection of the cornea is large in each of the image of the right circularly polarized light and the image of the left circularly polarized light. A smaller pixel value of pixel values of pixels corresponding to each other between the image of the right circularly polarized light and the image of the left circularly polarized light is highly likely not to be a pixel value of the image of the specular reflection of the cornea. By determining such a pixel value as a pixel value of a corresponding pixel in the authentication image, the image of the specular reflection of the cornea can be effectively removed in the authentication image.

According to the third aspect of the present disclosure, it is possible that in the synthesizing of the authentication image, the control circuit compares pixel values of pixels corresponding to each other between the image in the right polarization direction and the image in the left polarization direction and determines an average of the pixel values of the corresponding pixels as a pixel value of a corresponding pixel in the authentication image.

According to the third aspect, an average of pixel values of pixels corresponding to each other between the image of the right circularly polarized light and the image of the left circularly polarized light can be a value obtained by reducing the influence of the image of the specular reflection of the cornea. By determining such a pixel value as a pixel value of a corresponding pixel in the authentication image, the image of the specular reflection of the cornea can be effectively removed in the authentication image.

An image synthesizing apparatus according to a fourth aspect of the present disclosure includes: an illuminating device that simultaneously outputs first linearly polarized light having a first polarization direction, second linearly polarized light having a second polarization direction, third linearly polarized light having a third polarization direction, and fourth linearly polarized light having a fourth polarization direction; a camera that captures a fifth image in the first polarization direction including a plurality of pixels, a sixth image in the second polarization direction including a plurality of pixels, a seventh image in the third polarization direction including a plurality of pixels, and an eighth image in the fourth polarization direction including a plurality of pixels; and a control circuit that synthesizes, on a pixel-by-pixel basis, the fifth image, the sixth image, the seventh image, and the eighth image into an authentication image for iris authentication, wherein the first polarization direction, the second polarization direction, the third polarization direction, and the fourth polarization direction are different from one another by 45 degrees, and the camera acquires the fifth image, the sixth image, the seventh image, and the eighth image respectively using the first linearly polarized light, the second linearly polarized light, the third linearly polarized light, and the fourth linearly polarized light.

According to the fourth aspect, the fifth to the eighth images are respectively images acquired using the linearly polarized lights having the first to fourth polarization directions. Therefore, occurrence of the image due to the birefringence of the cornea is prevented. Further, in the fifth to the eighth images, even if images of the specular reflection of the cornea appear, the images appear in different positions. Accordingly, in the authentication image obtained by combining the fifth to the eighth images, the image of the specular reflection of the cornea and the image due to the birefringence of the cornea are reduced. In particular, when the number of images to be combined increases, a probability of appearance of images of the specular reflection of the cornea in the same positions in all the images decreases. Therefore, an iris region of the authentication image can be an image suitable for authentication. For example, the first polarization direction, the second polarization direction, the third polarization direction, and the fourth polarization direction of the linearly polarized light can be respectively set to 0 degree, 45 degrees, 90 degrees, and 135 degrees. The first polarization direction, the second polarization direction, the third polarization direction, and the fourth polarization direction of the image can be respectively set to 0 degree, 45 degrees, 90 degrees, and 135 degrees.

According to the fourth aspect of the present disclosure, it is possible that the illuminating device includes: at least one light source; a first polarizing plate having the first polarization direction and located in front of the light source; a second polarizing plate having the second polarization direction and located in front of the light source; a third polarizing plate having the third polarization direction and located in front of the light source; and a fourth polarizing plate having the fourth polarization direction and located in front of the light source, that the light source outputs linearly polarized light having the first polarization direction via the first polarizing plate, the light source outputs linearly polarized light having the second polarization direction via the second polarizing plate, that the light source outputs linearly polarized light having the third polarization direction via the third polarizing plate, and that the light source outputs linearly polarized light having the fourth polarization direction via the fourth polarizing plate.

According to the fourth aspect, the linearly polarized lights having the first to fourth polarization directions are irradiated together by lighting the light source. It is easy to control the irradiation of the linearly polarized lights having the first to fourth polarization directions.

According to the fourth aspect of the present disclosure, it is possible that in the synthesizing of the authentication image, the control circuit compares pixel values of pixels corresponding to one another among the fifth image, the sixth image, the seventh image, and the eighth image and determines a smallest pixel value among the pixel values of the corresponding pixels as a pixel value of a corresponding pixel in the authentication image.

According to the fourth aspect, a pixel value of the image of the specular reflection of the cornea is large in each of the fifth image, the sixth image, the seventh image, and the eighth image. A smallest pixel value among pixel values of pixels corresponding to one another among the fifth image, the sixth image, the seventh image, and the eighth image is highly likely not to be a pixel value of the image of the specular reflection of the cornea. By determining such a pixel value as pixel values of the pixels of the authentication image, the image of the specular reflection of the cornea can be effectively removed in the authentication image.

According to the fourth aspect of the present disclosure, it is possible that in the synthesizing of the authentication image, the control circuit compares pixel values of pixels corresponding to one another among the fifth image, the sixth image, the seventh image, and the eighth image and determines an average of the pixel values of the corresponding pixels as a pixel value of a corresponding pixel in the authentication image.

According to the fourth aspect, an average of pixel values among pixels corresponding to one another among the fifth image, the sixth image, the seventh image, and the eighth image can be a value obtained by reducing the influence of the image of the specular reflection of the cornea. By determining such a pixel value as pixel values of the pixels of the authentication image, the image of the specular reflection of the cornea can be effectively removed in the authentication image.

An image synthesizing apparatus according to a fifth aspect of the present disclosure includes: an illuminating device that outputs first linearly polarized light having a first polarization direction, second linearly polarized light having a second polarization direction, and third linearly polarized light having a third polarization direction; a camera that images a fourth image in a fourth polarization direction including a plurality of pixels, a fifth image in a fifth polarization direction including a plurality of pixels, and a sixth image in a sixth polarization direction including a plurality of pixels; and a control circuit that synthesizes, on a pixel-by-pixel basis, the fourth image, the fifth image, and the sixth image into an authentication image for iris authentication. The first polarization direction, the second polarization direction, and the third polarization direction are different from one another. The fourth polarization direction, the fifth polarization direction, and the sixth polarization direction are different from one another. The camera acquires the fourth image, the fifth image, and the sixth image respectively using the first linearly polarized light, the second linearly polarized light, and the third linearly polarized light.

According to the fifth aspect, the fourth to sixth images are images respectively acquired using the linearly polarized lights having the first to third polarization directions. Therefore, occurrence of the image due to the birefringence of the cornea is prevented. Further, in the fourth to sixth images, even when images of the specular reflection of the cornea appear, the images can appear in different positions. Accordingly, in the authentication image obtained by combining the fourth to sixth images, the image of the specular reflection of the cornea and the image due to the birefringence of the cornea are reduced. In particular, when the number of images to be combined increases, a probability of appearance of images of the specular reflection of the cornea in the same positions in all the images decreases. Therefore, an iris region of the authentication image can be an image suitable for authentication. For example, the first polarization direction, the second polarization direction, and the third polarization direction of the linearly polarized light can be respectively set to any one of 0 degree, 45 degrees, 90 degrees, and 135 degrees. The fourth polarization direction, the fifth polarization direction, and the sixth polarization direction of the image can be respectively set to any one of 0 degree, 45 degrees, 90 degrees, and 135 degrees.

An iris authentication system according to an aspect of the present disclosure includes: the image synthesizing apparatus according to the above aspect and an iris authentication circuit, wherein the iris authentication circuit acquires iris authentication information in which a plurality of user identifications (IDs) and a plurality of reference images are associated with each other and identifies a user ID with reference to the authentication image and the iris authentication information. According to the aspect, the same effect as the effect of the image synthesizing apparatus explained above can be obtained. Further, it is possible to highly accurately identify a user by using the authentication image of the image synthesizing apparatus.

An image synthesizing method according to a first aspect of the present disclosure includes: sequentially outputting first linearly polarized light having a first polarization direction and second linearly polarized light having a second polarization direction; when the first linearly polarized light is output, capturing an image to acquire a third image in a third polarization direction including a plurality of pixels; when the second linearly polarized light is output, capturing an image to acquire a fourth image in a fourth polarization direction including a plurality of pixels; and synthesizing, on a pixel-by-pixel basis, the third image and the fourth image into an authentication image for iris authentication. The first polarization direction, the second polarization direction, the third polarization direction, and the fourth polarization direction are different from one another. At least one of the sequential outputting, the capturing of the image to acquire the third image, the capturing of the image to acquire to the fourth image, and synthesizing is executed by at least one control circuit. According to the aspect, the same effects as the effect of the image synthesizing apparatus according to the first aspect of the present disclosure can be obtained.

According to the first aspect, it is possible that the first polarization direction is different from the second polarization direction by 45 degrees, that the third polarization direction is a linear direction different from the first polarization direction by 90 degrees, and that the fourth polarization direction is a linear direction different from the second polarization direction by 90 degrees.

According to the first aspect, it is possible that in the synthesizing of the authentication image, pixel values of pixels corresponding to each other are compared between the third image and the fourth image, and a larger pixel value of the pixel values of the corresponding pixels is determined as a pixel value of a corresponding pixel in the authentication image.

According to the first aspect, it is possible that in the synthesizing of the authentication image, pixel values of pixels corresponding to each other are compared between the third image and the fourth image, and an average of the pixel values of the corresponding pixels is determined as a pixel value of a corresponding pixel in the authentication image.

An image synthesizing method according to a second aspect of the present disclosure includes: outputting first linearly polarized light having a first polarization direction and second linearly polarized light having a second polarization direction together; capturing an image when the first linearly polarized light and the second linearly polarized light are output; acquiring, from the image, a third image in a third polarization direction including a plurality of pixels and a fourth image in a fourth polarization direction including a plurality of pixels; and synthesizing, on a pixel-by-pixel basis, the third image and the fourth image into an authentication image for iris authentication. The first polarization direction and the second polarization direction are different from each other, the third polarization direction and the fourth polarization direction are different from each other. At least one of the outputting, the capturing the image, the acquiring, and synthesizing is executed by at least one control circuit. According to the above aspect, the same effect as the effect of the image synthesizing apparatus according to the second aspect of the present disclosure can be obtained.

According to the second aspect, it is possible that the first polarization direction is different from the second polarization direction by 90 degrees, that the third polarization direction is a linear direction different from the first polarization direction by 90 degrees, and that the fourth polarization direction is a linear direction different from the second polarization direction by 90 degrees.

According to the second aspect, it is possible that in the synthesizing of the authentication image, pixel values of pixels corresponding to each other are compared between the third image and the fourth image, and a smaller pixel value of the pixel values of the corresponding pixels is determined as a pixel value of a corresponding pixel in the authentication image.

According to the second aspect, it is possible that in the synthesizing of the authentication image, pixel values of pixels corresponding to each other are compared between the third image and the fourth image, and an average of the pixel values of the corresponding pixels is determined as a pixel value of a corresponding pixel in the authentication image.

An image synthesizing method according to a third aspect of the present disclosure includes: outputting right circularly polarized light and left circularly polarized light together; capturing an image when the right circularly polarized light and the left circularly polarized light are output; acquiring, from the image, an image in a right polarization direction including a plurality of pixels and an image in a left polarization direction including a plurality of pixels; and synthesizing, on a pixel-by-pixel basis, the image in the right polarization direction and the image in the left polarization direction into an authentication image for iris authentication. At least one of the outputting, the capturing, the acquiring, and synthesizing is executed by at least one control circuit. According to the above aspect, the same effect as the effect of the image synthesizing apparatus according to the third aspect of the present disclosure can be obtained.

According to the third aspect, it is possible that in the synthesizing of the authentication image, pixel values of pixels corresponding to each other are compared between the image in the right polarization direction and the image in the left polarization direction, and a smaller pixel value of the pixel values of the corresponding pixels is determined as a pixel value of a corresponding pixel in the authentication image.

According to the third aspect, it is possible that in the synthesizing of the authentication image, pixel values of pixels corresponding to each other are compared between the image in the right polarization direction and the image in the left polarization direction, and an average of the pixel values of the corresponding pixels is determined as a pixel value of a corresponding pixel in the authentication image.

An image synthesizing method according to a fourth aspect of the present disclosure includes: simultaneously outputting first linearly polarized light having a first polarization direction, second linearly polarized light having a second polarization direction, third linearly polarized light having a third polarization direction, and fourth linearly polarized light having a fourth polarization direction; capturing an image when the first linearly polarized light, the second linearly polarized light, the third linearly polarized light, and the fourth linearly polarized light are output; acquiring, from the image, a fifth image in the first polarization direction including a plurality of pixels, a sixth image in the second polarization direction including a plurality of pixels, a seventh image in the third polarization direction including a plurality of pixels, and an eighth image in the fourth polarization direction including a plurality of pixels; synthesizing, on a pixel-by-pixel basis, the fifth image, the sixth image, the seventh image, and the eighth image into an authentication image for iris authentication. The first polarization direction, the second polarization direction, the third polarization direction, the fourth polarization direction are different from each other by 45 degrees. At least one of the simultaneously outputting, the capturing, the acquiring, and synthesizing is executed by at least one control circuit. According to the above aspect, the same effect as the effect of the image synthesizing apparatus according to the fourth aspect of the present disclosure can be obtained.

According to the fourth aspect of the present disclosure, it is possible that in the synthesizing of the authentication image, pixel values of pixels corresponding to one another are compared among the fifth image, the sixth image, the seventh image, and the eighth image, and a smallest pixel value among the pixel values of the corresponding pixels is determined as a pixel value of a corresponding pixel in the authentication image.

According to the fourth aspect of the present disclosure, it is possible that in the synthesizing of the authentication image, pixel values of pixels corresponding to one another are compared among the fifth image, the sixth image, the seventh image, and the eighth image, and an average of the pixel values of the corresponding pixels is determined as a pixel value of a corresponding pixel in the authentication image.

An image synthesizing method according to a fifth aspect of the present disclosure includes: outputting first linearly polarized light having a first polarization direction and second linearly polarized light having a second polarization direction together; capturing an image when the first linearly polarized light and the second linearly polarized light are output; acquiring, from the image, a third image in a third polarization direction including a plurality of pixels and a fourth image in a fourth polarization direction including a plurality of pixels; and synthesizing, on a pixel-by-pixel basis, the third image and the fourth image into an authentication image for iris authentication. The first polarization direction and the second polarization direction are different from each other, the third polarization direction and the fourth polarization direction are different from each other. At least one of the outputting, the capturing the image, the acquiring, and synthesizing is executed by at least one control circuit. According to the above aspect, the same effect as the effect of the image synthesizing apparatus according to the fifth aspect of the present disclosure can be obtained.

An iris authenticating method according to an aspect of the present disclosure includes: acquiring the authentication image generated by the image synthesizing method; acquiring iris authentication information in which a plurality of user identifications (IDs) and a plurality of reference images are associated; and identifying a user ID with reference to the authentication image and the iris authentication information. At least one of the kinds of processing is executed by at least one control circuit. According to the aspect, the same effect as the effect of the image combining method explained above can be obtained. Further, it is possible to highly accurately identify a user by using the authentication image generated by the image synthesizing method.

The comprehensive and specific forms explained above may be realized as a system, an apparatus, a method, an integrated circuit, a computer program, or a computer-readable recording medium such as a recording disk or may be realized as any combination of the system, the apparatus, the method, the integrated circuit, the computer program, and the recording medium. The computer-readable recording medium includes a nonvolatile recording medium such as a CD-ROM. The apparatus may be configured by one or more apparatuses. When the apparatus is configured by two or more apparatuses, the two or more apparatuses may be disposed in one machine or may be separately disposed in separated two or more machines. In this specification and the claims, "apparatus" not only can mean one apparatus but also can mean a system including a plurality of apparatuses.

An image synthesizing apparatus and the like according to the present disclosure is specifically explained below with reference to the drawings. All of the embodiments explained below indicate comprehensive or specific examples. Numerical values, shapes, components, disposition positions and connection forms of the components, steps, the order of the steps, and the like described in the following embodiments are examples and are not meant to limit the present disclosure. Among the components in the following embodiments, components not described in an independent claim indicating a highest-order concept are explained as optional components. The figures are schematic figures and are not always strictly illustrated. Further, in the figures, substantially the same components are denoted by the same reference numerals and signs. Redundant explanation of the components is sometimes omitted or simplified.

First Embodiment

Image synthesizing apparatus 100 and iris authentication system 1 including image synthesizing apparatus 100 according to a first embodiment are explained. In the embodiment explained below, image synthesizing apparatus 100 generates a synthesized image for iris authentication by combining captured images of an eyeball on which polarized lights in different polarization directions are irradiated. Iris authentication system 1 authenticates an iris in the synthesized image for the iris authentication by collating the synthesized image for the iris authentication with an iris image of a database.

[1-1. Configuration of Iris Authentication System 1]

Figure 2:
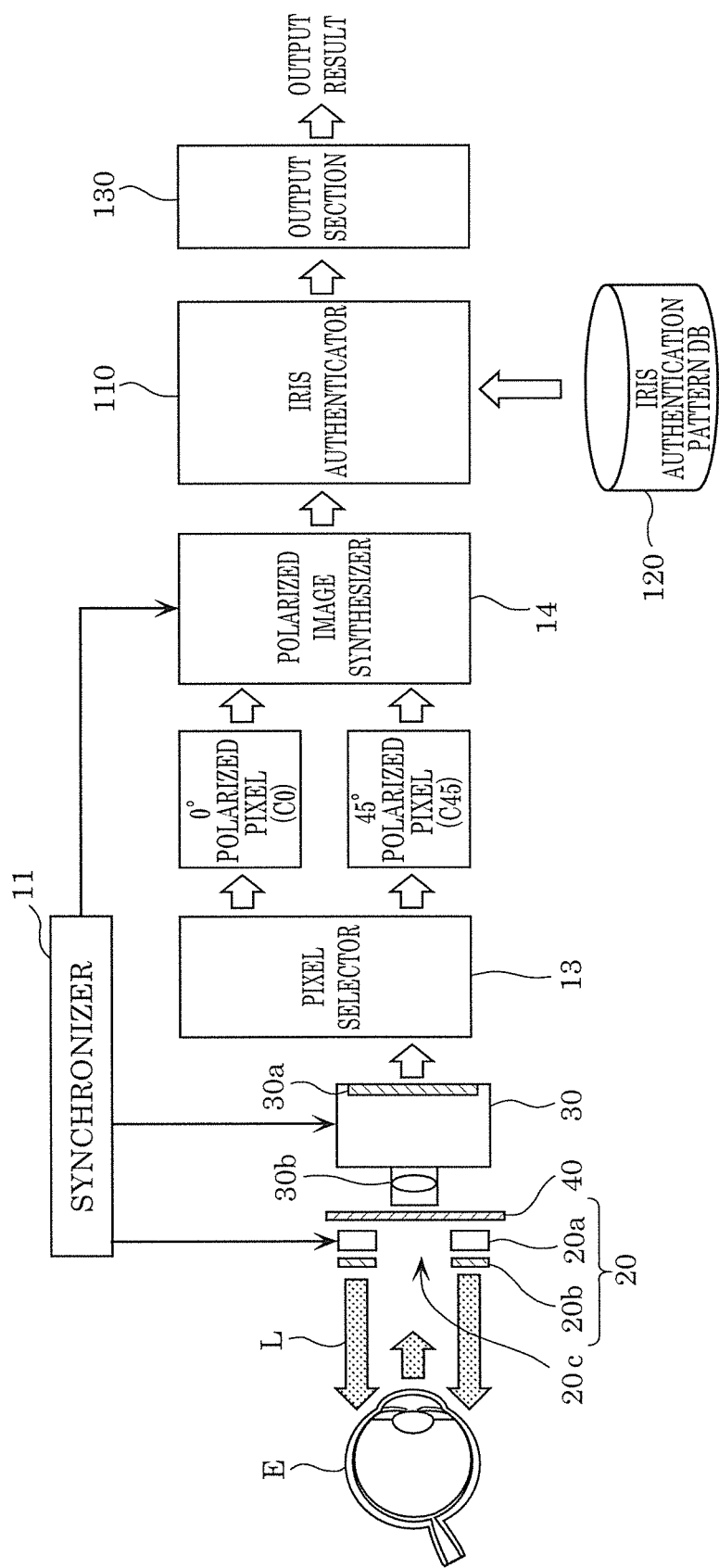
FIG. 2 is a schematic diagram showing an example of a flow of processing by components of the iris authentication system according to the first embodiment.

The configuration of iris authentication system 1 according to the first embodiment is explained. FIG. 1 is a block diagram showing an example of a functional configuration of iris authentication system 1 according to the first embodiment. FIG. 2 is a schematic diagram showing an example of a flow of processing by components of iris authentication system 1 according to the first embodiment. As shown in FIG. 1, iris authentication system 1 includes image synthesizing apparatus 100, iris authenticator 110, iris authentication pattern database (hereinafter referred to as "iris authentication pattern DB" as well) 120, and output section 130. Image synthesizing apparatus 100 includes processor 10, illuminating device 20, and camera 30. Processor 10 includes synchronizer 11, storage 12, pixel selector 13, and polarized image synthesizer 14.

[Image Synthesizing Apparatus 100]

(Illuminating Device 20)

As illustrated in FIGS. 1 and 2, illuminating device 20 of image synthesizing apparatus 100 irradiates polarized light on an object of camera 30. In this embodiment, the object is eyeball E of a person. Illuminating device 20 irradiates lights in two different polarization directions. Illuminating device 20 includes illuminator 20a and polarizer 20b. Illuminator 20a emits light. Polarizer 20b converts the emitted light of illuminator 20a into linearly polarized light. An example of the irradiation light of illuminator 20a is infrared light or visible light. An example of illuminator 20a is a luminaire, an illumination circuit, a light emitting element such as an LED (Light Emitting Diode) element, a bulb such as an infrared bulb, or a laser beam emitting device.

Figure 3:
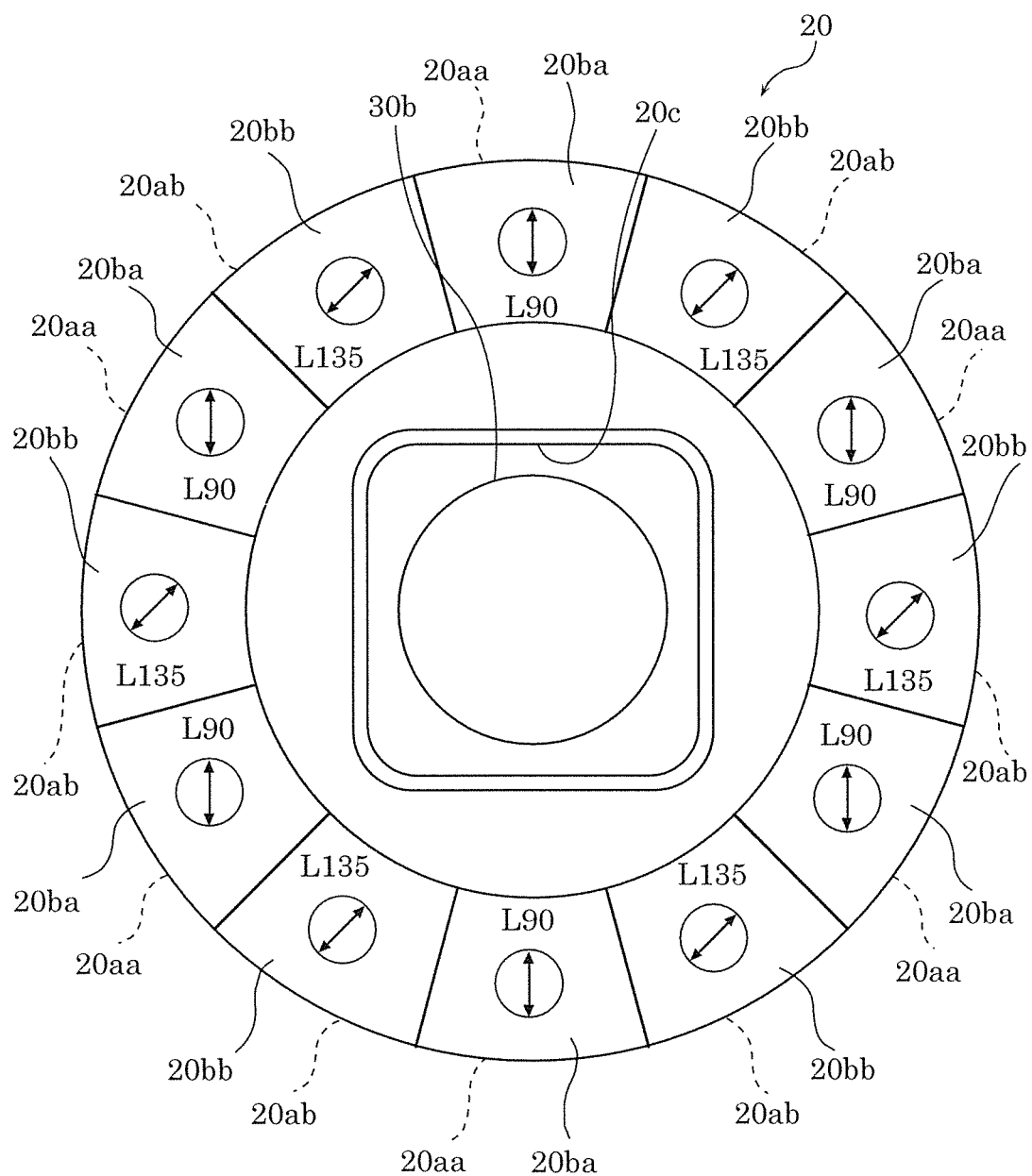
FIG. 3 is a schematic front view of an illuminating device according to the first embodiment.

FIG. 3 is a schematic front view of illuminating device 20 according to the first embodiment. In FIG. 3 and the other figures, a front view and a plan view of the illuminating device are views of the illuminating device viewed while being opposed to an irradiating direction of illumination light and are views of the illuminating device viewed from an object of the camera. In the front view and the plan view of the illuminating device, straight line arrows and circular arrows indicating polarization directions, which are directions of polarization transmission axes explained below, are described. However, the directions of these arrows indicate directions at the time when the object is viewed from the camera, that is, when the object is viewed from the illuminating device.

As shown in FIGS. 2 and 3, illuminator 20a includes a plurality of first light sources 20aa and a plurality of second light sources 20ab disposed in a ring shape around opening 20c. In this embodiment, first light sources 20aa and second light sources 20ab are alternately disposed along the circumference of opening 20c. An example of first light sources 20aa and second light sources 20ab is a light emitting element such as an LED element, a bulb such as an infrared bulb, or a laser light source. Illuminator 20a is configured to cause the plurality of first light sources 20aa to simultaneously emit lights to thereby emit ring-like illumination light. Illuminator 20a is configured to cause the plurality of second light sources 20ab to simultaneously emit lights to thereby emit ring-like illumination light. First light sources 20aa and second light sources 20ab are configured to be lit independently from each other. Such illuminator 20a is a ring light having a two-channel configuration.

Polarizer 20b is a polarizing filter disposed between illuminator 20a and the object. An example of polarizer 20b is a polarizing plate or a polarizing film. Polarizer 20b includes a plurality of first polarizing filters 20ba and a plurality of second polarizing filters 20bb disposed in a ring shape around opening 20c. An example of first polarizing filters 20ba and second polarizing filters 20bb is a polarizing plate or a polarizing film. In this embodiment, first polarizing filters 20ba and second polarizing filters 20bb are alternately disposed along the circumference of opening 20c.

First polarizing filters 20ba have polarization transmission axes in a direction of 90° (90 degrees) at an angle in an image plane in a camera coordinate system of camera 30, that is, an azimuth angle. First polarizing filters 20ba are disposed between first light sources 20aa and the object and changes emitted lights of first light sources 20aa into linearly polarized lights having an azimuth angle of 90°. In the image plane in the camera coordinate system, the azimuth angle increases in a clockwise, that is, right direction. The azimuth angle in the horizontal direction is 0°. The azimuth angle in the vertical direction is 90°. The azimuth angle indicates a direction from the camera toward the object. The same applies to directions of polarization transmission axes of right and left circularly polarized lights. The direction of the right polarization transmission axis is the clockwise direction in the image plane of the camera coordinate system. The direction of the left polarization transmission axis is the counterclockwise direction. When viewed from illuminating device 20 toward camera 30, the directions of the left and the right of the arrows shown in FIG. 3 are reversed. The right and left rotating directions are also reversed. In this specification and the claims, the azimuth angle of the polarization transmission axis is simply represented as "polarization direction".

Second polarizing filters 20bb have the polarization transmission axes in the direction of 135° as the azimuth angle in the image plane in the camera coordinate system of camera 30. The azimuth angles of the polarization transmission axes of first polarizing filters 20ba and second polarizing filters 20bb are different from each other by 45°. Second polarizing filters 20bb are disposed between second light sources 20ab and the object and changes emitted lights of second light sources 20ab to linearly polarized lights at the azimuth angle of 135°. First polarizing filters 20ba and second polarizing filters 20bb are respectively disposed to correspond to first light sources 20aa and second light sources 20ab.

Illuminating device 20 causes first light sources 20aa and second light sources 20ab to temporally sequentially emit lights to thereby temporally sequentially irradiate, on eyeball E of an authentication target person, ring-shaped illumination lights L, which are linearly polarized lights in polarization directions of 90° and 135° different from each other by 45°. Return lights reflected in cornea and iris portions of eyeball E pass through opening 20c in the center of doughnut-type illuminating device 20 and are made incident on camera 30. In this embodiment, band-pass filter 40 is disposed between illuminating device 20 and camera 30. However, band-pass filter 40 is not essential. If band-pass filter 40 is disposed, the return lights from eyeball E pass through band-pass filter 40 and thereafter are made incident on camera 30. The authentication target person may be a specific person present within the field of view of camera 30 or may be any person.

(Camera 30)

As illustrated in FIGS. 1 and 2, camera 30 of image synthesizing apparatus 100 captures a digital image. Camera 30 may capture both of a still image and a moving image. Camera 30 includes polarization imaging element 30a and objective lens 30b. Objective lens 30b receives the return lights reflected on eyeball E and condenses the return lights on polarization imaging element 30a. Polarization imaging element 30a generates an image signal from an image which is formed on polarization imaging element 30a by objective lens 30b.

Figure 4A:
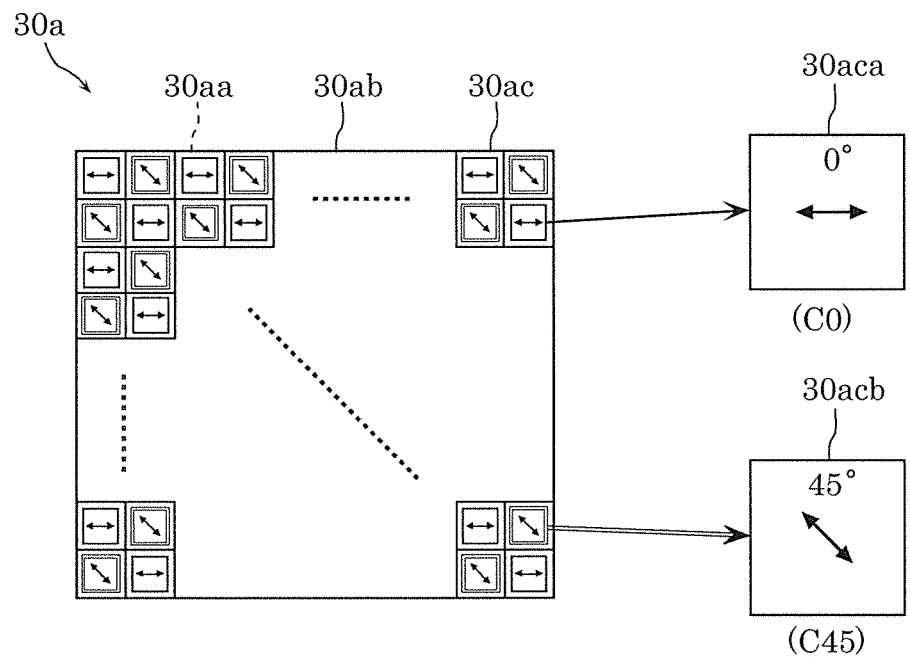
FIG. 4A is a plan view schematically showing the configuration of a polarization imaging element of a camera according to the first embodiment.
Figure 4B:
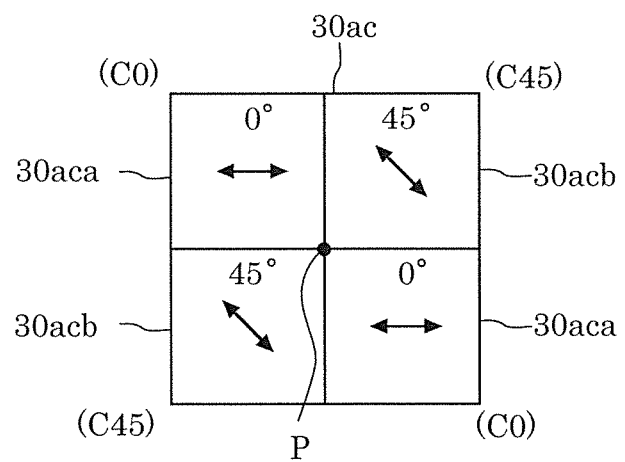
FIG. 4B is a plan view showing one unit of a group of polarizing filters in a mosaic polarizing filter shown in FIG. 4A.

FIG. 4A is a plan view schematically showing the configuration of polarization imaging element 30a of camera 30 according to the first embodiment. FIG. 4B is a plan view showing one unit of a group of polarizing filters in mosaic polarizing filter 30ab shown in FIG. 4A. In FIGS. 4A and 4B and the other figures, a plan view of the polarization imaging element and the group of the polarizing filters is a view at the time when the object is viewed from the camera. In these plan views, straight line arrows and circular arrows indicating polarization directions, which are directions of polarization transmission axes explained below, are described. However, the directions of these arrows indicate directions at the time when the object is viewed from the camera.

As shown in FIG. 4A, polarization imaging element 30a includes imaging element 30aa including light receiving elements and mosaic polarizing filter 30ab disposed on imaging element 30aa. An example of mosaic polarizing filter 30ab is a mosaic polarizing plate or a polarizing film. Imaging element 30aa includes a plurality of light receiving elements respectively corresponding to pixels of an image to be formed. One light receiving element generates a pixel value of one pixel. The light receiving element outputs a signal indicating characteristics of light such as luminance of received light to storage 12 of processor 10. An example of the pixel value is luminance.

An example of imaging element 30aa is an image sensor such as a CMOS (Complementary Metal Oxide Semiconductor) image sensor or a CCD (Charge-Coupled Device) image sensor. Mosaic polarizing filter 30ab is disposed between objective lens 30b and imaging element 30aa and polarizes light made incident on polarization imaging element 30a and outputs the light to imaging element 30aa. Mosaic polarizing filter 30ab is disposed to cover entire imaging element 30aa. An example of mosaic polarizing filter 30ab is a wire grid. Light collected in polarization imaging element 30a from objective lens 30b passes through mosaic polarizing filter 30ab and is thereafter made incident on imaging element 30aa.

As shown in FIGS. 4A and 4B, mosaic polarizing filter 30ab is configured by a planarly disposed plurality of polarizing filters. An example of the polarizing filters is a polarizing plate or a polarizing film. One polarizing filter is disposed with respect to each of the light receiving elements of imaging element 30aa. Such a plurality of polarizing filters are arrayed in a lattice shape in the same manner as the light receiving elements. The plurality of polarizing filters are configured by a plurality of first linear polarizing filters 30aca and a plurality of second linear polarizing filters 30acb. In the image plane in the camera coordinate system of camera 30, an azimuth angle, which is an angle of polarization transmission axes, of first linear polarizing filters 30aca is 0° and an azimuth angle of polarization transmission axes of second linear polarizing filters 30acb is 450. An axis of the azimuth angle 0° is a reference axis in the horizontal direction of camera 30 and imaging element 30aa. The plurality of first linear polarizing filters 30aca and the plurality of second linear polarizing filters 30acb and the plurality of light receiving elements of imaging element 30aa are arranged in a lattice shape in the direction of the azimuth angle 0° and the direction of the azimuth angle 90°. The azimuth angle 0° of the polarization transmission axes of first linear polarizing filters 30aca is perpendicular to the azimuth angle 90° of the polarization transmission axes of first polarizing filters 20ba of illuminating device 20. The azimuth angle 45° of the polarization transmission axes of second linear polarizing filters 30acb is perpendicular to the azimuth angle 135° of the polarization transmission axes of second polarizing filters 20bb of illuminating device 20. That is, the azimuth angles of the polarization transmission axes of first linear polarizing filters 30aca and second linear polarizing filters 30acb are set to be perpendicular to the azimuth angles of the polarization transmission axes of first polarizing filters 20*ba* and second polarizing filters 20*bb* of illuminating device 20.

Two first linear polarizing filters 30*aca* and two second linear polarizing filters 30*acb* are disposed adjacent to each other centering on one point P. First linear polarizing filters 30*aca* and second linear polarizing filters 30*acb* are alternately disposed in a rotating direction centering on the point P. Such two first linear polarizing filters 30*aca* and two second linear polarizing filters 30*acb* form one polarizing filter group 30*ac*. In one polarizing filter group 30*ac*, two first linear polarizing filters 30*aca* and two linear polarizing filters 30*acb* are disposed in a square shape in an array of 2×2, that is, disposed in a lattice shape.

In mosaic polarizing filter 30*ab*, a plurality of polarizing filter groups 30*ac* are arrayed in a lattice shape, that is, a mosaic shape. The plurality of first linear polarizing filters 30*aca* and the plurality of second linear polarizing filters 30*acb* are arrayed in a lattice shape, that is, a mosaic shape. First linear polarizing filters 30*aca* and the light receiving elements of imaging element 30*aa* form a micro polarized pixel that polarizes incident light in the direction of 0° and receives the incident light. Second linear polarizing filters 30*acb* and the light receiving elements of imaging element 30*aa* form a micro polarized pixel that polarizes incident light in the direction of 45° and receives the incident light. One image acquired by such polarization imaging element 30*a* includes polarized pixels, which are pixels polarized in the directions of 0° and 45°. Mosaic polarizing filter 30*ab* only has to include polarizing filters having two kinds of polarization transmission axes perpendicular to the azimuth angles of the polarization transmission axes of first polarizing filters 20*ba* and second polarizing filters 20*bb* of illuminating device 20. Therefore, the mosaic polarizing filter may be configured by four kinds of polarizing filters formed by more general polarization transmission axes of 0°, 45°, 90°, and 135°. In this case, in the polarization imaging element, a polarized pixel including a pertinent polarization transmission axis may be selected and used.

In camera 30 explained above, light reflected on eyeball E is focused on mosaic polarizing filter 30*ab* by objective lens 30*b* and further polarized by mosaic polarizing filter 30*ab* and thereafter received by imaging element 30*aa*. Imaging element 30*aa* outputs information such as a signal indicating characteristics of the light detected by the light receiving elements to storage 12 of processor 10. At this time, imaging element 30*aa* captures an image through exposure on the basis of a signal of synchronizer 11 of processor 10 in each of periods in which illuminating device 20 alternately lights first light source 20*aa* and second light source 20*ab*. Camera 30 can simultaneously acquire, from substantially the same visual point, polarized images formed by two kinds of polarized pixels via polarizing filters in different polarization transmission axis directions of 0° and 45° in respective lighting periods. By using such polarized images, it is possible to easily perform image processing in which pixels of these polarized images are matched.

(Processor 10)

The components of processor 10 of image synthesizing apparatus 100 are explained with reference to FIGS. 1 and 2. The components including synchronizer 11, pixel selector 13, and polarized image synthesizer 14 of processor 10 may be configured by a computer system (not shown in FIGS. 1 and 2) including a processor such as a CPU (Central Processing Unit) or a DSP (Digital Signal Processor) and memories such as a RAM (Random Access Memory) and a ROM (Read-Only Memory). Functions of a part or all of the components may be achieved by the CPU or the DSP executing computer programs recorded in the ROM using the RAM as a work memory. The functions of a part or all of the components may be achieved by a dedicated hardware circuit such as an electronic circuit or an integrated circuit. The functions of a part or all of the components may be configured by a combination of the software functions and a hardware circuit. The computer programs may be provided as applications through communication via a communication network such as the Internet, communication by a mobile communication standard, or another wireless network, a wired network, broadcast, or the like. Processor 10 is an example of a control circuit.

Storage 12 enables storage and extraction of various kinds of information. For example, storage 12 stores a captured image acquired by camera 30. Storage 12 may store computer programs for causing processor 10 and/or camera 30 to operate. These computer programs may be stored in not-shown memories included in processor 10 and camera 30. Storage 12 is realized by a storage device such as a semi-conductor memory such as a ROM, a RAM, or a flash memory, a hard disk drive, or an SSD (Solid State Drive).

Synchronizer 11 controls the operations of illuminating device 20 and camera 30 to synchronize timing of two kinds of illumination of illuminating device 20 and timing of imaging of camera 30. Specifically, synchronizer 11 controls lighting and extinction of each of first light source 20*aa* and second light source 20*ab* of illuminating device 20 and temporally sequentially lights first light source 20*aa* and second light source 20*ab*. Further, synchronizer 11 causes camera 30 to perform imaging at least once during the lighting of first light source 20*aa* and causes camera 30 to acquire at least one image. Synchronizer 11 causes camera 30 to perform imaging at least once during the lighting of second light source 20*ab* and causes camera 30 to acquire at least one image. Further, synchronizer 11 outputs imaging timing of camera 30 during the lighting of first light source 20*aa* and imaging timing of camera 30 during the lighting of second light source 20*ab* to polarized image synthesizer 14.

Pixel selector 13 generates two kinds of polarized images by performing re-accumulation processing of pixels acquired via first liner polarizing filters 30*aca* and pixels acquired via second linear polarizing filters 30*acb* in an image acquired by polarization imaging element 30*a* of camera 30. A first polarized image of the two kinds of polarized images is an image formed by polarized pixels C0, which are pixels acquired via first linear polarizing filters 30*aca*. A second polarized image is an image formed by polarized pixels C45, which are pixels acquired via second linear polarizing filters 30*acb*. In the following explanation, a polarized pixel acquired via a linear polarizing filter, a direction of a polarization transmission axis of which is α°, is represented as "polarized pixel Cα" as well. Pixel selector 13 acquires a captured image of camera 30 from storage 12, generates, from the captured image, a polarized image formed by polarized pixels C0 and a polarized image formed by polarized pixels C45, and outputs the polarized images to polarized image synthesizer 14. When longitudinal and lateral sizes of the captured image of polarization imaging element 30*a* are respectively represented as H and W, both the polarized images are reduced images having a longitudinal size of H/2 and a lateral size of W/2. The positions of pixels between the polarized images can be regarded as the same sampling positions with almost no positional deviation.

Polarized image synthesizer 14 associates the imaging timings of camera 30 during the lighting of first light source 20*aa* and second light source 20*ab* acquired from synchronizer 11 and the polarized images respectively formed by polarized pixels C0 and polarized pixels C45 acquired from pixel selector 13. For example, the captured image of camera 30 includes information concerning imaging time. The polarized image generated from the captured image includes the same information concerning the imaging time. Polarized image synthesizer 14 specifies a light source lit during the imaging of the polarized image by associating the imaging time of the polarized image and the imaging timings in the lightings. Polarized image synthesizer 14 synthesizes, into an image, polarized images of two captured images captured during adjacent two lighting periods of first light source 20*aa* and second light source 20*ab*. Specifically, polarized image synthesizer 14 combines polarized image L90C0 formed by polarized pixels C0 of a captured image captured during a lighting period of first light source 20*aa*, that is, an illumination period of 90° linearly polarized light (represented as "linearly polarized illumination L90" or "linearly polarized light L90" as well) and polarized image L135C45 formed by polarized pixels C45 of a captured image captured during a lighting period of second light source 20*ab*, that is, during an illumination period of 135° linearly polarized light (represented as "linearly polarized illumination L135" or "linearly polarized light L135" as well). Polarized image synthesizer 14 combines the images as explained above to thereby generate a synthesized image for authentication for authenticating an owner of eyeball E. Polarized image synthesizer 14 outputs the synthesized image for authentication to iris authenticator 110. The two lighting periods corresponding to the two captured images do not have to adjacent to each other.

[Iris Authenticator 110]

Iris authenticator 110 collates information concerning a plurality of reference images stored in iris authentication pattern DB 120 and a synthesized image for authentication to thereby identify a user ID, that is, identification information corresponding to the synthesized image for authentication. The plurality of reference images are images including images of eyeballs of people and are associated with user IDs of owners of the eyeballs. The reference images and the user IDs are associated with each other and stored in iris authentication pattern DB 120 as iris authentication information. For example, iris authenticator 110 determines a reference image having predetermined or higher similarity to the synthesized image for authentication out of the plurality of reference images and identifies a user ID associated with the determined reference image. The plurality of reference images are typically binary image patterns disclosed in Patent Literature 1. For example, similarity between each of the plurality of reference images and the synthesized image for authentication is calculated as an inter-signal distance. Details of this processing are referred to in Patent Literature 1. Iris authenticator 110 outputs an identifying result of the user ID to output section 130.

Iris authenticator 110 may have any one of the configurations illustrated concerning the components of processor 10 of image synthesizing apparatus 100. Iris authenticator 110 may be disposed in a machine mounted with image synthesizing apparatus 100 or may be disposed in another machine different from the machine. Iris authenticator 110 disposed in the other machine may exchange information with image synthesizing apparatus 100 via wired communication or wireless communication. The wired communication and the wireless communication may be respectively any kinds of communication.

[Iris Authentication Pattern DB 120]

Iris authentication pattern DB 120 stores iris authentication information including reference images and user IDs. Iris authentication pattern DB 120 may have any one of the configurations illustrated concerning storage 12. In iris authentication pattern DB 120, one reference image may be stored or a plurality of reference images may be stored for one user ID. The reference image is an image including an image of an eyeball, that is, an iris of a person corresponding to the user ID. Iris authentication pattern DB 120 may be disposed in a machine mounted with image synthesizing apparatus 100 or may be disposed outside the machine. Iris authentication pattern DB 120 disposed outside the machine may exchange information with image synthesizing apparatus 100 via wireless communication. In this case, iris authentication pattern DB 120 may be disposed in a cloud server and perform the wireless communication with image synthesizing apparatus 100 via a communication network such as the Internet or may perform any other kind of wireless communication.

[Output Section 130]

Output section 130 outputs an authentication result by iris authenticator 110 to a machine or the like on the outside of iris authentication system 1. Output section 130 may visually and/or auditorily output the authentication result to a display device such as a display and a speaker. Output section 130 may output the authentication result to the external machine via wireless communication. When a user ID corresponding to a synthesized image for authentication is identified by iris authenticator 110, output section 130 may output information concerning the user. When a user ID is not identified, output section 130 may output information indicating that authentication is impossible. Output section 130 may have any one of the configurations illustrated concerning the components of processor 10. Output section 130 may be an interface for connection to an external apparatus or the like. Output section 130 may be disposed in a machine mounted with image synthesizing apparatus 100 or, like iris authenticator 110, may be disposed in another machine different from the machine.

In this embodiment, the not-shown controller of polarization imaging element 30*a* of camera 30, processor 10, and iris authenticator 110 configure processors different from one another. However, all of the controller, processor 10, and iris authenticator 110 may configure the same processor. Any two of the controller, processor 10, and iris authenticator 110 may configure the same processor.

[1-2. Details of the Processing of Image Synthesizing Apparatus 100]

Figure 5A:
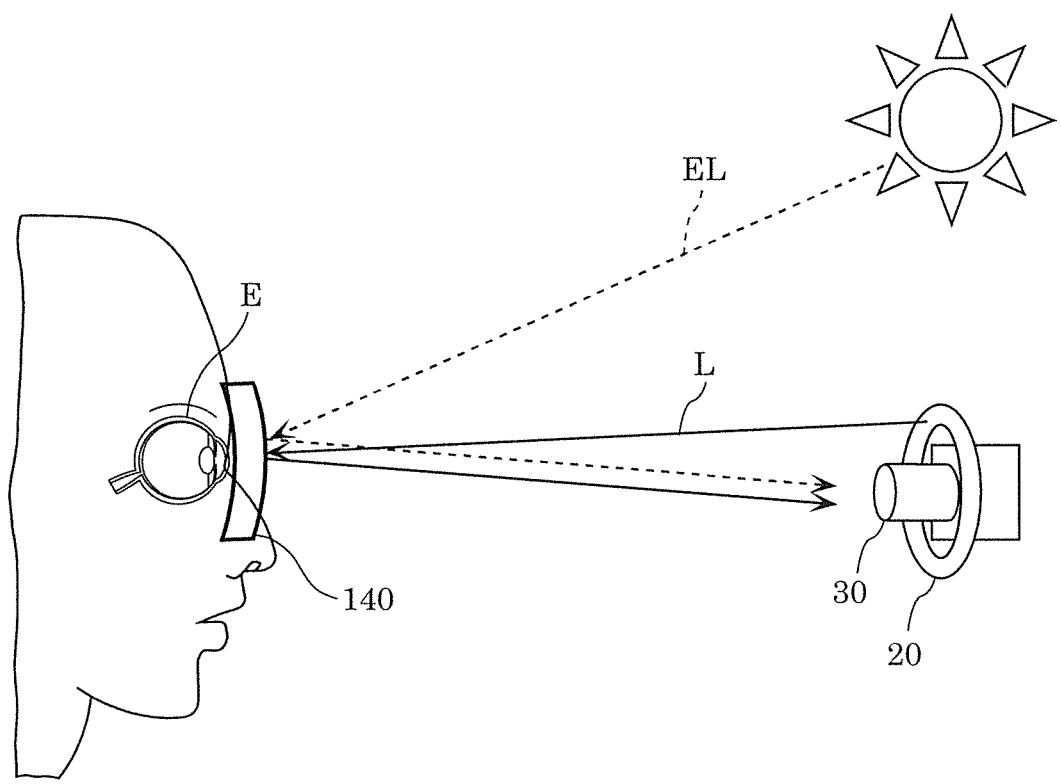
FIG. 5A is a schematic diagram showing a situation in which environment light and illumination light are specularly reflected on a cornea or an eyeglass.
Figure 5B:
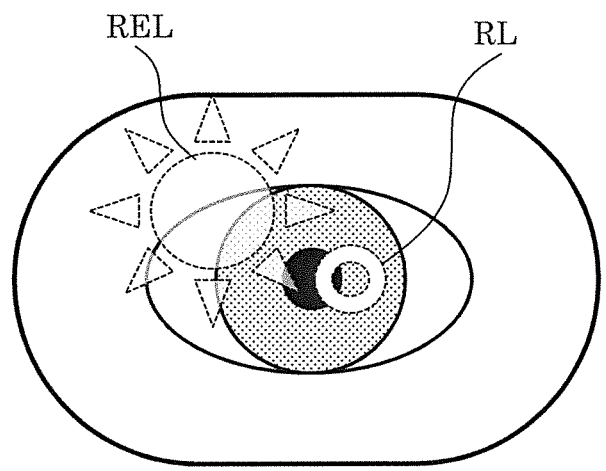
FIG. 5B is a front view of the eyeglass in FIG. 5A.
Figure 5C:
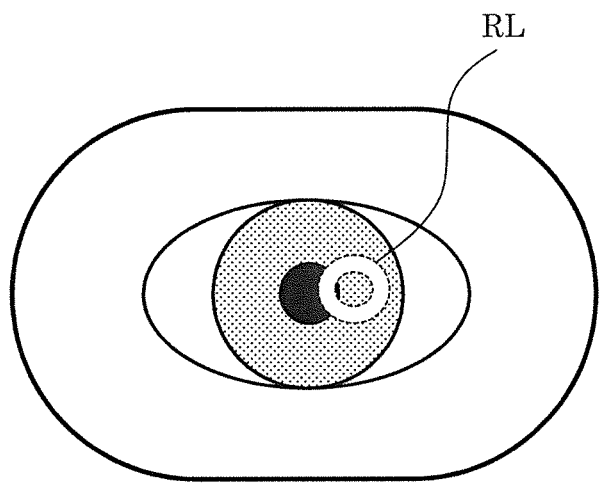
FIG. 5C is a front view of the cornea in FIG. 5A.

Details of the processing of image synthesizing apparatus 100 are explained. First, reflection of light on an eye of a person is explained. FIG. 5A is a schematic diagram showing a situation in which environment light and illumination light are specularly reflected on a cornea or an eyeglass. FIG. 5B is a front view of the eyeglass shown in FIG. 5A. FIG. 5C is a front view of the cornea shown in FIG. 5A. In the following explanation, illuminating device 20 is explained as an IR illuminating device that emits infrared light.

As shown in FIG. 5A, when a face of a person is photographed using illuminating device 20 indoors or outdoors, illumination light L of linearly polarized light of illuminating device 20 and environment light EL, which is external light from an ambient environment such as sunlight, are simultaneously directly made incident on eyeball E of the person. Alternatively, when the person wears eyeglass 140, illumination light L and environment light EL are simultaneously directly made incident on eyeglass 140. Illumination light L has an IR wavelength region. Illumination light L and environment light EL are reflected on a cornea surface of eyeball E and a glass surface of eyeglass 140 and generate a high-luminance reflection spot by strong specular reflection on the cornea surface and the glass surface. FIG. 5B shows an example of captured images of regions of the eyeglass and the eyeball captured when the person wears eyeglass 140 and shows a typical specular reflection state on the glass surface of eyeglass 140. In the captured image shown in FIG. 5B, both of specular reflection portion REL by environment light EL and specular reflection portion RL by illumination light L are observed. FIG. 5C shows an example of a captured image of the region of the eyeball captured when image synthesizing apparatus 100 includes band-pass filter 40 that cuts wavelength regions other than the IR wavelength region of illumination light L. By using such band-pass filter 40, specular reflection portion REL by environment light EL can be removed.

Figure 6:
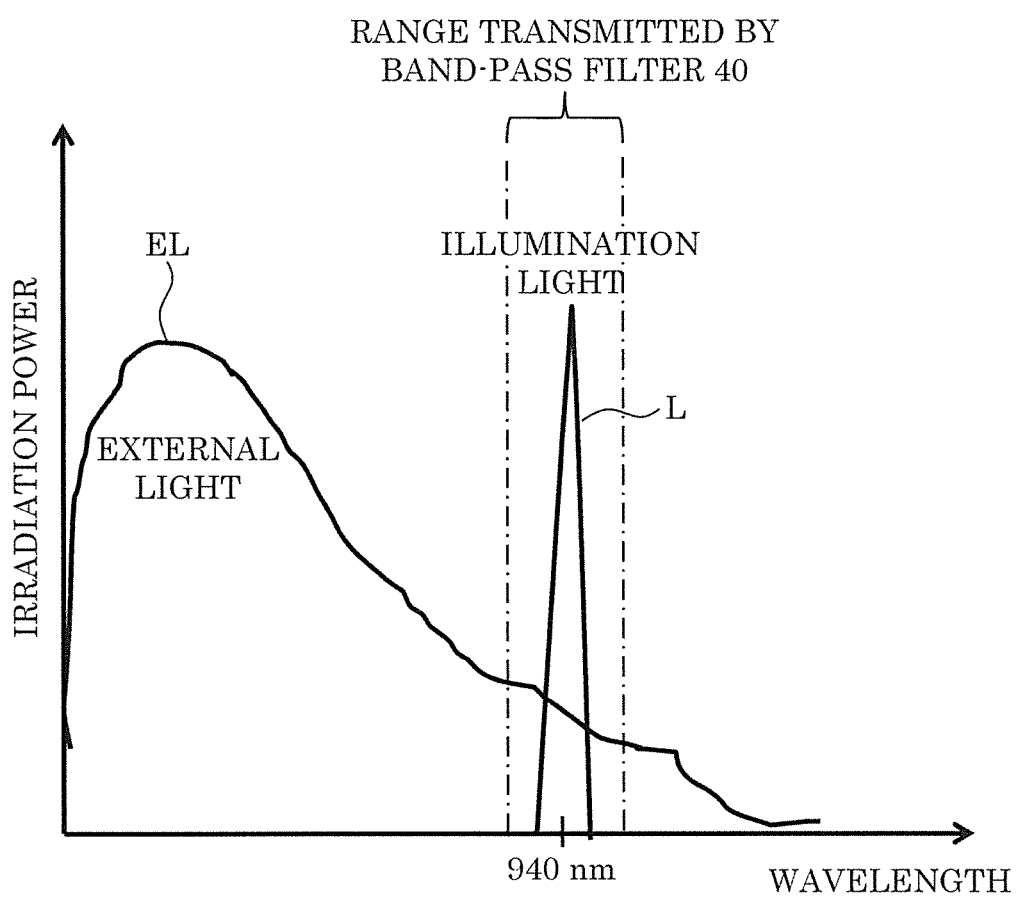
FIG. 6 is a diagram showing a removal characteristic of specular reflection of the environment light in a band-pass filter.

Functions of band-pass filter 40 are explained. FIG. 6 is a diagram showing a removal characteristic of specular reflection of environment light EL in band-pass filter 40. For example, when a wavelength of illumination light L is typically set to 940 nm, a narrow-band filter having a transmission range near 940 nm is used as optimum band-pass filter 40. Consequently, it is evident that reflected light by light other than illumination light L of 940 nm can be removed. However, specular reflection portion RL by illumination light L cannot be removed by this method.

Figure 7A:
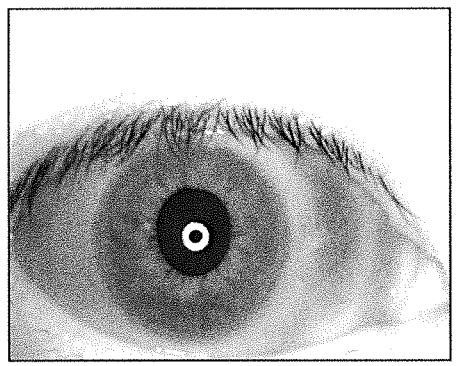
FIG. 7A is a diagram showing a generation state of specular reflection of the illumination light in the cornea right opposed to the camera.
Figure 7B:
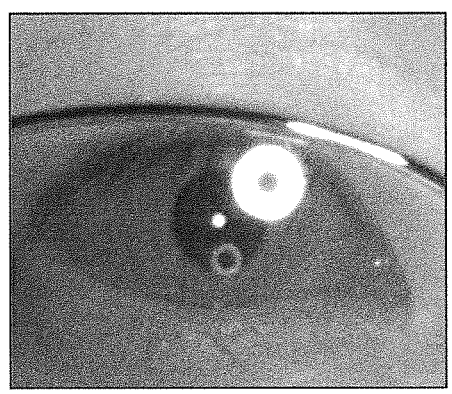
FIG. 7B is a diagram showing a generation state of specular reflection of the illumination light in the eyeglass and the cornea right opposed to the camera.
Figure 7C:
FIG. 7C is a diagram showing a generation state of specular reflection of the illumination light in the cornea obliquely facing the camera.

For example, FIG. 7A is a diagram showing a generation state of specular reflection of illumination light on a cornea right opposed to camera 30. FIG. 7B is a diagram showing a generation state of specular reflection of illumination light on an eyeglass and a cornea right opposed to camera 30. FIG. 7C is a diagram showing a generation state of specular reflection of illumination light on a cornea obliquely facing camera 30. As shown in FIG. 7A, in a naked eye right opposed to camera 30, a reflected image of ring-like illumination light is located on the inside on substantially the center of a black pupil. The reflected image of the illumination light is located on the inside on substantially the center of the black pupil because the position of illuminating device 20, which is ring illumination, is nearly coaxial with an imaging line of sight of camera 30 and because of an effect that a virtual image of the ring-like illumination light is reduced by a convex curved surface of the cornea. In iris authentication, an image of a pupil portion is not used and an image of an iris portion is used. Therefore, if the reflected image of the illumination light is in such a state, there is no problem in the iris authentication.

However, as shown in FIG. 7B, in an eyeball in a worn state of an eyeglass, since a glass surface of the eyeglass is substantially flat, reflected image of ring-like illumination light on the glass surface of the eyeglass is extremely large. Therefore, a saturation region of illuminance of the reflected image of the illumination light hides the pupil and the iris. Since multiple reflection occurs between the glass surface of the eyeglass and the cornea surface, a large number of reflected images appear and hide the iris, that is, an iris pattern.

As shown in FIG. 7C, in the case of an oblique naked eye in which the line of sight deviates from an imaging line of sight even if the eyeglass is not worn, a reflected image of the ring-like illumination light is located in an iris region. Therefore, a part of an image of the iris, that is, the iris pattern important for authentication lacks.

It has been known that polarization imaging is effective for removal of the specular reflection of this type. Therefore, there is a polarization imaging method for creating, using linearly polarized light of IR illumination light and a polarizing filter set in a camera, an orthogonal polarization state in which polarization directions are orthogonal between the linearly polarized light and the polarizing filter. However, when an eyeball is imaged in such an orthogonal polarization state, there is a significant problem in that a birefringent pattern, which is an image due to birefringence of a cornea is generated in a captured image, the birefringent pattern is superimposed on an iris, and accurate iris authentication cannot be performed.

Figure 8A:
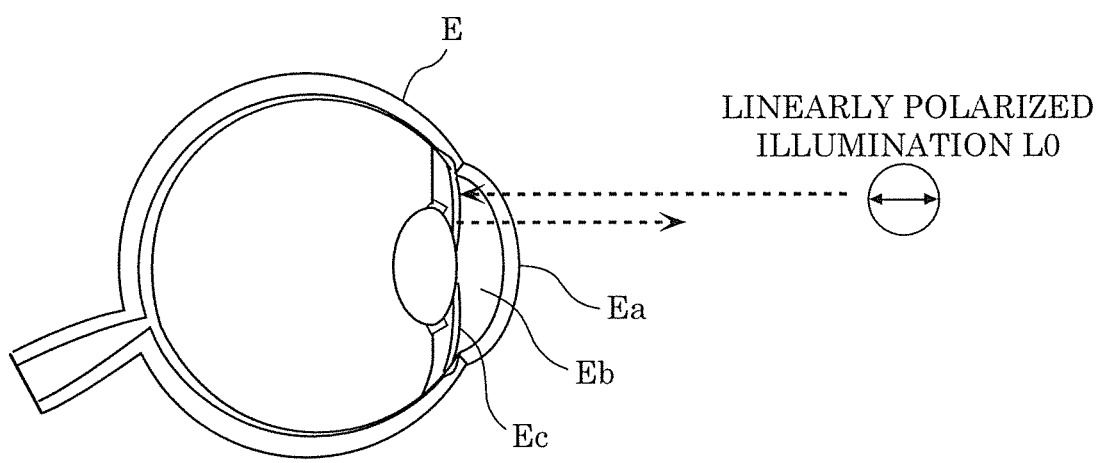
FIG. 8A is a schematic diagram for explaining a birefringence phenomenon in the cornea and is a schematic diagram showing a situation in which linearly polarized illumination is made incident and reflected on the cornea.
Figure 8B:
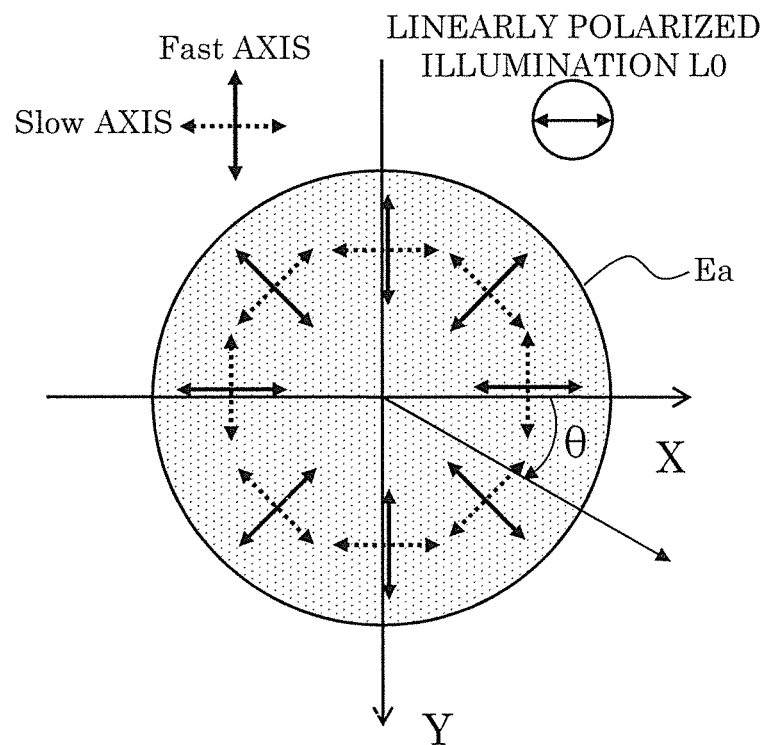
FIG. 8B is a diagram for explaining the birefringence phenomenon in the cornea and is a schematic front view showing the linearly polarized light illumination made incident on the cornea.
Figure 8C:
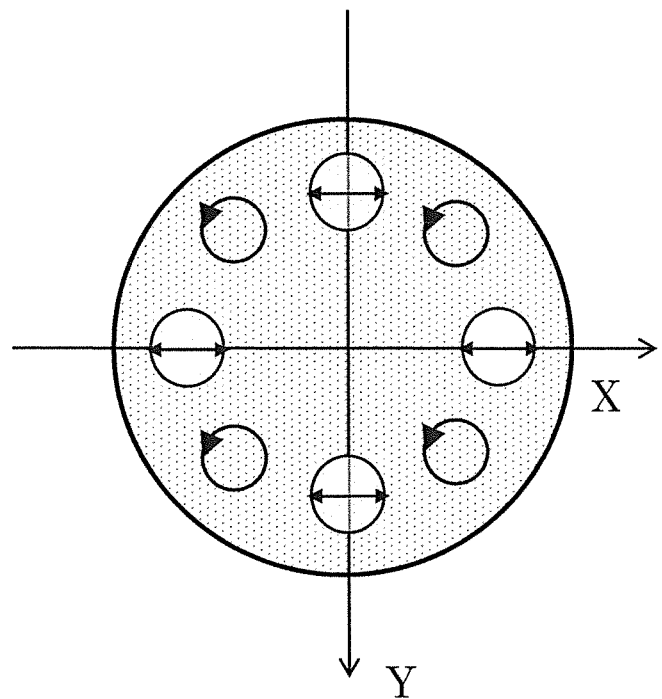
FIG. 8C is a diagram for explaining the birefringence phenomenon in the cornea and is a schematic front view showing the linearly polarized illumination reflected on the cornea.

The birefringent pattern generated in the cornea is explained with reference to FIGS. 8A to 8C. FIG. 8A is a diagram for explaining a birefringence phenomenon in the cornea and is a schematic diagram showing a situation in which linearly polarized illumination is made incident and reflected on the cornea. FIG. 8B is a diagram for explaining the birefringence phenomenon in the cornea and is a schematic front view showing linearly polarized illumination made incident on the cornea. FIG. 8C is a diagram for explaining the birefringence phenomenon in the cornea and is a schematic front view showing the linearly polarized illumination reflected on the cornea.

According to Non Patent Literature 1, a cornea of an eyeball has different refractive indexes respectively in an r direction and a θ direction in a polar coordinate system viewed from the front. The r direction is a radial direction from the center of the cornea and the θ direction is a rotating direction around the center of the cornea. A constituent substance of such a cornea is called birefringent substance. When linearly polarized light is made incident on the birefringent substance, the linearly polarized light is transmitted while vibrating in two vibrating directions. Since speeds of light in the two vibrating directions in a process of the transmission are different, deviation occurs in phases of the vibration in the two vibrating directions. The linearly polarized light sometimes changes to elliptically polarized light or circularly polarized light. In this specification and the claims, the circularly polarized light and the elliptically polarized light are collectively described as "circularly polarized light" in some cases or described as "elliptically polarized light" in other cases. Accordingly, both of the "circularly polarized light" and the "elliptically polarized light" can include the circularly polarized light and the elliptically polarized light.

As shown in FIG. 8A, when linearly polarized light L0 is made incident on cornea Ea of eyeball E from right above, that is, the front of cornea Ea, a part of linearly polarized light L0 changes to boundary reflected light between the air and cornea Ea. The remaining light of linearly polarized light L0 is transmitted through transparent cornea Ea and aqueous humor Eb, reaches opaque iris Ec, and reflects. The reflected light is transmitted through aqueous humor Eb and cornea Ea again, emitted into the air, and reaches camera 30. In a process in which the linearly polarized light is transmitted through the cornea twice, phases of the lights in the two vibrating directions of the linearly polarized light deviate from each other in the r direction and the θ direction. The linearly polarized light changes to elliptically polarized light and reaches camera 30. Linearly polarized light L0 is linearly polarized light having a vibration surface perpendicular to the paper surface and in a direction of 0° along a horizontal plane including a broken line.

FIG. 8B shows a distribution of an F (Fast) axis and an S (Slow) axis of birefringence at the time when cornea Ea is viewed from the front. The Fast axis is called a phase advancing axis as well and is an axis in a direction in which traveling speed of light is high, that is, a phase advances. The Slow axis is called a phase delaying axis as well and is an axis in a direction which traveling speed of light is low, that is, a phase is delayed. The Fast axis and the Slow axis are orthogonal. In FIG. 8B, setting is assumed in which an axis in the r direction is the Fast axis and an axis in the θ direction is the Slow axis. When FIG. 8B is considered as an orthogonal coordinate system of an X axis and a Y axis, only directions of the X axis corresponding to 0=0° and 180° and directions of the Y axis corresponding to 0=90° and 270° are special directions. At this time, one of the F axis and the S axis coincides with one of the Y axis and the X axis. The other of the F axis and the S axis coincides with the other of the Y axis and the X axis.

FIG. 8C shows a distribution of a state of polarized light reaching camera 30 in front of cornea Ea considering the effect of birefringence. FIG. 8C shows how linearly polarized light L0 in polarization direction 0° made incident on cornea Ea is affected by the distribution of the F axis and the S axis. When the directions of the F axis and the S axis are the directions of the X axis and the Y axis, even if a phase shift occurs in the light in the two vibrating directions, only a phase shift occurs in linearly polarized light L0. Incident linearly polarized light L0 reflects and returns in the same polarization state. When the directions of the F axis and the S axis are directions of angles other than the X axis and the Y axis, a phase difference occurs between lights obtained by decomposing linearly polarized light L in the vibrating directions of the X-axis direction and the Y-axis direction. Therefore, a combination result of these lights forms elliptically polarized light. FIG. 8C shows a state in which, in particular, linearly polarized light L0 changes to elliptically polarized light when the directions of the F axis and the S axis form 45 degrees with the X axis and the Y axis. In this case, a phase difference between lights in the two vibrating directions is the largest.

Figure 9:
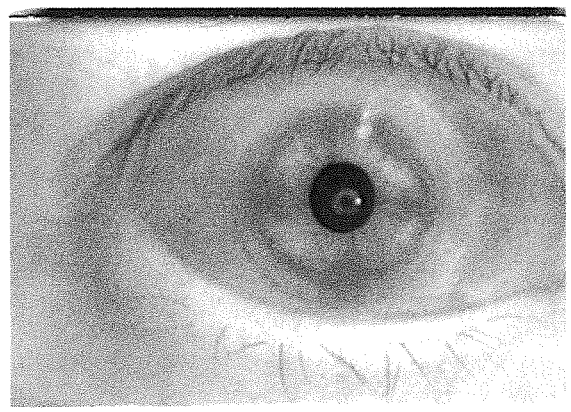
FIG. 9 is a diagram schematically showing an example of a generation state of a black cross pattern in the cornea.
Figure 9:
Figure 9:
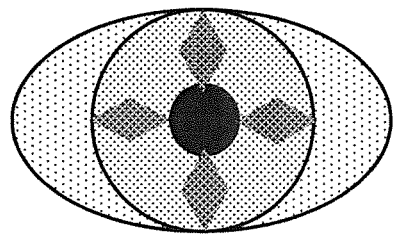

FIG. 9 shows a typical example of a birefringent pattern reflected on a captured image of the camera by the effect of birefringence of the cornea explained above. Specifically, FIG. 9 schematically shows an example of a generation state of a black cross pattern in the cornea. When linearly polarized light of illumination light having a light amount=1 reflected on the eyeball and directly returning as the linearly polarized light is imaged by camera 30 which is a polarizing camera that can observe the polarization state, in an orthogonal polarization state in which polarization directions of the illumination light and the polarizing filters of camera 30 are orthogonal, ideally, the luminance of a polarized pixel corresponding to the polarizing filter is 0. In a parallel polarization state in which the polarization directions of the illumination light and the polarizing filter are parallel, ideally, the luminance of the polarized pixel corresponding to the polarizing filter is 1. However, when linearly polarized light having a light amount=1 returns as circularly polarized light, the luminance of the polarized pixel is ½ in both of the parallel and orthogonal states of the polarization directions of the illumination light and the polarizing filter. Therefore, when a distribution of a polarization state is different on a two-dimensional plane on which the cornea is viewed from the front, in a captured image, the distribution of the polarization state appears as a luminance pattern of light and dark.

Specifically, in an orthogonal polarization state in which the polarization direction of the illumination light is 0° and the polarization direction of the polarizing filter of camera 30 is 90° (hereinafter represented as "orthogonal polarization state L0C90" as well), pixels on the X axis and the Y axis show an image of the directly returning linearly polarized light. Therefore, ideally, the pixels have the luminance=0 and are dark. However, pixels on axes in oblique directions with respect to the X axis and the Y axis show an image of circularly polarized light. Therefore, the pixels have the luminance=½ and are gray. Consequently, a so-called "black cross pattern" appears as shown in image L0C90 and an image L0C90 image of FIG. 9.

Figure 10A:
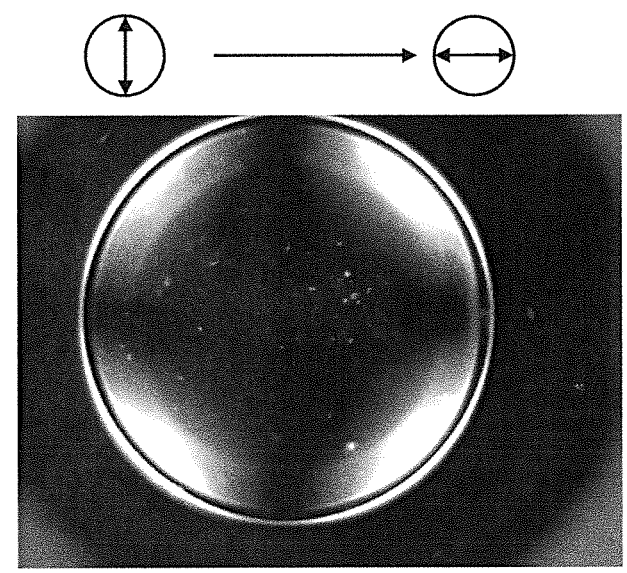
FIG. 10A is a diagram showing an example of a pattern for generating a black cross using a convex lens that changes according to a polarization direction.
Figure 10B:
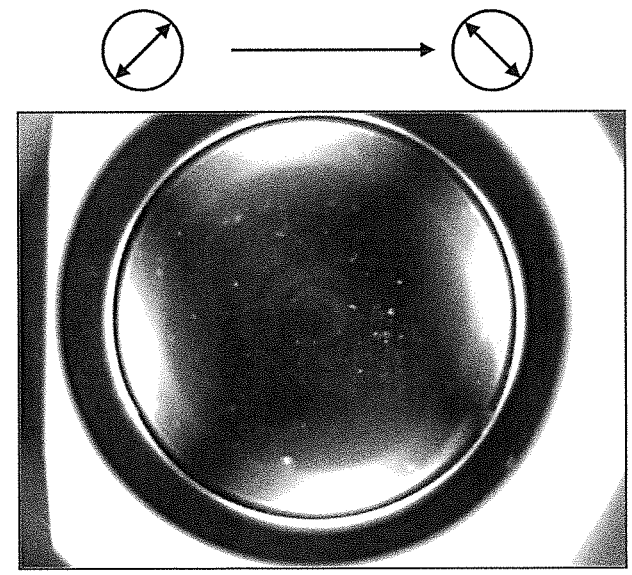
FIG. 10B is a diagram showing an example of a pattern for generating a black cross using the convex lens that changes according to the polarization direction.

Behaviors of the black cross pattern observed by disposing a simulative cornea, in which a convex lens is used, on a reflecting plate are explained with reference to FIGS. 10A and 10B. FIGS. 10A and 10B are diagrams showing an example of a pattern for generating a black cross using the convex lens that changes according to a polarization direction. FIG. 10A shows captured image L90C0 of a camera including polarized pixels in a polarization direction 0° at the time when linearly polarized light L90 in a polarization direction 90° is irradiated from above, that is, the front of the convex lens. In captured image L90C0 in the case in which an orthogonal polarized image is observed, black regions of the black cross pattern appeared in upper, lower, left, and right positions. FIG. 10B shows captured image L135C45 of a camera including polarized pixels at a polarization direction 45° at the time when linearly polarized light L135 in a polarization direction 135° is irradiated from the front of the convex lens. Captured image L135C45 also corresponds to the case in which the orthogonal polarized image is observed. In this case, it is seen that the black cross pattern rotates 450 with respect to FIG. 10A. Captured image L90C0 corresponds to polarized image L90C0 used for synthesis by polarized image synthesizer 14. Captured image L135C45 corresponds to polarized image L135C45 used for synthesis by polarized image synthesizer 14.

Figure 11A:
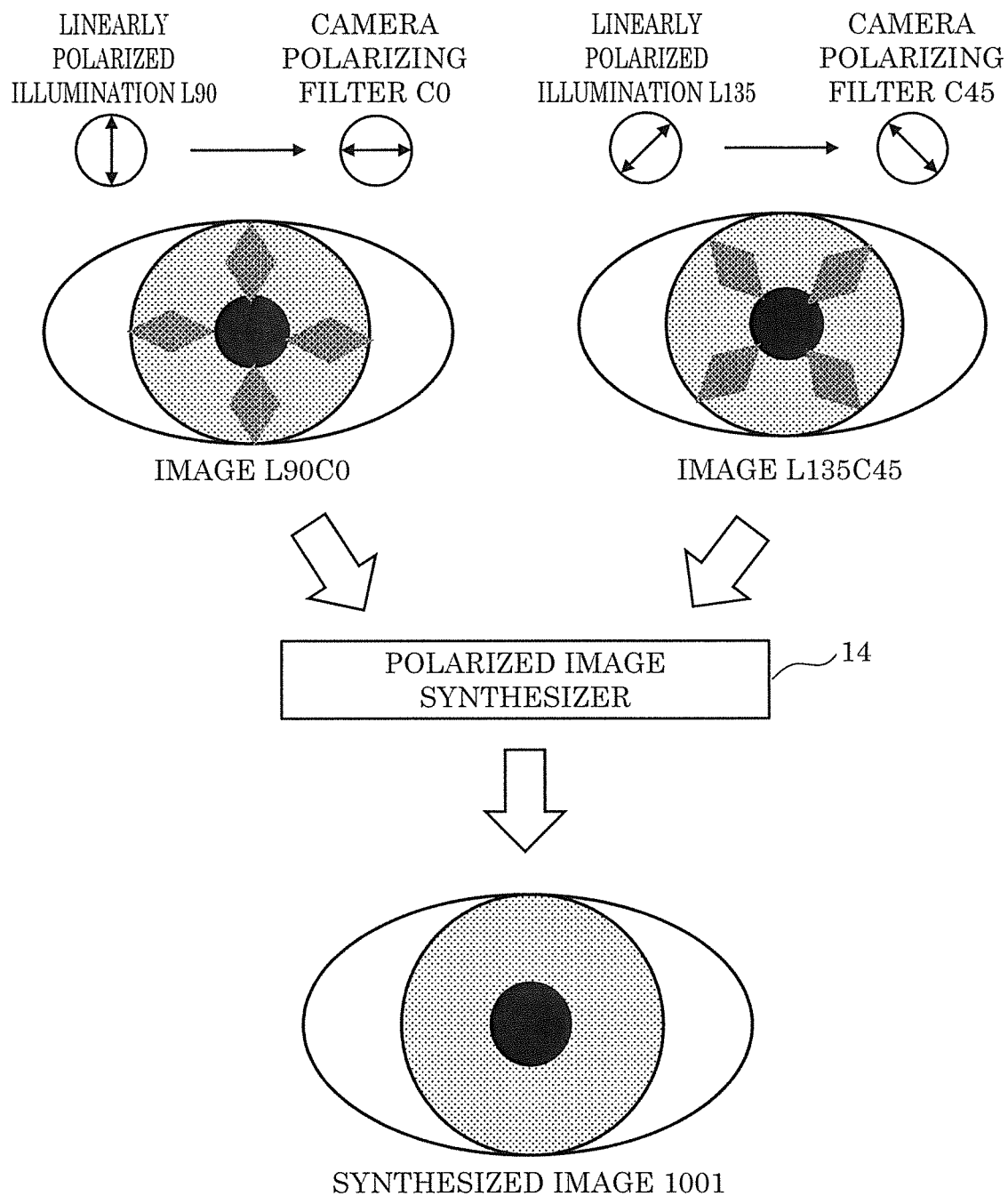
FIG. 11A is a schematic diagram showing an example of processing of a polarized image synthesizer for removing the black cross pattern.
Figure 11B:
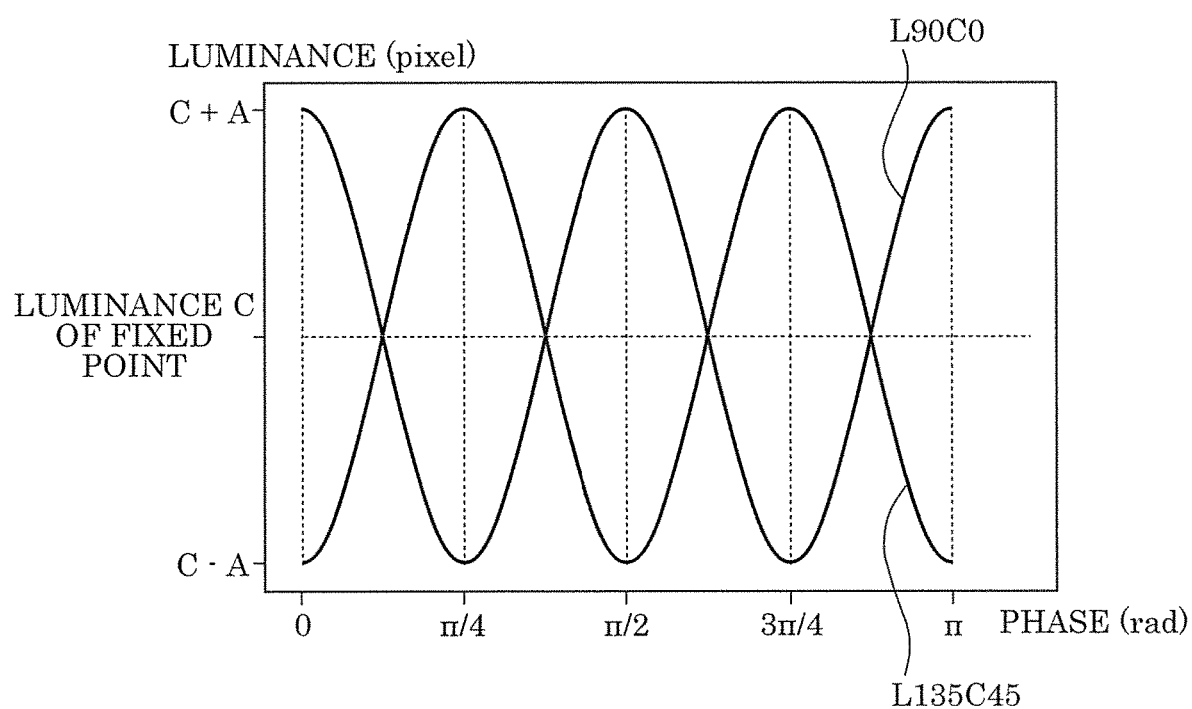
FIG. 11B is a diagram showing an example of a periodic function indicating a principle of black cross pattern removal by the processing of the polarized image synthesizer.

FIGS. 11A and 11B are diagrams for explaining processing of polarized image synthesizer 14 for eliminating the black cross pattern using the principle of behaviors of the black cross pattern shown in FIGS. 10A and 10B. FIG. 11A is a schematic diagram showing an example of the processing of polarized image synthesizer 14 for removing the black cross pattern. FIG. 11B is a diagram showing an example of a periodic function indicating a principle of black cross pattern removal by the processing of polarized image synthesizer 14. As shown in FIG. 11A, polarized image synthesizer 14 acquires polarized image L90C0 and polarized image L135C45. Polarized image L90C0 is an image generated from polarized pixels in an orthogonal polarization state among images captured during illumination of linearly polarized light L90. Polarized image L135C45 is an image generated from polarized pixels in the orthogonal polarization state among images captured during illumination of linearly polarized light L135.

Polarized image synthesizer 14 compares, through image processing, pixel values in substantially the same pixel positions on the image, that is, pixel values of pixels corresponding to each other between polarized image L90C0 and polarized image L135C45 and selects a pixel having a larger pixel value (a brighter pixel). Polarized image synthesizer 14 synthesizes, that is, generates new one image 1001 by applying the pixel selected as explained above to the pixel positions. In other words, polarized image synthesizer 14 determines a larger pixel value of the pixel value of the pixels corresponding to each other as a pixel value of pixels of synthesized image 1001. Synthesized image 1001 is an example of an authentication image.

In such synthesized image 1001, an iris image in which the black cross pattern is eliminated can be obtained. Polarized image L90C0 and polarized image L135C45 are images obtained from one captured image. The positions of pixels of polarized image L90C0 and the positions of pixels of polarized image L135C45 are different in the captured image. Therefore, two pixels to be compared between polarized image L90C0 and polarized image L135C45 are located in the same position in some cases and are located near the positions of the pixels each other in other cases. For example, the two pixels to be compared may be selected from pixels in the same polarizing filter group 30ac.

In other words, when synthesized image 1001 is represented as synthesized image Image, synthesized image Image can be generated by carrying out processing indicated by the following Expression 1 for each of pixels. In the following expression, "max" indicates processing for selecting larger one of two numerical values and "L90C0" and "L135C45" respectively indicate pixel values of corresponding pixels of polarized images L90C0 and L135C45.

$$\text{Image}=\max(L90C0, L135C45) \quad \text{(Expression 1)}$$

Naturally, a synthesizing method for synthesized image Image is not limited to this. For example, as indicated by the following Expression 2, a pixel value may be synthesized by weighing the pixel values of the corresponding pixels between polarized images L90C0 and L135C45 with a weight coefficient W and adding up the pixel values. The synthesized value may be applied to the pixel values of the pixels of synthesized image 1001.

$$\text{Image}=W \times (L90C0)+(1-W) \times (L135C45) \quad \text{(Expression 2)}$$

As indicated by the following Expression 3, an average of the pixel values of the corresponding pixels between polarized images L90C0 and L135C45 may be calculated as, in particular, W=½. The average may be applied to the pixel values of the pixels of synthesized image 1001.

$$\text{Image}=(L90C0+L135C45)/2 \quad \text{(Expression 3)}$$

When phases of two periodic functions of a cycle 90° ($\pi/2$) having amplitude A and an offset value C of luminance shift from each other by 45° ($\pi/4$) as shown in FIG. 11B, from a characteristic that an average of the phases is just equivalent to the offset value C of the periodic function, luminance obtained from Expression 3 is considered to be appropriate as an estimated value of original iris luminance.

Of the two periodic functions, a periodic function indicated by L90C0 indicates a periodic function concerning polarized image L90C0. This periodic function indicates a change in luminance at a fixed point at the time when a polarization direction of linearly polarized light L90 of the illumination light and a polarization direction of polarized pixel C0 are changed while maintaining a difference of 90° between the polarization directions. The periodic function indicated by L135C45 indicates a periodic function concerning polarized image L135C45. This periodic function indicates a change in luminance at a fixed point at the time when a polarization direction of linearly polarized light L135 of the illumination light and a polarization direction of polarized pixel C45 are changed while maintaining a difference of 90° between the polarization directions. Accordingly, a difference of phases between the periodic function of the polarized image L90C0 and the periodic function of the polarized image L135C45 is 45° ($\pi/4$).

An iris image obtained as synthesized image 1001 is substantially equal to an iris image captured with normal unpolarized light. Therefore, it is possible to authenticate an individual having an iris using synthesized image 1001 and iris authentication processing in the past.

[1-3. Operation of Iris Authentication System 1]

Figure 12:
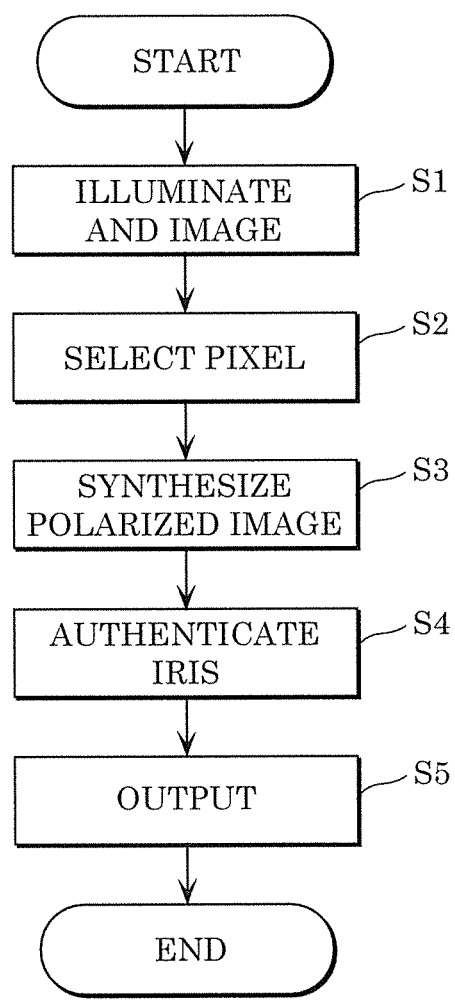
FIG. 12 is a flowchart showing an example of the operation of the iris authentication system according to the first embodiment.

The operation of iris authentication system 1 is explained with reference to FIG. 12. FIG. 12 is a flowchart showing an example of the operation of iris authentication system 1 according to the first embodiment. First, in step S1, synchronizer 11 of processor 10 causes illuminating device 20 to illuminate an authentication target person in the front while synchronizing timing of illumination and timing of imaging and causes camera 30 to image the target person in the front. The authentication target person may be right opposed to illuminating device 20 and camera 30 or may not be right opposed to and traverse illuminating device 20 and camera 30. A captured image is an eyeball image including an image of an eye of the authentication target person photographed from the outer side. Synchronizer 11 causes illuminating device 20 to sequentially irradiate linearly polarized light L90 and linearly polarized light L135 and causes camera 30 to perform imaging respectively during an irradiation period of linearly polarized light L90 and during an irradiation period of linearly polarized light L135. Camera 30 stores two kinds of captured images in storage 12. Information concerning imaging time is included in the captured images.

Subsequently, in step S2, pixel selector 13 of processor 10 acquires the captured images from storage 12 and selects pixels in the captured images. Specifically, pixel selector 13 extracts, in the captured images, polarized pixels C0, which are pixels acquired by light receiving elements corresponding to first linear polarizing filters 30aca at an azimuth angle 0° of the polarization transmission axis in polarization imaging element 30a of camera 30, and re-accumulates extracted polarized pixels C0 to thereby generate a polarized image, which is a new image. Pixel selector 13 extracts polarized pixels C45, which are pixels acquired by light receiving elements corresponding to second linear polarizing filters 30acb at an azimuth angle 45° of the polarization transmission axis, and re-accumulates extracted polarized pixels C45 to thereby generate a new polarized image. Polarized image L90C0 of polarized pixels C0 extracted from the captured images of linearly polarized light L90, polarized image L90C45 of polarized pixels C45 extracted from the captured images of linearly polarized light L90, polarized image L135C0 of polarized pixels C0 extracted from the captured images of linearly polarized light L135, and polarized image L135C45 of polarized pixels C45 extracted from the captured images of linearly polarized light L135 are generated. The polarized images include information concerning the polarized pixels configuring the polarized images.

Subsequently, in step S3, polarized image synthesizer 14 of processor 10 associates imaging time of captured images during illumination of linearly polarized lights L90 and L135 acquired from synchronizer 11 and imaging time of polarized images generated by pixel selector 13 and specifies linearly polarized lights irradiated during imaging of the polarized images. Consequently, polarized image synthesizer 14 specifies polarized images L90C0, L90C45, L135C0, and L135C45. Polarized image synthesizer 14 extracts a pair of two polarized images out of four kinds of polarized images. In the pair of the two polarized images, a polarization direction of linearly polarized light of illumination in the polarized images and a polarization direction of the light receiving elements are orthogonal and polarization directions of the linearly polarized lights of illumination are different between the two polarized images. At this time, the polarization directions of the light receiving elements are also different between the two polarized images. Accordingly, polarized image synthesizer 14 determines a pair of polarized images L90C0 and L135C45 as extraction targets. Further, polarized image synthesizer 14 extracts a pair of polarized images L90C0 and L135C45, imaging times of which are closest to each other. Such polarized images L90C0 and L135C45 are images acquired in illumination of continuous linearly polarized lights L90 and L135.

Polarized image synthesizer 14 combines extracted polarized images L90C0 and L135C45. At this time, polarized image synthesizer 14 extracts pixels having larger pixel values among pixels in substantially the same pixel positions between polarized images L90C0 and L135C45. Polarized image synthesizer 14 extracts pixels having larger pixel values in the pixel positions and accumulates the extracted pixels to thereby generate new synthesized image 1001. Polarized image synthesizer 14 outputs synthesized image 1001 to iris authenticator 110.

Subsequently, in step S4, iris authenticator 110 collates the information concerning the plurality of reference images stored in iris authentication pattern DB 120 and synthesized image 1001 to thereby identify a user ID corresponding to synthesized image 1001. For example, by using an existing image collation technique, iris authenticator 110 determines a reference image having predetermined or higher similarity with synthesized image 1001 out of the plurality of reference images and identifies a user ID associated with the determined reference image. Iris authenticator 110 outputs the identified user ID to output section 130. When a user ID is not identified, iris authenticator 110 outputs information indicating impossibility of user authentication to output section 130.

Subsequently, in step S5, output section 130 outputs information concerning a user corresponding to the acquired user ID to an external device such as a display device. When a user ID is not identified, output section 130 outputs information indicating impossibility of user authentication to the external device. Output section 130 may access not-shown another database to thereby acquire the information concerning the user corresponding to the user ID.

[1-4. Effects]

As explained above, image synthesizing apparatus 100 according to the first embodiment sequentially irradiates the two kinds of linearly polarized lights in the different polarization directions on the eyeball of the authentication target person and performs imaging in synchronization with the irradiation to acquire two captured images. Further, image synthesizing apparatus 100 acquires a plurality of polarized images from the two captured images. While removing, from the plurality of polarized images, an image of specular reflection of the illumination light source due to regular reflection that occurs on the eyeglass and the cornea, image synthesizing apparatus 100 simultaneously removes a black cross pattern due to birefringence on the cornea and generates an iris image for which iris authentication is possible. With image synthesizing apparatus 100, even in so-called casual iris authentication in which the iris authentication is carried out without being aware by the authentication target person, it is possible to simultaneously remove an image of specular reflection of the illumination light source on the eyeglass and the cornea, which is an obstacle of image processing, and an artifact due to birefringence that occurs on the cornea.

Second Embodiment

Image synthesizing apparatus 2100 according to a second embodiment is explained. Image synthesizing apparatus 2100 is different from image synthesizing apparatus 100 in the first embodiment in the configurations of illuminating device 220 and camera 230. Therefore, processor 210 does not include synchronizer. In the following explanation, differences from the first embodiment are mainly explained. Explanation of similarities to the first embodiment is omitted.

Figure 13:
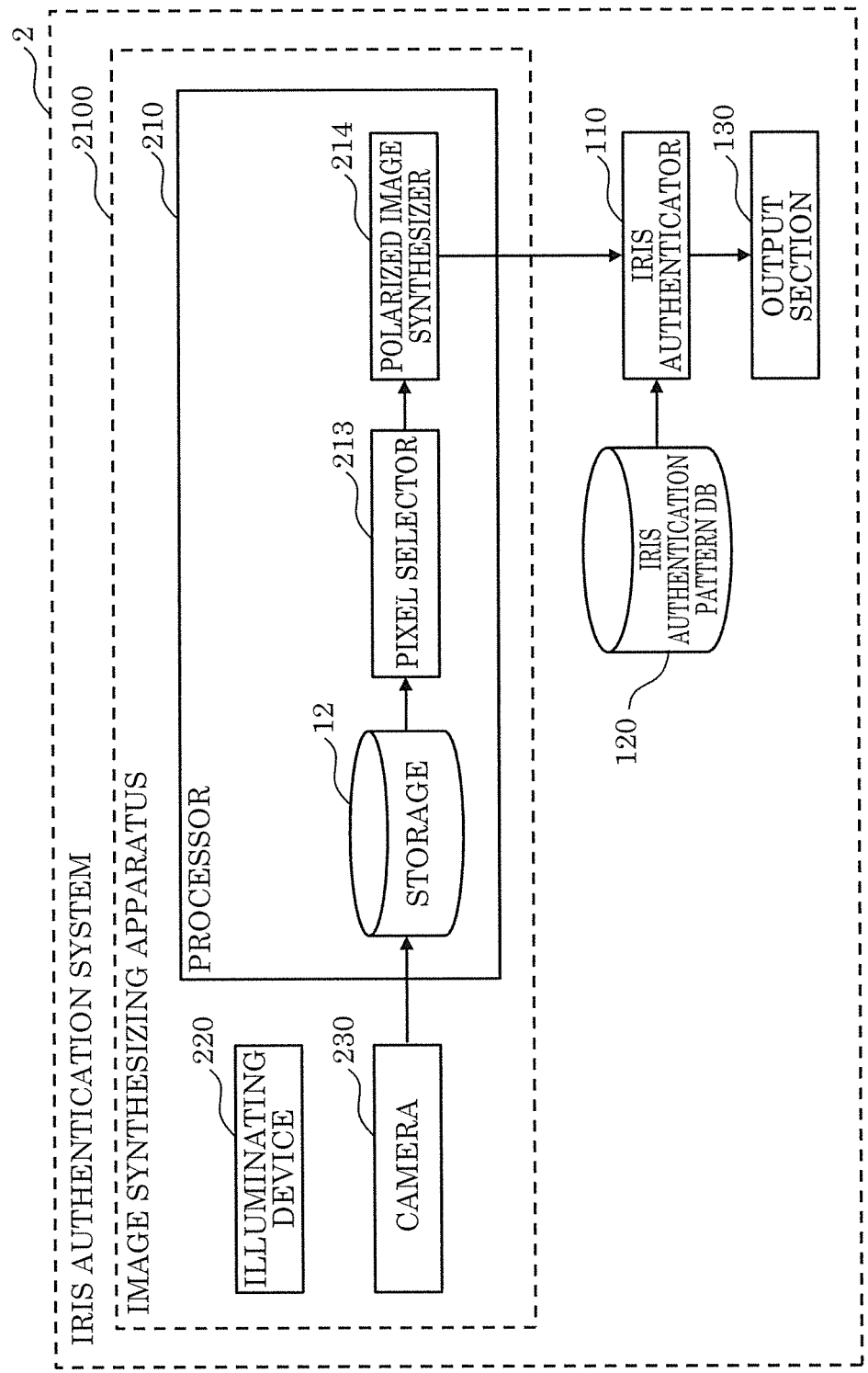
FIG. 13 is a block diagram showing an example of a functional configuration of an iris authentication system according to a second embodiment.
Figure 14:
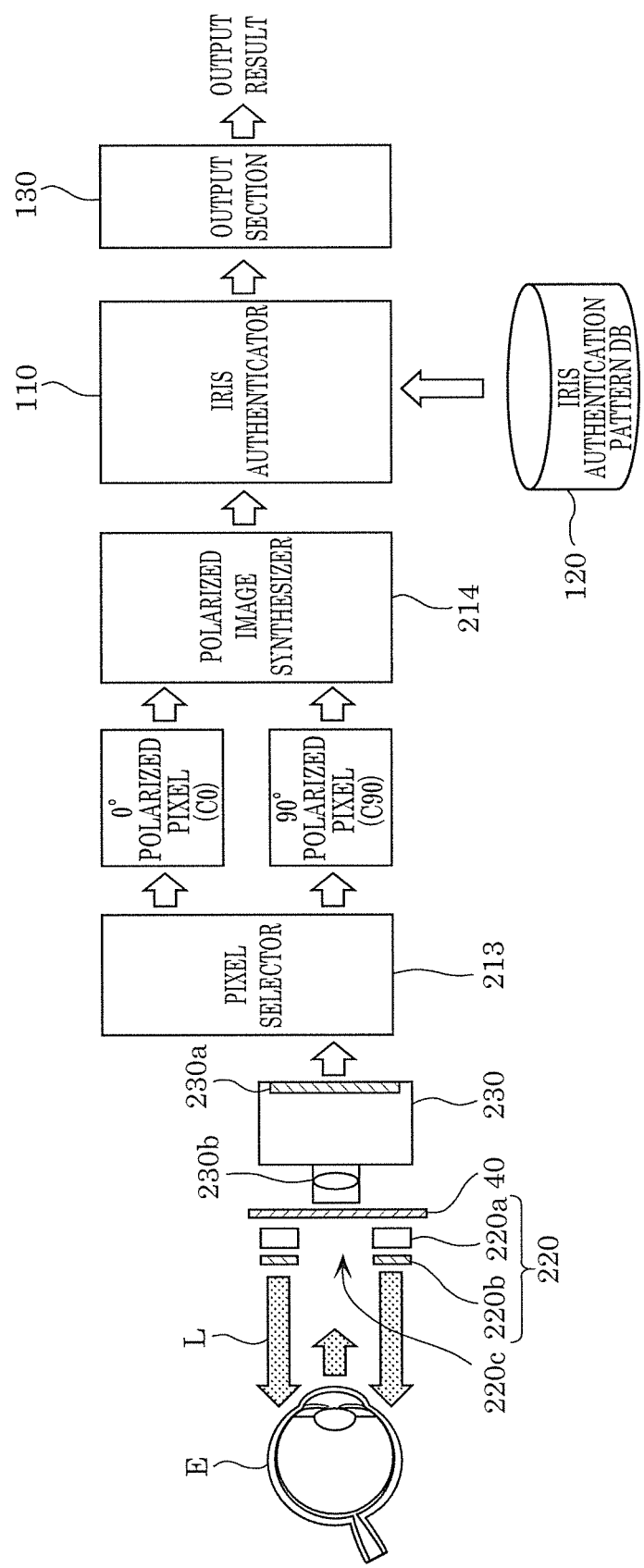
FIG. 14 is a schematic diagram showing an example of a flow of processing by components of the iris authentication system according to the second embodiment.

FIG. 13 is a block diagram showing an example of a functional configuration of iris authentication system 2 according to the second embodiment. FIG. 14 is a schematic diagram showing an example of a flow of processing by components of iris authentication system 2 according to the second embodiment. As shown in FIGS. 13 and 14, iris authentication system 2 includes image synthesizing apparatus 2100, iris authenticator 110, iris authentication pattern DB 120, and output section 130 same as those in the first embodiment. Image synthesizing apparatus 2100 includes processor 210, illuminating device 220, and camera 230. Processor 210 includes storage 12, pixel selector 213, and polarized image synthesizer 214. Image synthesizing apparatus 2100 includes band-pass filter 40 between illuminating device 220 and camera 230. However, band-pass filter 40 is not essential.

Figure 15A:
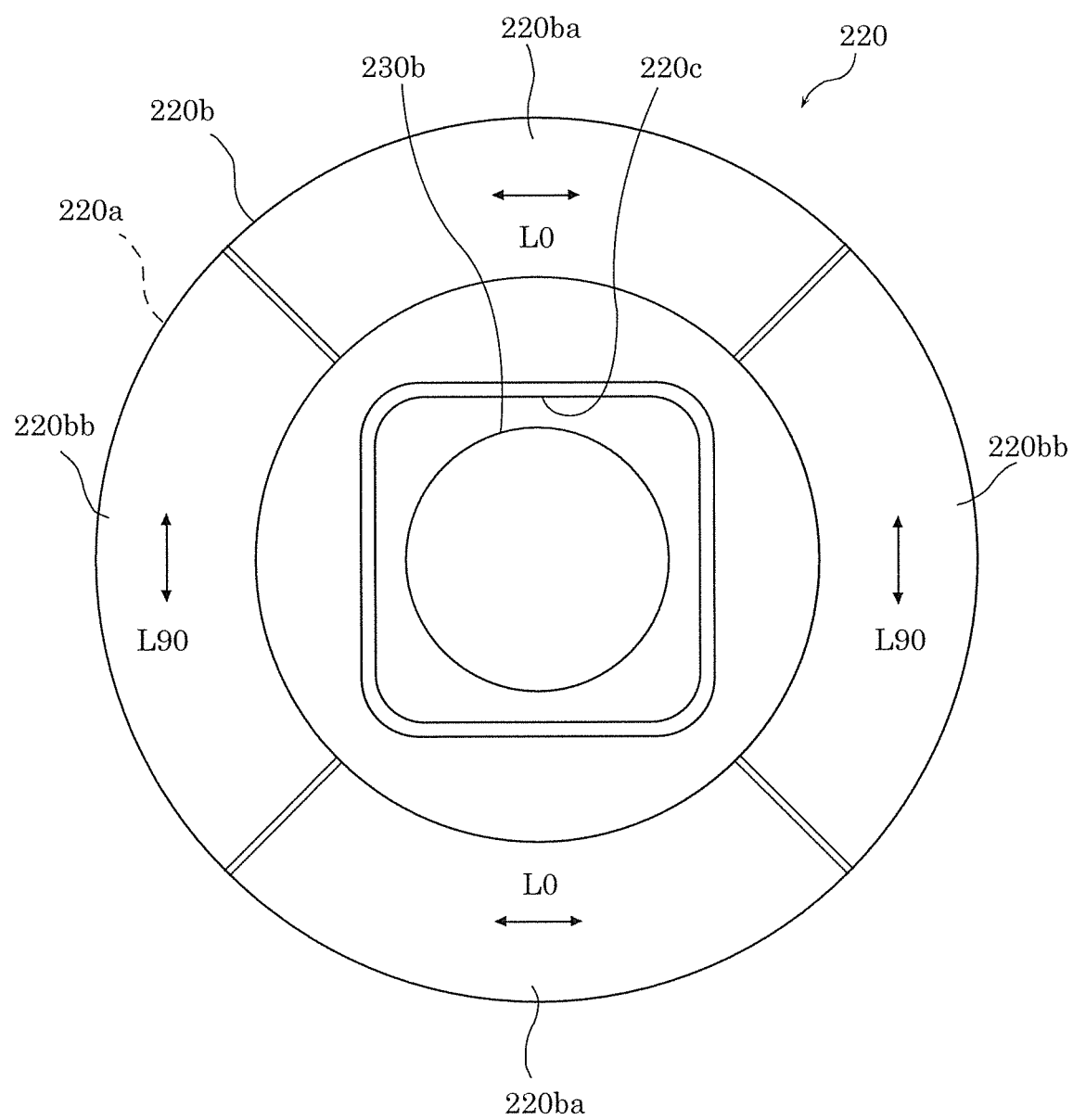
FIG. 15A is a schematic front view of an illuminating device according to the second embodiment.
Figure 15B:
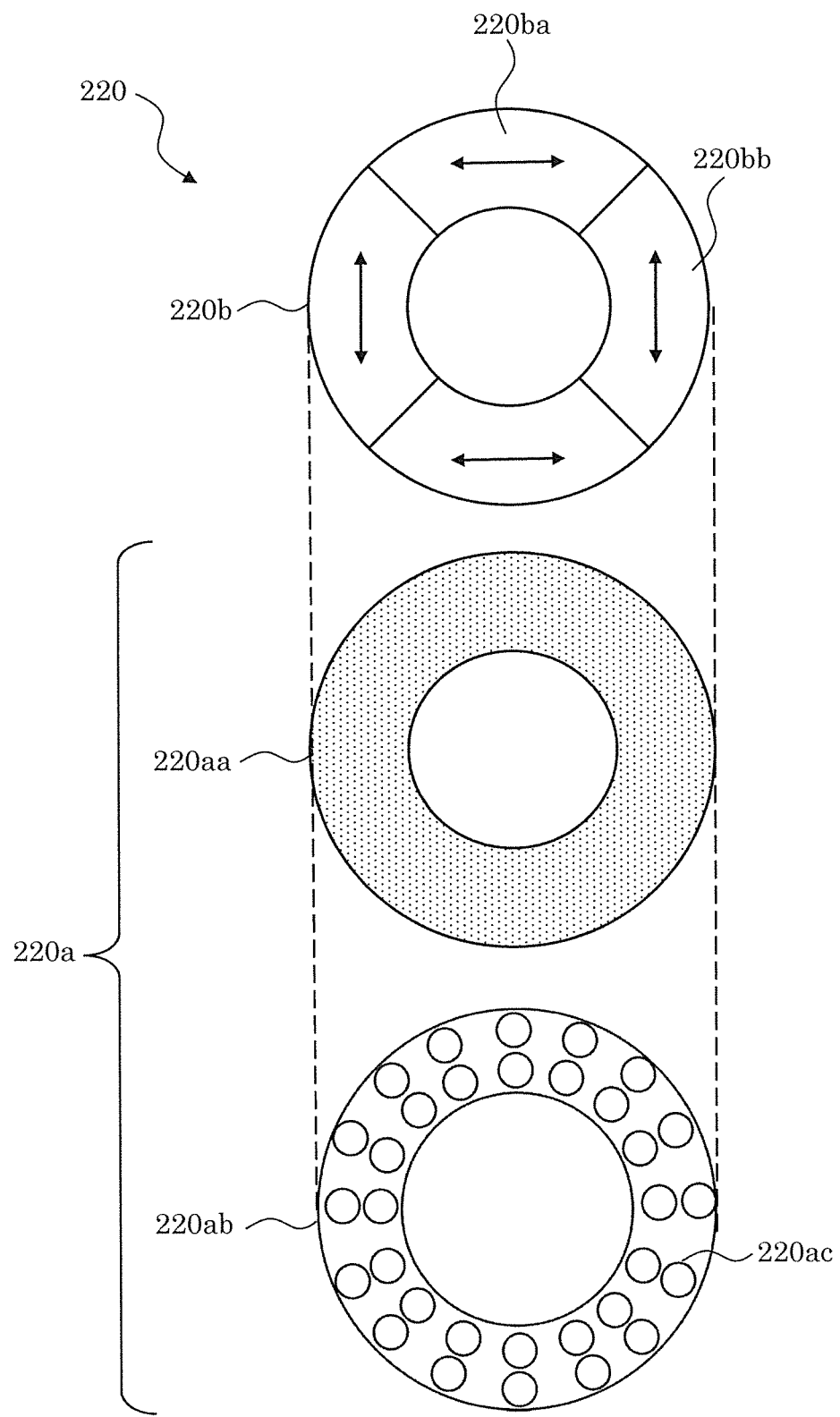
FIG. 15B is a schematic exploded view of the illuminating device shown in FIG. 15A.

As shown in FIGS. 14 to 15B, illuminating device 220 includes illuminator 220*a* and polarizer 220*b*. FIG. 15A is a schematic front view of illuminating device 220 according to the second embodiment. FIG. 15B is a schematic exploded view of illuminating device 220 in FIG. 15A. Illuminator 220*a* includes light emitter 220*ab* having a ring plate shape, on the entire surface of which a plurality of light sources 220*ac* are disposed, and diffusing plate 220*aa* having a ring plate shape disposed between light emitter 220*ab* and polarizer 220*b*. The configuration of light sources 220*ac* may be the same as first light sources 20*aa* and second light sources 20*ab* in the first embodiment. Light emitter 220*ab* is configured to cause the plurality of light sources 220*ac* to simultaneously emit lights. Consequently, light emitter 220*ab* emits ring-like illumination light toward diffusing plate 220*aa*. Illuminator 220*a* configures a ring light of one channel.

Diffusing plate 220*aa* is disposed to cover the entire plurality of light sources 220*ac* of light emitter 220*ab*. Diffusing plate 220*aa* and light emitter 220*ab* surround opening 220*c*. Diffusing plate 220*aa* transmits emitted lights of the plurality of light sources 220*ac* while diffusing the emitted lights and discharges the emitted lights toward polarizer 220*b*. Diffusing plate 220*aa* may have any configuration if diffusing plate 220*aa* has a configuration for transmitting light while diffusing the light. Diffusing plate 220*aa* converts emitted light from a point light source such as an LED into emitted light from a surface light source. Linearly polarized light emitted from polarizer 220*b* after being diffused by diffusing plate 220*aa* can reduce luminance of a bright spot of specular reflection on an eyeglass or a cornea. Further, it has been confirmed by the experiment of the inventor that, even when an extinction ratio of a polarizing filter of polarizer 220*b* is low, the linearly polarized light achieves an effect that removal of a bright spot of specular reflection of polarized light can be more effectively realized. Diffusing plate 220*aa* is not essential.

Polarizer 220*b* includes a plurality of first polarizing filters 220*ba* and a plurality of second polarizing filters 220*bb* disposed in a ring shape around opening 220*c*. In this embodiment, two first polarizing filters 220*ba* and two second polarizing filters 220*bb* are disposed alternately and adjacent to each other along the circumference of opening 220*c*. First polarizing filters 220*ba* are polarizing filters having polarization transmission axes having an azimuth angle 0°. Second polarizing filters 220*bb* are polarizing filters having polarization transmission axes having an azimuth angle 90°. The number of first polarizing filters 220*ba* and second polarizing filters 220*bb* may be any number equal to or larger than one. Disposition of first polarizing filters 220*ba* and second polarizing filters 220*bb* may be any disposition.

Light emitter 220*ab*, diffusing plate 220*aa*, and first polarizing filters 220*ba* functioning as first polarizing filters are located in this order along an emitting direction of illumination light. Further, light emitter 220*ab*, diffusing plate 220*aa*, and second polarizing filters 220*bb* functioning as second polarizing filters are located in this order along the emitting direction of the illumination light. When illuminating device 220 is viewed in a direction perpendicular to a surface on which light sources 220*ac* are disposed in light emitter 220*ab* having the ring plate shape, that is, an optical axis of emitted light of light emitter 220*ab*, the respective sizes of light emitter 220*ab*, diffusing plate 220*aa*, and polarizer 220*b* satisfy a condition of size of light emitter 220*ab*≤size of diffusing plate 220*aa*≤size of polarizer 220*b*. In other words, when illuminating device 220 is viewed along the optical axis of emitted light of light emitter 220*ab*, first polarizing filters 220*ba* and second polarizing filters 220*bb* are disposed to cover entire diffusing plate 220*aa*. At the same time, diffusing plate 220*aa* is disposed to cover all light sources 220*ac* in light emitter 220*ab* having the ring plate shape.

Illuminating device 220 explained above irradiates, on eyeball E of an authentication target person, illumination light L obtained by mixing linearly polarized lights in polarization directions of 0° and 90°. That is, illuminating device 220 simultaneously emits two kinds of linearly polarized lights L0 and L90, the polarization directions of which are orthogonal, toward eyeball E. Return lights reflected in cornea and iris portions of eyeball E pass through opening 220*c* in the center of illuminating device 220 and are made incident on camera 230. When band-pass filter 40 is disposed, the return lights from eyeball E pass through band-pass filter 40 and are thereafter made incident on camera 230.

Figure 16A:
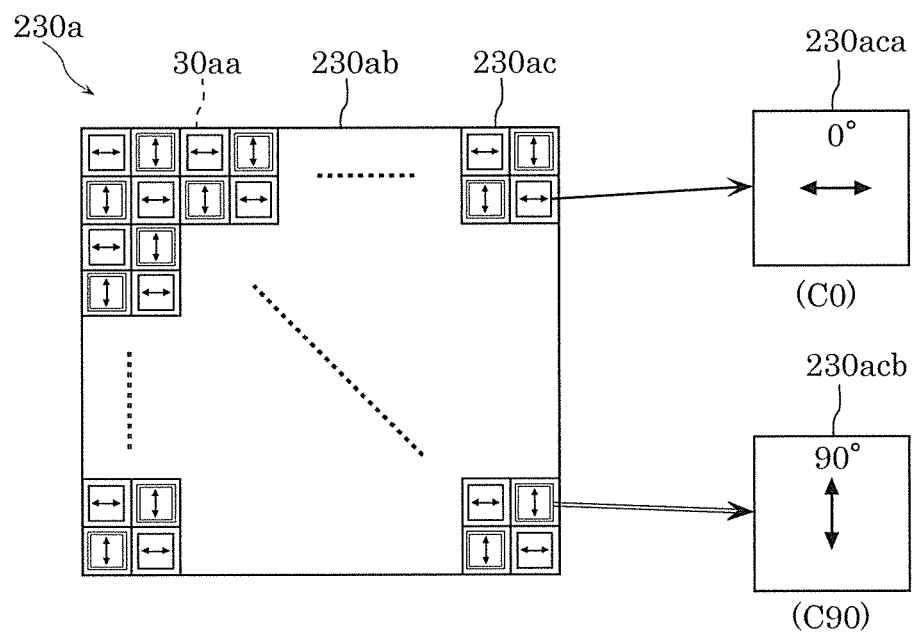
FIG. 16A is a plan view schematically showing the configuration of a polarization imaging element of a camera according to the second embodiment.
Figure 16B:
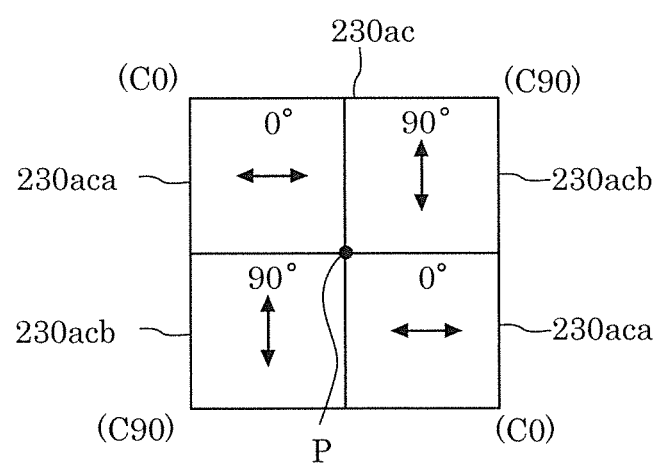
FIG. 16B is a plan view showing one unit of a group of polarizing filters in a mosaic polarizing filter shown in FIG. 16A.

As shown in FIG. 14, camera 230 includes polarization imaging element 230*a*. Further, as shown in FIGS. 16A and 16B, as in the first embodiment, polarization imaging element 230*a* includes imaging element 30*aa* and mosaic polarizing filter 230*ab*. On mosaic polarizing filter 230*ab*, a plurality of polarizing filter groups 230*ac* are arrayed in a lattice shape. FIG. 16A is a plan view schematically showing the configuration of polarization imaging element 230*a* of camera 230 according to the second embodiment. FIG. 16B is a plan view showing one unit of groups 230*ac* of polarizing filters in mosaic polarizing filter 230*ab* shown in FIG. 16A. Each polarizing filter group 230*ac* includes two first linear polarizing filters 230*aca* and two second linear polarizing filters 230*acb*. First linear polarizing filters 230*aca* and second linear polarizing filters 230*acb* are alternately disposed in a rotating direction around point P. First linear polarizing filters 230*aca* have polarization transmission axes having an azimuth angle 0°. Second linear polarizing filters 230*acb* have polarization transmission axes having an azimuth angle 90°.

A light receiving element of such polarization imaging element 230*a* forms a micro polarized pixel having a polarization transmission axis having an azimuth angle 0° and a micro polarized pixel having a polarization transmission axis having an azimuth angle 90°. Camera 230 can acquire, with one imaging, one captured image including polarized pixels in two orthogonal polarization directions of 0° and 90°. That is, camera 230 can simultaneously acquire polarized images in different polarization directions from substantially the same visual point.

Pixel selector 213 of processor 210 re-accumulates, in the captured image, polarized pixels C0 acquired by light receiving elements corresponding to first linear polarizing filters 230*aca* to thereby generate a polarized image formed by polarized pixels C0. Pixel selector 213 re-accumulates, in the captured image, polarized pixels C90 acquired by light receiving elements corresponding to second linear polarizing filters 230*acb* to thereby generate a polarized image formed by polarized pixels C90.

Polarized image synthesizer 214 of processor 210 combines the polarized image formed by polarized pixels C0 and the polarized image formed by polarized pixels C90 to generate a new synthesized image.

Figure 17:
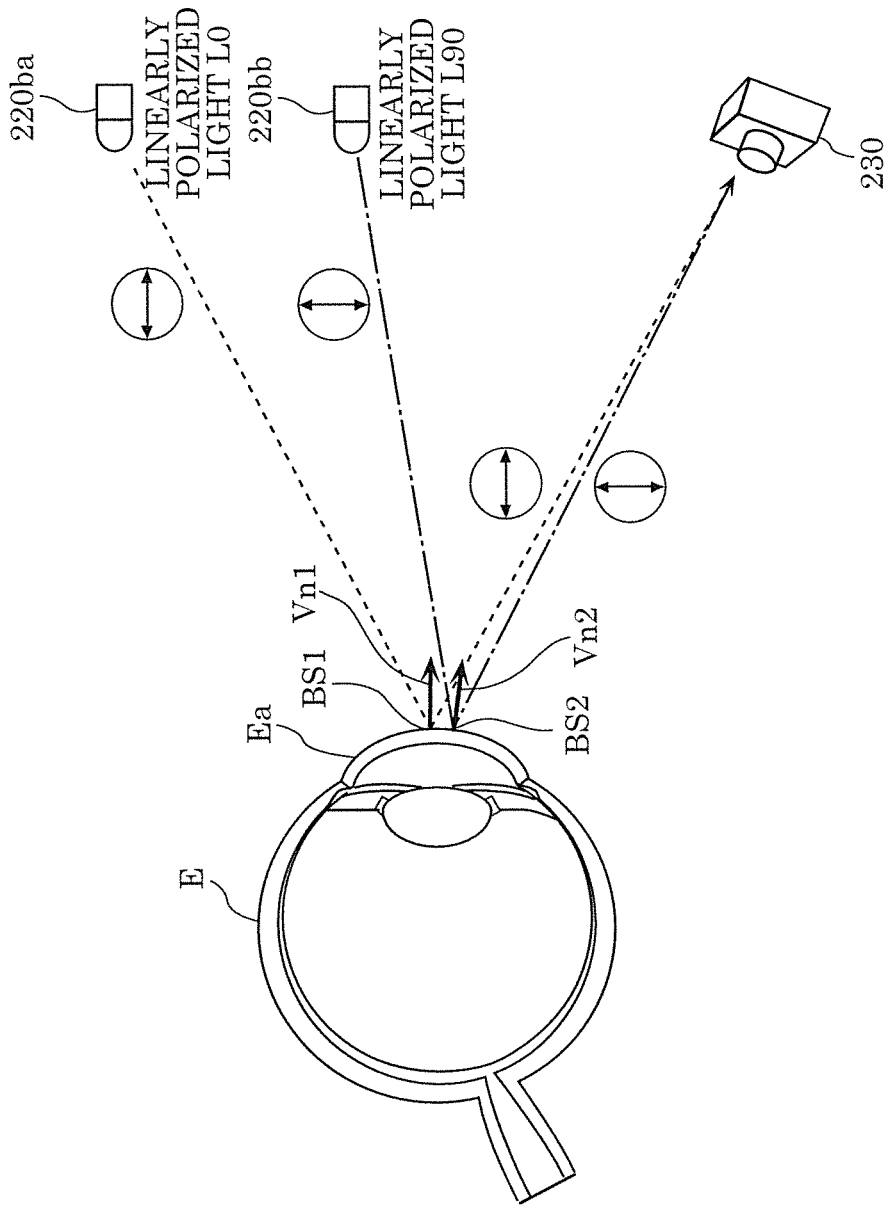
FIG. 17 is a schematic diagram showing a polarization state of reflected light at a bright spot of a specular reflection region in a cornea.
Figure 18:
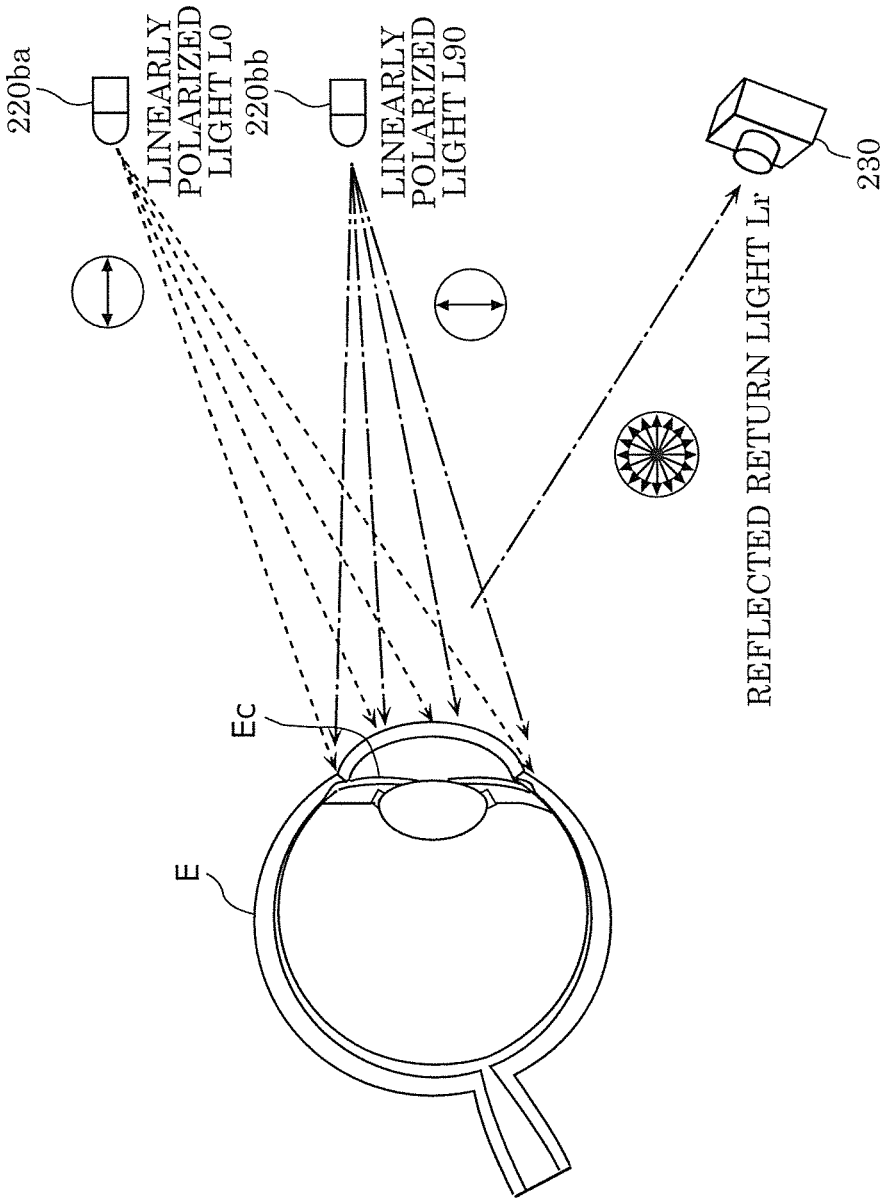
FIG. 18 is a schematic diagram showing a polarization state of reflected light in a diffuse reflection region in an iris.

Reflection of illumination light on eyeball E is explained with reference to FIGS. 17 and 18. FIG. 17 is a schematic diagram showing a polarized state of reflected light at a bright spot of a specular reflection region in cornea Ea. FIG. 18 is a schematic diagram showing a polarized state of reflected light in a diffuse reflection region in iris Ec. In FIGS. 17 and 18, to simplify explanation, camera 230 and illuminating device 220 originally disposed in close positions on the same axis are drawn to be disposed on different axes.

First, specular reflection on cornea Ea and an eyeglass surface of linearly polarized lights L0 and L90 emitted from illuminating device 220 is explained taking cornea Ea as an example with reference to FIG. 17. Cornea Ea on the surface of eyeball E of the authentication target person has a transparent and smooth surface. Therefore, for example, linearly polarized light L0 emitted from first polarizing filter 220*ba* reflects at reflection bright spot BS1 on cornea Ea. At this time, according to the rule of reflection, linearly polarized light L0 reflects at a reflection angle substantially the same as an incident angle with respect to normal vector Vn1 at reflection bright spot BS1 and is made incident on camera 230. Reflected light maintains a polarized state of linearly polarized light L0. Linearly polarized light L90 emitted from second polarizing filter 220*bb* reflects at reflection bright spot BS2 different from reflection bright spot BS1 on cornea Ea. At this time, linearly polarized light L90 reflects at a reflection angle substantially the same as an incident angle with respect to normal vector Vn2 at reflection bright spot BS2 and is made incident on camera 230. Reflected light maintains a polarized state of linearly polarized light L90. Therefore, when illuminating device 220 is configured to emit two kinds of linearly polarized lights L0 and L90, even if linearly polarized lights L0 and L90 are simultaneously irradiated, the respective reflection bright spots are present in different pixel positions on a captured image. Reflected lights maintain different polarized states in the pixel positions.

Reflection on iris Ec of linearly polarized lights L0 and L90 emitted from illuminating device 220 is explained with reference to FIG. 18. An iris region configures a diffuse reflection region for diffusing reflected light. In reflection in the iris region, influence due to roughness of an iris surface and multiple scattering of light on a surface layer occurs. Therefore, the polarized states of linearly polarized lights L0 and L90 are eliminated in the reflection in the iris region. Reflected return light Lr, which is reflected light, changes to a nonpolarized state. Accordingly, an image of the iris region is in the same state as a state in which the image is irradiated by nonpolarized illumination. Therefore, a black cross pattern due to birefringence does not occur in the image of the iris region.

Figure 19:
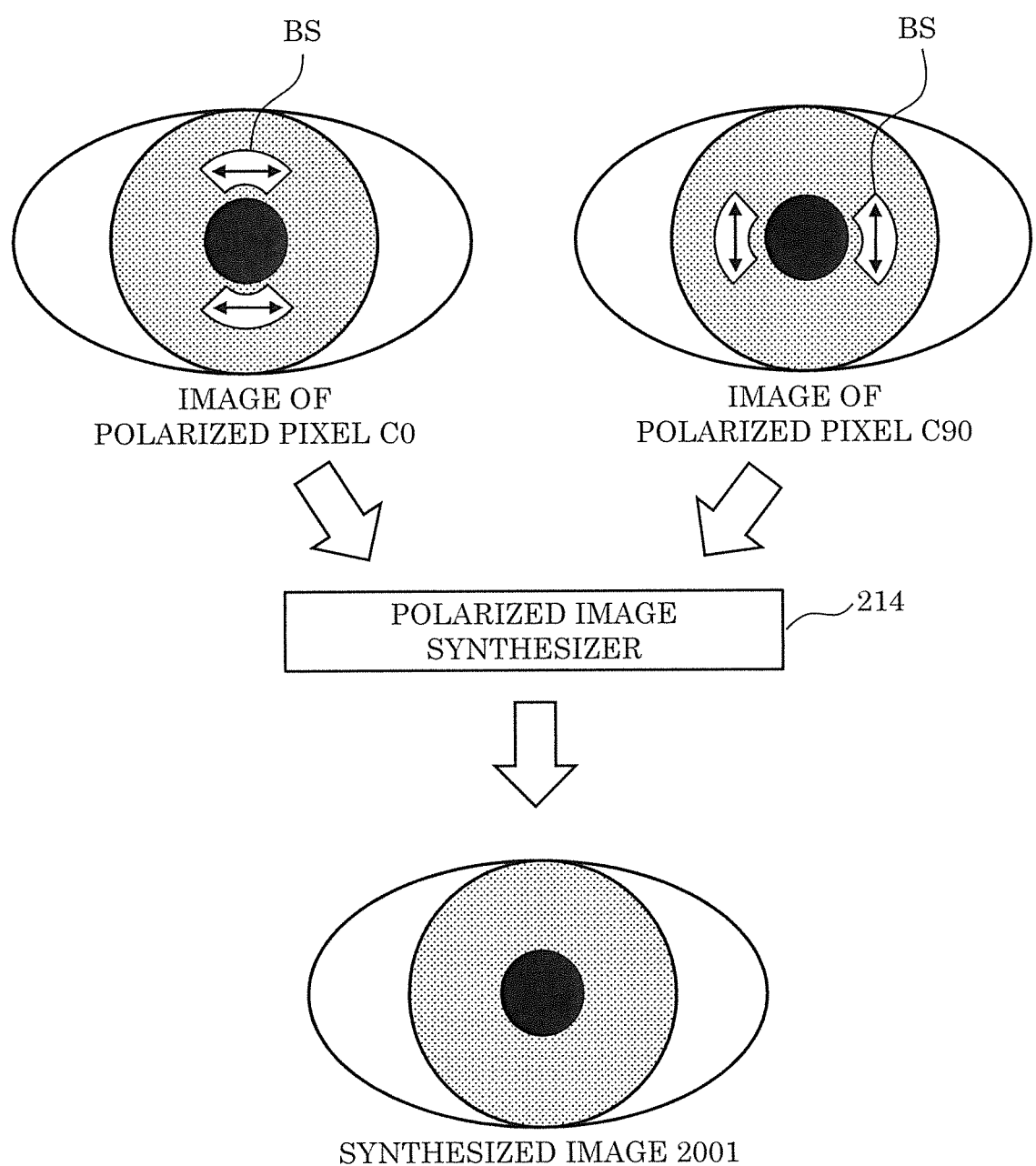
FIG. 19 is a schematic diagram showing an example of processing of the polarized image synthesizer for removing a bright spot of specular reflection.

Further, details of processing of polarized image synthesizer 214 are explained. FIG. 19 is a schematic diagram showing an example of processing of polarized image synthesizer 214 for removing a bright spot of specular reflection. As shown in FIG. 19, in polarized image C0 generated by pixel selector 213, a specular reflection image of ring-like illumination light is projected on cornea Ea of eyeball E. However, from a characteristic of camera 230, bright spot BS of only a ring portion corresponding to linearly polarized light L0 emitted from first polarizing filter 220ba in the polarization direction 0° in polarizer 220b is observed. A bright spot of a ring portion corresponding to linearly polarized light L90 emitted from second polarizing filter 220bb in the polarization direction 90° is not observed.

Similarly, in polarized image C90 generated by pixel selector 213, bright spot BS of only a ring portion corresponding to linearly polarized light L90 emitted from second polarizing filter 220bb is observed on cornea Ea of eyeball E. A bright spot of a ring portion corresponding to linearly polarized light L0 emitted from first polarizing filter 220ba is not observed.

First, a black cross pattern due to birefringence is absent in a region of iris Ec behind cornea Ea.

Therefore, when acquiring two polarized images C0 and C90 generated from the same captured image, polarized image synthesizer 214 compares, through image processing, pixel values of pixels in substantially the same pixel positions on images between polarized images C0 and C90 and selects a pixel having a smaller pixel value (a darker pixel). Further, polarized image synthesizer 214 applies the pixel selected as explained above to the pixel positions to thereby synthesize new one image 2001. With such synthesized image 2001, it is possible to obtain an iris image with a bright spot due to specular reflection eliminated. This iris image is substantially equal to an iris image captured by normal nonpolarized illumination. Therefore, the personal authentication using the iris authentication processing in the past can be applied.

As explained above, image synthesizing apparatus 2100 according to the second embodiment simultaneously irradiates the two kinds of linearly polarized lights on the eyeball of the authentication target person and acquires a captured image captured by one shot. Further, image synthesizing apparatus 2100 acquires a plurality of polarized images from one captured image. While removing, from the plurality of polarized images, an image of specular reflection due to regular reflection that occurs on the eyeglass and the cornea, image synthesizing apparatus 2100 simultaneously removes a pattern due to birefringence on the cornea and generates an iris image for which iris authentication is possible. Specifically, image synthesizing apparatus 2100 according to the second embodiment mixes and irradiates spatially orthogonal linearly polarized illuminations. Therefore, a pattern due to birefringence in the cornea does not occur in a captured image. On the other hand, an image of specular reflection due to regular reflection of illumination from the eyeglass and the cornea is captured in a state in which polarization is maintained. However, the image can be removed by image synthesizing apparatus 2100. In this way, an effect that it is possible to carry out the iris pattern authentication in the past while removing the image of the regular reflection of the illumination from the eyeglass and the cornea of the eyeballs can be achieved by the imaging of the one shot.

In this embodiment, a polarization illumination apparatus is contrived to project orthogonal two kinds of divided polarized illuminations on the eyeball at a time. When reaching the eyeball, this light changes to a plurality of reflected images of the different polarized divided illuminations because the light is specularly reflected on the cornea. The reflected images maintain characteristics of polarized light. Therefore, there is a first advantage that reflection can be removed by orthogonal polarizing filters and specular reflection of illumination can be removed. Further, in the past, when the polarized illuminations and the polarizing filters are made orthogonal in this way, a black cross artifact occurs on the iris because of birefringence of the cornea to make it difficult to perform iris authentication. However, in this embodiment, in light transmitted through the cornea, since different polarized lights scatter on an optical path and on the cornea and are mixed to be nonpolarized light. Therefore, there is a second advantage that a black cross artifact does not occur.

Further, an advantage of one-shot imaging in this embodiment is explained. In the casual iris authentication for the purpose of unaware authentication, it is likely that the face and the eyeballs of a subject are always moving. In this state, in order to carry out illumination and imaging twice to acquire two images without pixel deviation and perform image processing as in the first embodiment, it is necessary to carry out eyeball tracking to align pixels. Therefore, a pressing load increases. With the one-shot imaging, there is a great advantage that the problem of the pixel deviation is eliminated and a synchronizing device of illumination and imaging is unnecessary in an apparatus configuration.

In image synthesizing apparatus 2100 according to the second embodiment, polarized image synthesizer 214 determines, as the pixels of the synthesized image, the pixel having the smaller pixel value (the darker pixel) of the two pixels in substantially the same pixel positions on the two polarized images. However, polarized image synthesizer 214 is not limited to this. As explained in the first embodiment, polarized image synthesizer 214 may determine a pixel value by weighting the pixel values of the two pixels or may determine an average of the pixel values of the two pixels as a pixel value.

Third Embodiment

Image synthesizing apparatus 3100 according to a third embodiment is explained. Image synthesizing apparatus 3100 according to the third embodiment is different from the image synthesizing apparatuses in the first and second embodiments in that illuminating device 320 irradiates circularly polarized light. In the following explanation, differences from the first and second embodiments are mainly explained. Explanation of similarities to the first or second embodiment is omitted.

Figure 20B:
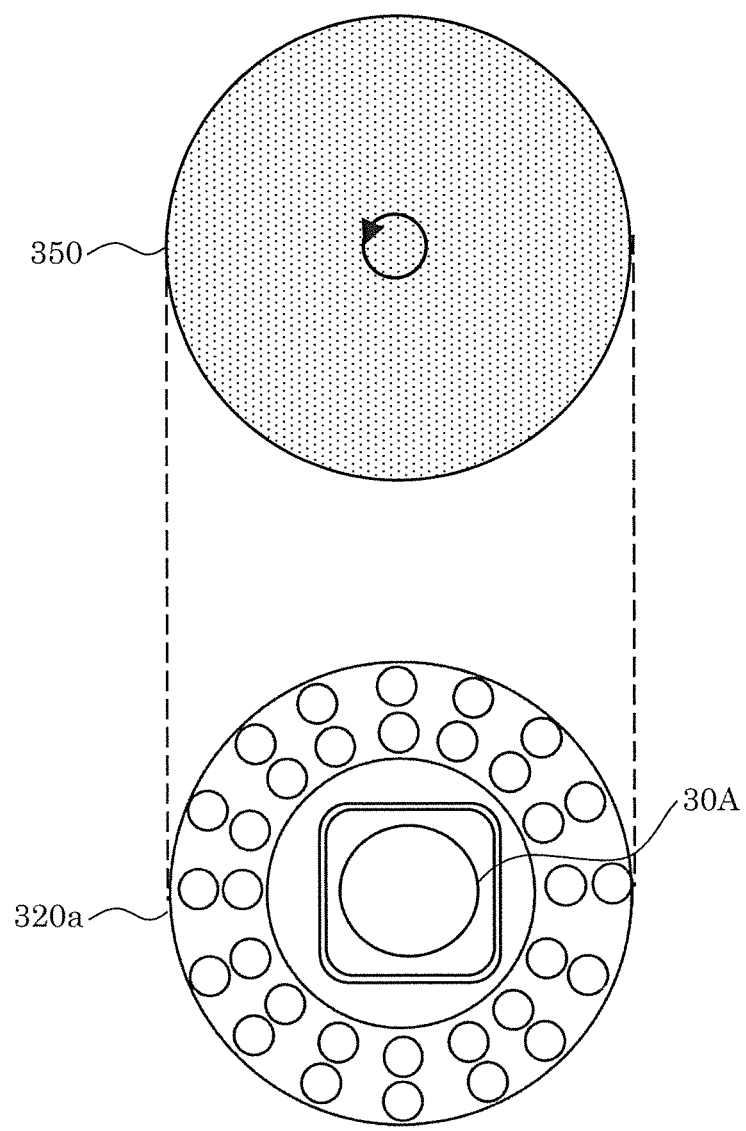
FIG. 20B is a diagram schematically showing details of an optical system shown in FIG. 20A.

A technique for irradiating circularly polarized light on an eyeball is explained with reference to FIGS. 20A and 20B. Like FIG. 2, FIG. 20A is a diagram showing an example of the iris authenticating apparatus of the related art for performing iris authentication using circularly polarized light. FIG. 20B is a diagram schematically showing the detail of the optical system of FIG. 20A. The iris authenticating apparatus of the related art shown in FIG. 20A includes camera 30A, illuminator 320a of nonpolarized light, and circularly polarizing plate 350.

FIG. 20A shows an overlapping state of an optical system of the iris authenticating apparatus. When viewed from eyeball E of the authentication target person, circularly polarizing plate 350 is disposed in a layer close to eyeball E and ring-like illuminator 320a is disposed in a layer farther from eyeball E. Camera 30A is a normal camera and is disposed on the inner side of an opening of illuminator 320a. Illuminator 320a has the same configuration as light emitter 220ab of illuminating device 220 in the second embodiment. Illuminator 320a emits nonpolarized illumination light. Circularly polarizing plate 350 is not a doughnut type and covers entire illuminator 320a. Therefore, both of incident light on eyeball E from illuminator 320a and return light from eyeball E to illuminator 320a are transmitted through circularly polarizing plate 350. That is, light from illuminator 320a to camera 30A is transmitted through circularly polarizing plate 350 twice in total.

The nonpolarized illumination light from illuminator 320a is converted into left circularly polarized light that rotates in one direction, that is, to the left in FIG. 20A by circularly polarizing plate 350. This left circularly polarized light is irradiated on eyeball E of the authentication target person and specularly reflected on a cornea, an eyeglass, or the like. Return light of the specular reflection changes to right circularly polarized light that rotates to the right. On the other hand, the circularly polarized light diffuses and reflects in an iris region and forms diffused reflected light. Therefore, the circularly polarized light is eliminated by the diffuse reflection and nonpolarized return light is formed. The right circularly polarized light and the nonpolarized return light are made incident on circularly polarizing plate 350 again. However, the right circularly polarized light rotating oppositely to the incident light is blocked by circularly polarizing plate 350. Therefore, only a diffused reflected image of the iris is imaged by camera 30A. In this way, a birefringence pattern of the cornea is not generated when the circularly polarized light is irradiated on eyeball E. The diffused reflected image of the iris obtained by the diffused reflected light is equivalent to an iris image captured by illumination of normal nonpolarized light. Therefore, it is possible to perform personal authentication corresponding to a captured image using an image of the diffused reflected image of the iris and the iris authentication processing in the past.

However, in the related art explained above, it is necessary to select one of right circularly polarized light and left circularly polarized light as illumination light of illuminator 320a. Therefore, it is likely that a new deficiency occurs in a biological medium having a characteristic that an optical characteristic changes between left and right circularly polarized lights, that is, a so-called circular dichromatism. Therefore, the inventor examined a configuration for equally using left and right circularly polarized lights and devised image synthesizing apparatus 3100 according to the third embodiment including an illuminating device that simultaneously illuminates left and right circularly polarized lights.

Figure 21:
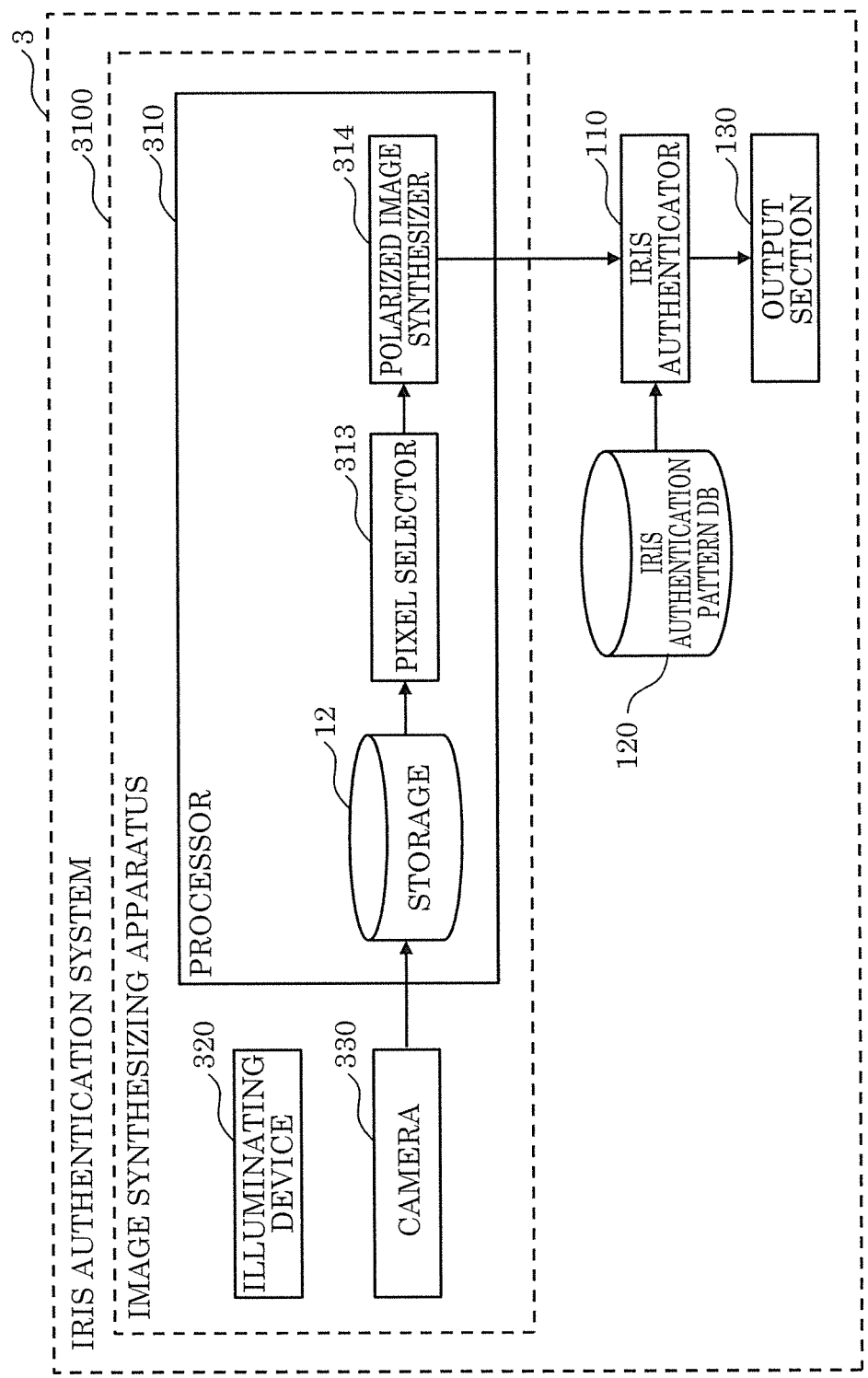
FIG. 21 is a block diagram showing an example of a functional configuration of an iris authentication system according to a third embodiment.
Figure 22:
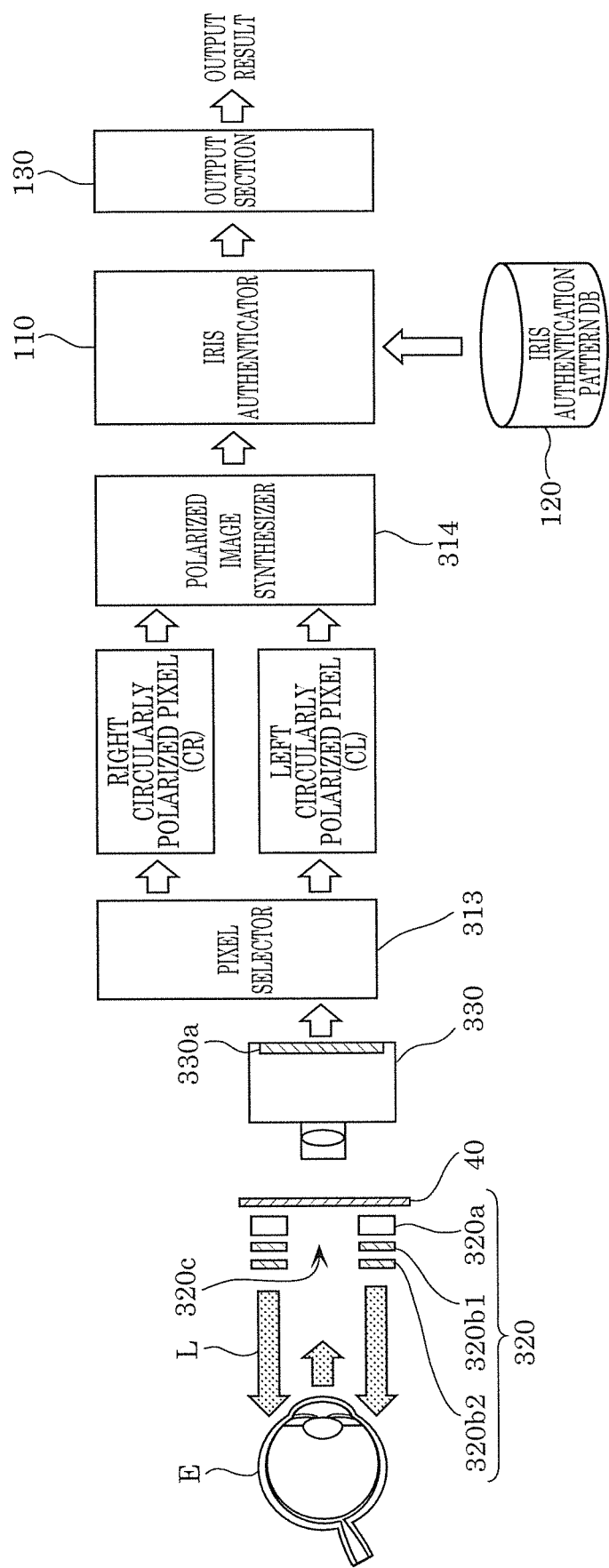
FIG. 22 is a schematic diagram showing an example of a flow of processing by components of the iris authentication system according to the third embodiment.

FIG. 21 is a block diagram showing an example of a functional configuration of iris authentication system 3 in the third embodiment. FIG. 22 is a schematic diagram showing an example of a flow of processing by components of iris authentication system 3 according to the third embodiment. As shown in FIGS. 21 and 22, iris authentication system 3 includes image synthesizing apparatus 3100 and iris authenticator 110, iris authentication pattern DB 120, and output section 130 same as those in the first embodiment. Image synthesizing apparatus 3100 includes processor 310, illuminating device 320, and camera 330. Processor 310 includes storage 12, pixel selector 313, and polarized image synthesizer 314. Image synthesizing apparatus 3100 includes band-pass filter 40 between illuminating device 320 and camera 330. However, band-pass filter 40 is not essential.

Figure 23A:
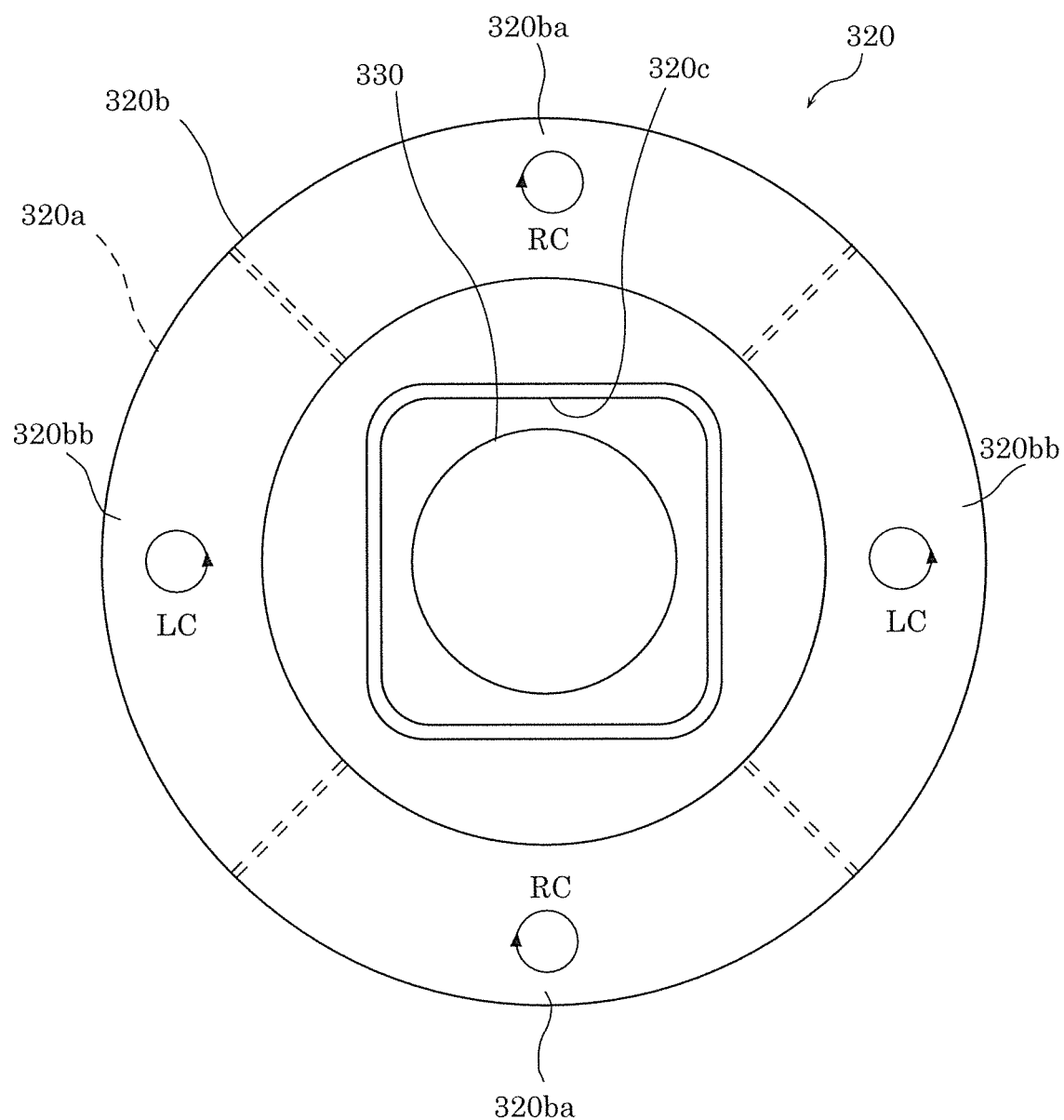
FIG. 23A is a schematic front view of an illuminating device according to the third embodiment.
Figure 23B:
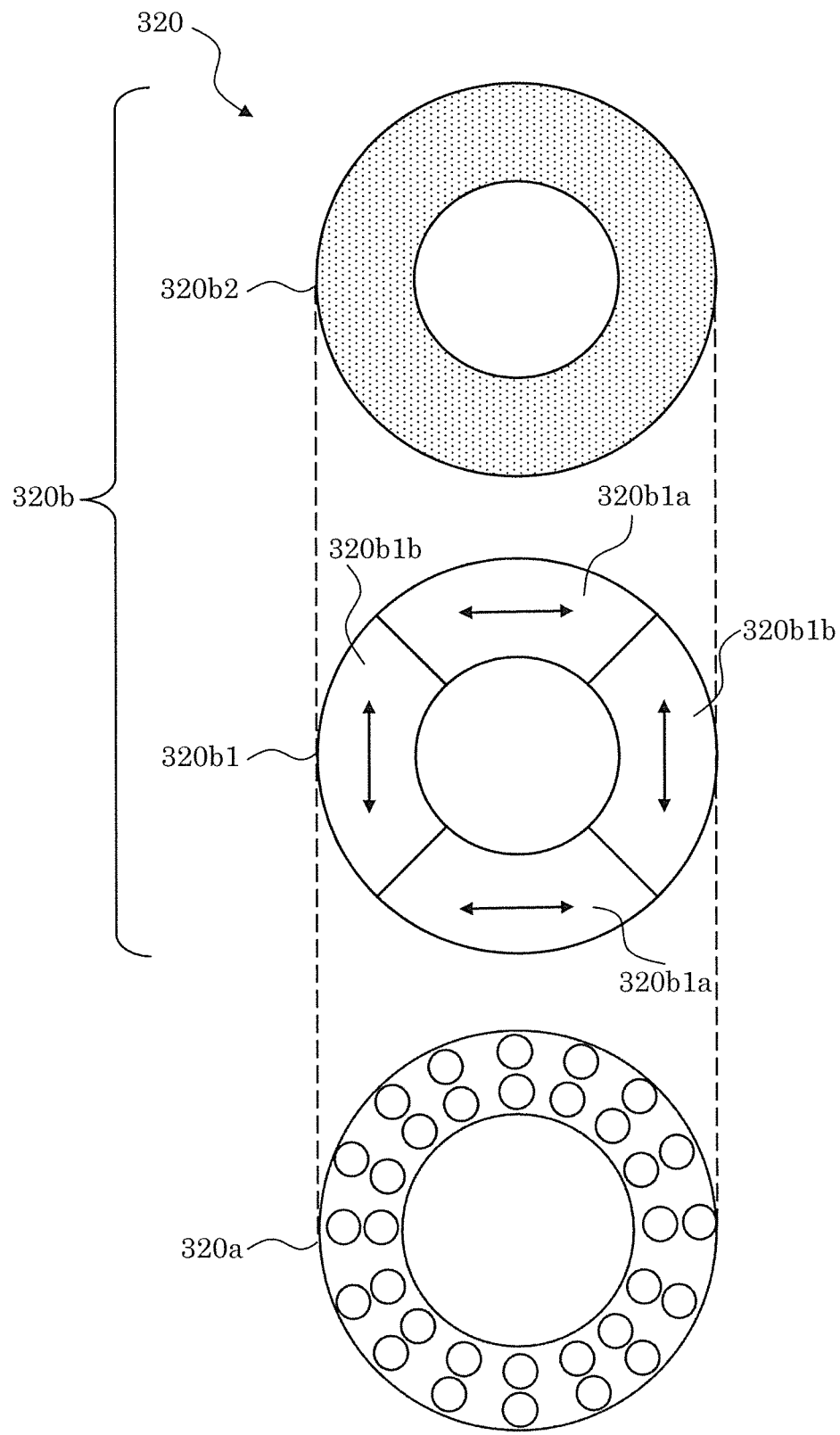
FIG. 23B is a schematic exploded view of the illuminating device shown in FIG. 23A.

As shown in FIGS. 22 to 23B, illuminating device 320 includes illuminator 320a and polarizer 320b. FIG. 23A is a schematic front view of illuminating device 320 according to the third embodiment. FIG. 23B is a schematic exploded view of illuminating device 320 shown in FIG. 23A. Illuminator 320a has the same configuration as the configuration of light emitter 220ab in the second embodiment. Polarizer 320b includes linear polarizing filter 320b1 same as that of polarizer 220b in the second embodiment and quarter wavelength plate 320b2 (referred to as λ/4 plate 320b2 "as well"). λ/4 plate 320b2 is an element that sets a phase difference of λ/4, that is, 90° in orthogonal two polarization components in incident light and changes a state of incident polarized light. Linear polarizing filter 320b1 is configured by two first linear polarizing filters 320b1a having polarization transmission axes having an azimuth angle 0° and two second linear polarizing filters 320b1b having polarization transmission axes having an azimuth angle 90°. Illuminator 320a, linear polarizing filter 320b1, and λ/4 plate 320b2 are disposed in this order along an emitting direction of illumination light.

First linear polarizing filters 320b1a and λ/4 plate 320b2 covert illumination light from illuminator 320a into right circularly polarized light RC. Second linear polarizing filters 320b1b and λ/4 plate 320b2 converts the illumination light from illuminator 320a into left circularly polarized light LC. Therefore, as shown in FIG. 23A, in positions corresponding to two first linear polarizing filters 320b1a, polarizer 320b includes two first polarizing filters 320ba, which are filters that have polarization transmission axes in a right rotating direction and form right circularly polarized light RC. In positions corresponding to two second linear polarizing filters 320b1b, polarizer 320b includes two second polarizing filters 320bb, which are filters that have polarization transmission axes in a left rotating direction and form left circularly polarized light LC. First polarizing filters 320ba and second polarizing filters 320bb are alternately disposed in the circumferential direction of ring-shaped polarizer 320b. The number of first polarizing filters 320ba and second polarizing filters 320bb may be any number equal to or larger than one. Disposition of first polarizing filters 320ba and second polarizing filters 320bb may be any disposition.

Illuminating device 320 explained above can also be realized by disposing λ/4 plate 320b2 between illuminating device 220 and the authentication target person, who is an object, in illuminating device 220 in the second embodiment.

Like illuminating device 220 in the second embodiment, illuminating device 320 configures a ring light of one channel. Such illuminating device 320 simultaneously emits left circularly polarized light LC and right circularly polarized light RC in opposite directions each other and irradiates, on eyeball E of the authentication target person, illumination light L obtained by mixing left circularly polarized light LC and right circularly polarized light RC. Return light reflected in cornea and iris portions of eyeball E passes through opening 320c in the center of illuminating device 320, further passes through band-pass filter 40, and is made incident on camera 330.

Figure 24A:
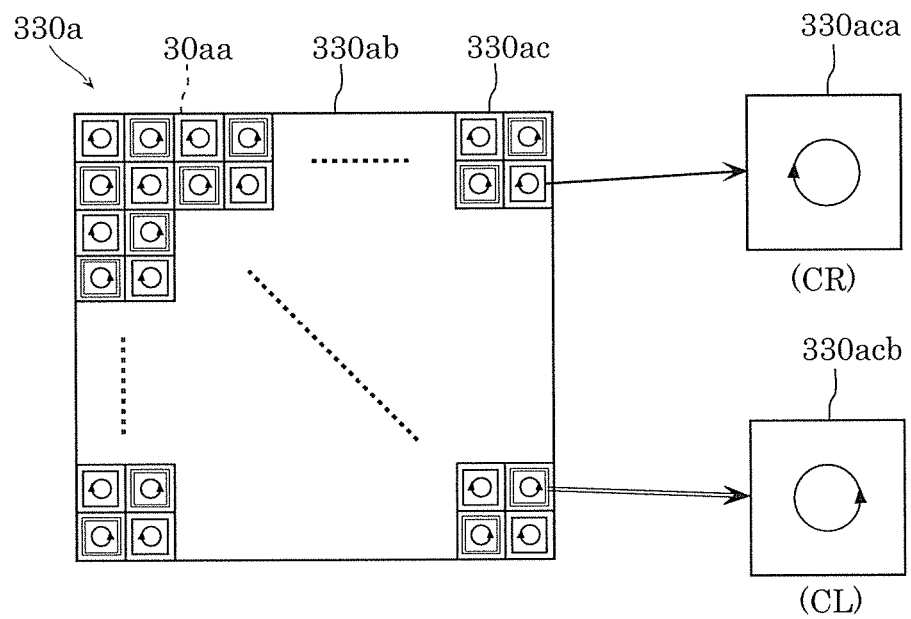
FIG. 24A is a plan view schematically showing the configuration of a polarization imaging element of a camera according to the third embodiment.
Figure 24B:
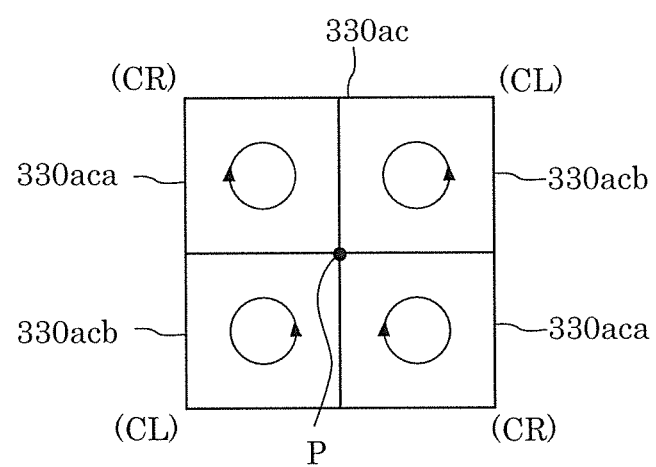
FIG. 24B is a plan view showing one unit of a group of polarizing filters in a mosaic polarizing filter shown in FIG. 24A.

As shown in FIG. 22, camera 330 includes polarization imaging element 330a. Further, as shown in FIGS. 24A and 24B, as in the first embodiment, polarization imaging element 330a includes imaging element 30aa and mosaic polarizing filter 330ab. In mosaic polarizing filter 330ab, a plurality of polarizing filter groups 330ac are arrayed in a lattice shape. FIG. 24A is a plan view schematically showing the configuration of polarization imaging element 330a of camera 330 according to the third embodiment. FIG. 24B is a plan view showing one unit of groups 330ac of polarizing filters in mosaic polarizing filter 330ab shown in FIG. 24A.

Each polarizing filter group 330ac includes two right circular polarizing filter 330aca and two left circular polarizing filters 330acb. An example of right circular polarizing filters 330aca and left circular polarizing filter 330acb is a circularly polarizing plate or a circularly polarizing film. Right circular polarizing filters 330aca and left circular polarizing filters 330acb are alternately disposed in a rotating direction centering on point P. Right circular polarizing filters 330aca have polarization transmission axes in a right rotating direction and are formed by, for example, laminating linear polarizing filters having polarization transmission axes having an azimuth angle 0° and λ/4 plates. Left circular polarizing filters 330acb have polarization transmission axes in a left rotating direction and are formed by, for example, laminating linear polarizing filters having polarization transmission axes having an azimuth angle 90° and λ/4 plates.

A light receiving element of such polarization imaging element 330a forms a micro polarized pixel having a polarization transmission axis in a rotating direction of right circularly polarized light and a micro polarized pixel having a polarization transmission axis in a rotating direction of left circularly polarized light. Camera 330 can acquire, with one imaging, one captured image including polarized pixels in right and left polarization directions. That is, camera 330 can simultaneously acquire polarized images in different polarization directions from substantially the same visual point.

Figure 25:
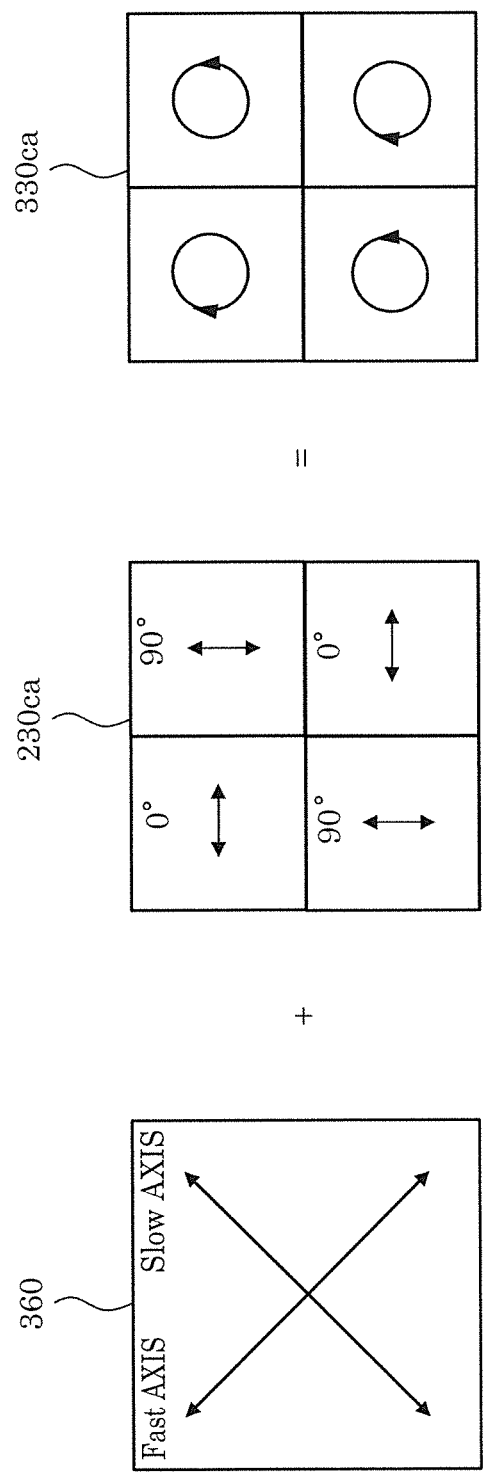
FIG. 25 is a diagram schematically showing a configuration in a modification of the polarization imaging element according to the third embodiment.

Camera 330 explained above can also be realized by disposing a λ/4 plate to cover objective lens 230b of camera 230 between camera 230 and illuminating device 220 in camera 230 in the second embodiment. For example, as shown in FIG. 25, a mosaic pattern formed by light receiving elements of right and left circularly polarized lights corresponding to polarizing filter groups 330ac of polarization imaging element 330a can be realized without necessity of adding improvement to polarization imaging element 230a in the second embodiment. FIG. 25 is a diagram schematically showing a configuration of a modification of the polarization imaging element according to the third embodiment. Specifically, a mosaic pattern corresponding to polarizing filter groups 330ac can be realized by disposing λ/4 plate 360 between polarization imaging element 230a and the object in the light receiving element of polarizing filter groups 230ac of polarization imaging element 230a including linearly polarized lights of 0° and 90°. At this time, λ/4 plate 360 is disposed such that an F axis (Fast axis) and an S axis (Slow axis) of λ/4 plate 360 form an angle of 45° with respect to the polarization transmission axis of 0° of polarizing filter groups 230ac.

Pixel selector 313 of processor 310 re-accumulates, in a captured image, polarized pixels CR acquired by light receiving elements corresponding to right circular polarizing filters 330aca to thereby generate a polarized image formed by polarized pixels CR. Pixel selector 313 re-accumulates, in the captured image, polarized pixels CL acquired by light receiving elements corresponding to left circular polarizing filters 330acb to thereby generate a polarized image formed by polarized pixels CL. That is, accumulation processing of polarized pixels, polarization directions of which are the same rotating direction, is performed and two polarized images are generated from one captured image.

Figure 26:
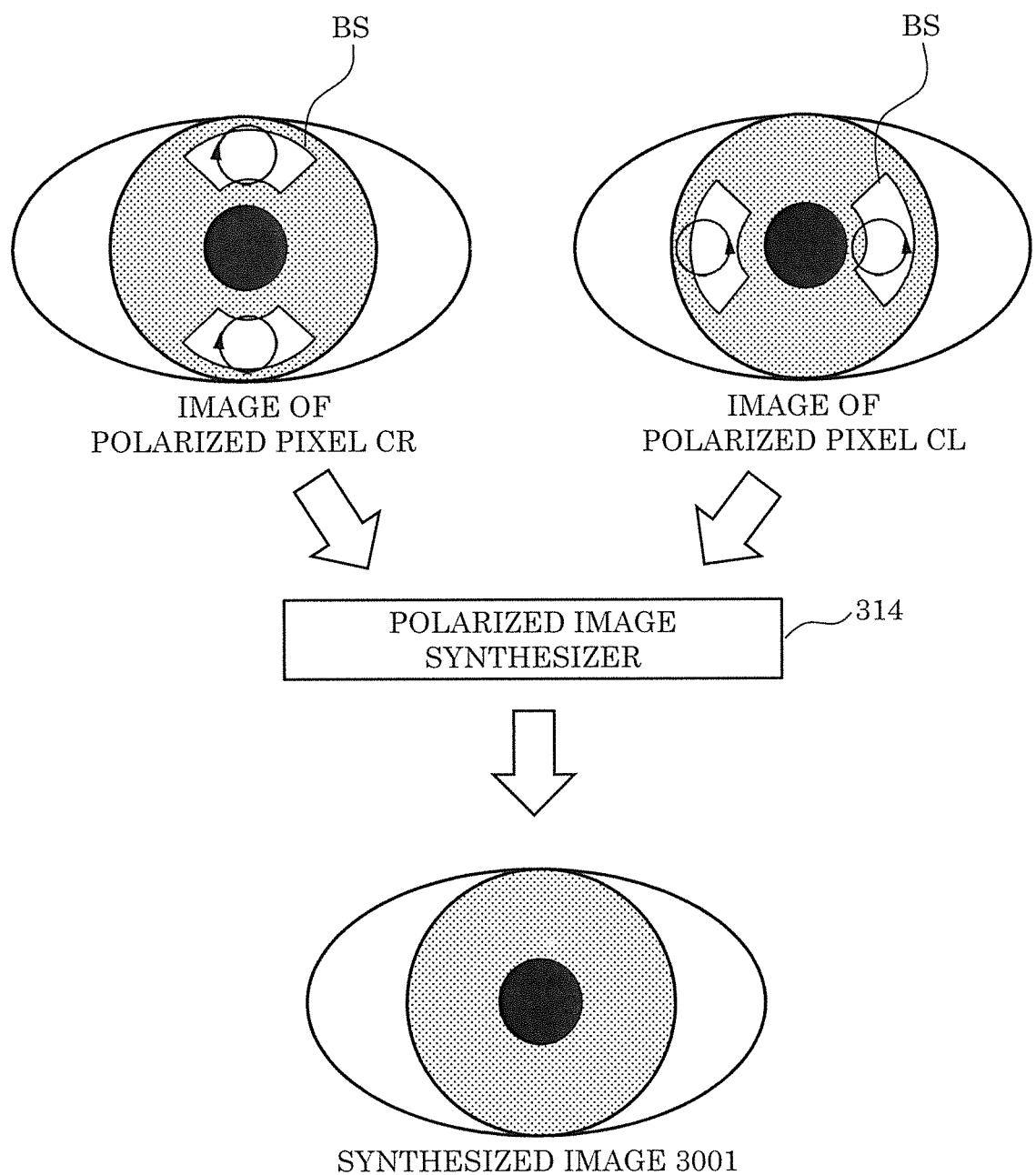
FIG. 26 is a schematic diagram showing an example of processing of a polarized image synthesizer for removing a bright spot of specular reflection.

Polarized image synthesizer 314 of processor 310 combines the polarized image formed by polarized pixels CR and the polarized image formed by polarized pixels CL to generate a new synthesized image. As shown in FIG. 26, polarized image synthesizer 314 performs synthesis processing to thereby remove an image of specular reflection on the cornea or the eyeglasses from an image. FIG. 26 is a schematic diagram showing an example of processing of polarized image synthesizer 314 for removing a bright spot of specular reflection. In polarized image CR generated by pixel selector 313, a specular reflection image of ring-like illumination light is projected on a cornea of an eyeball. However, from a characteristic of camera 330, bright spot BS of only a ring portion corresponding to right circularly polarized light RC emitted from first polarizing filter 320ba of polarizer 320b is observed. A bright spot of a ring portion corresponding to left circularly polarized light LC emitted from second polarizing filter 320bb is not observed.

Similarly, in polarized image CL generated by pixel selector 313, bright spot BS of only a ring portion corresponding to left circularly polarized light LC emitted from second polarizing filter 320bb is observed on the cornea of the eyeball. A bright spot of a ring portion corresponding to right circularly polarized light RC emitted from first polarizing filter 320ba is not observed.

Further, in a region of an iris present behind the cornea, the right circularly polarized light and the left circularly polarized light emitted from illuminating device 320 are added to each other to be nonpolarized light and made incident on the eyeball. Therefore, in the iris region, a black cross pattern due to birefringence is absent.

When acquiring two polarized images CR and CL generated from the same captured image, polarized image synthesizer 314 compares, through image processing, pixel values of pixels in substantially the same pixel positions on images between polarized images CR and CL and selects a pixel having a smaller pixel value (a darker pixel). Further, polarized image synthesizer 314 applies the pixel selected as explained above to the pixel positions to thereby synthesize new one image 3001. With such synthesized image 3001, it is possible to obtain an iris image with a bright spot due to specular reflection eliminated. This iris image is substantially equal to an iris image captured using normal nonpolarized illumination. Therefore, the personal authentication using the iris authentication processing in the past can be applied.

As explained above, image synthesizing apparatus 3100 according to the third embodiment simultaneously irradiates the two kinds of circularly polarized lights on the eyeball of the authentication target person and acquires a captured image captured by one shot. Further, image synthesizing apparatus 3100 acquires a plurality of polarized images from one captured image. While removing, from the plurality of polarized images, an image of specular reflection that occurs on the eyeglass and the cornea, image synthesizing apparatus 3100 simultaneously removes a pattern due to birefringence on the cornea and generates an iris image for which iris authentication is possible. Specifically, image synthesizing apparatus 3100 according to the third embodiment irradiates circularly polarized illumination and performs imaging. Therefore, a pattern due to birefringence in the cornea does not occur in a captured image. On the other hand, an image of regular reflection of illumination from the eyeglass and the cornea is captured in a state in which circular polarization is maintained. Therefore, the image can be removed by image synthesizing apparatus 3100. In this way, an effect that it is possible to carry out the iris pattern authentication in the past while removing the image of the regular reflection of the illumination from the eyeglass and the cornea of the eyeball can be achieved by the imaging of the one shot.

In image synthesizing apparatus 3100 according to the third embodiment, polarized image synthesizer 314 determines, as a pixel of a synthesized image, a pixel having a smaller pixel value (a darker pixel) of two pixels in substantially the same pixel positions on two polarized images. However, polarized image synthesizer 314 is not limited to this. As explained in the first embodiment, polarized image synthesizer 314 may determine a pixel value by weighting pixel values of two pixels or may determine an average of the pixel values of the two pixels as a pixel value.

Fourth Embodiment

Image synthesizing apparatus 4100 according to a fourth embodiment is explained. In the first and second embodiments, the illuminating device irradiates the linearly polarized lights in the two different polarization directions. However, in image synthesizing apparatus 4100 according to the fourth embodiment, illuminating device 420 irradiates linearly polarized lights in four different polarization directions. In the following explanation, differences from the first to third embodiments are mainly explained. Explanation of similarities to the first to third embodiments is omitted.

Figure 27:
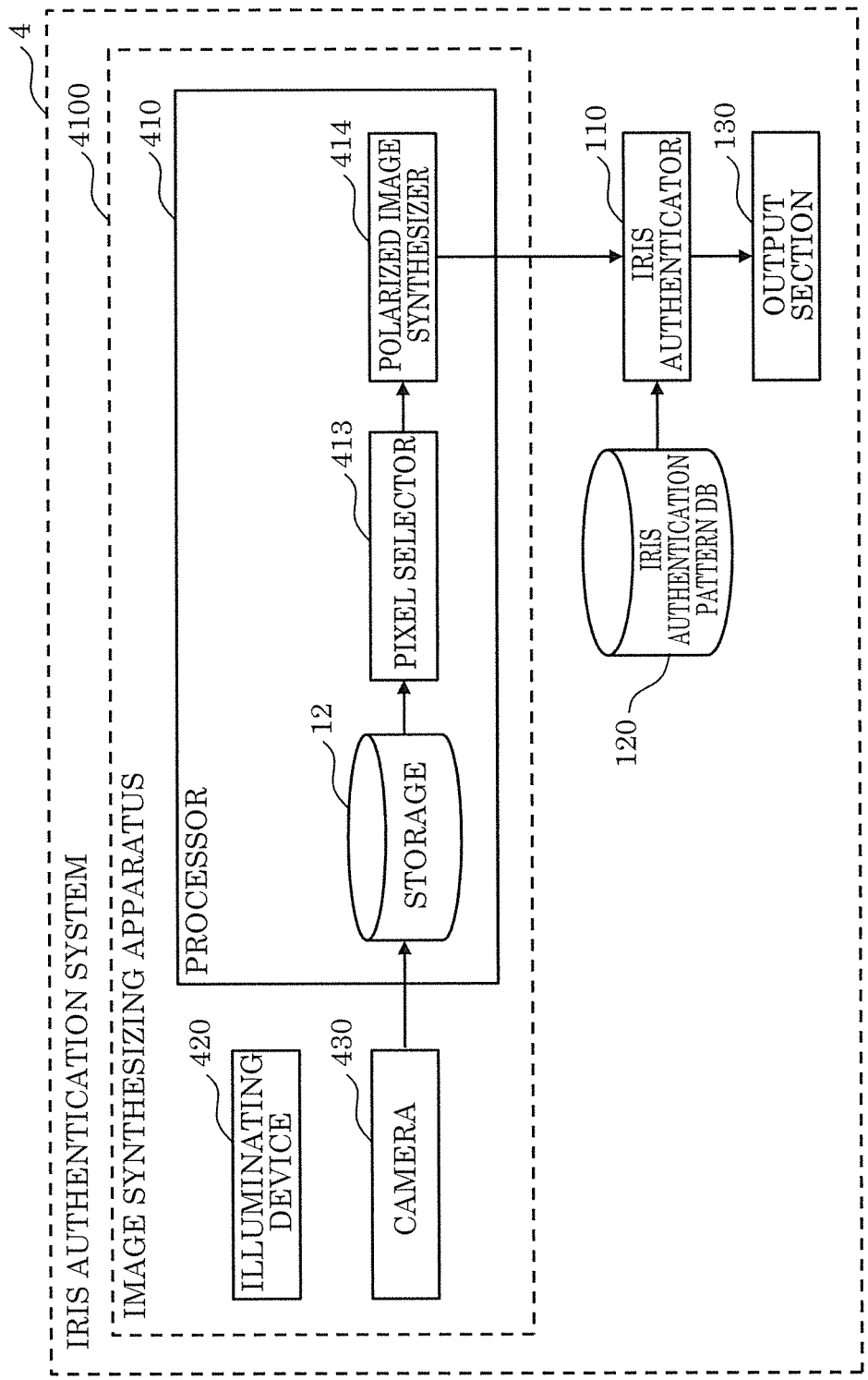
FIG. 27 is a block diagram showing an example of a functional configuration of an iris authentication system according to a fourth embodiment.
Figure 28:
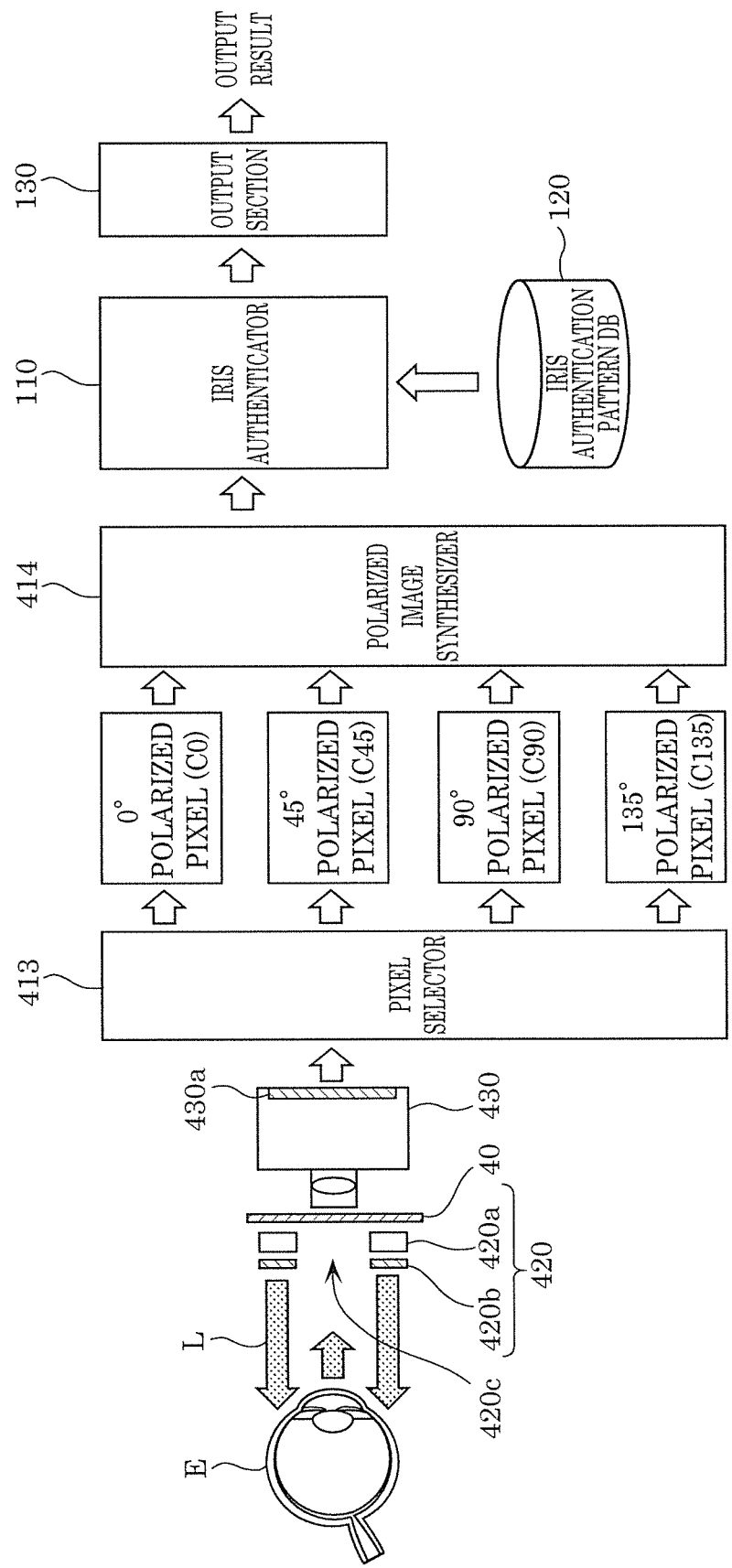
FIG. 28 is a schematic diagram showing an example of a flow of processing by components of the iris authentication system according to the fourth embodiment.

FIG. 27 is a block diagram showing an example of a functional configuration of iris authentication system 4 according to the fourth embodiment. FIG. 28 is a schematic diagram showing an example of a flow of processing by components of iris authentication system 4 according to the fourth embodiment. As shown in FIGS. 27 and 28, iris authentication system 4 includes image synthesizing apparatus 4100 and iris authenticator 110, iris authentication pattern DB 120, and output section 130 same as those in the first embodiment. Image synthesizing apparatus 4100 includes processor 410, illuminating device 420, and camera 430. Processor 410 includes storage 12, pixel selector 413, and polarized image synthesizer 414. Image synthesizing apparatus 4100 includes band-pass filter 40 as in the first embodiment. However, band-pass filter 40 is not essential.

Figure 29:
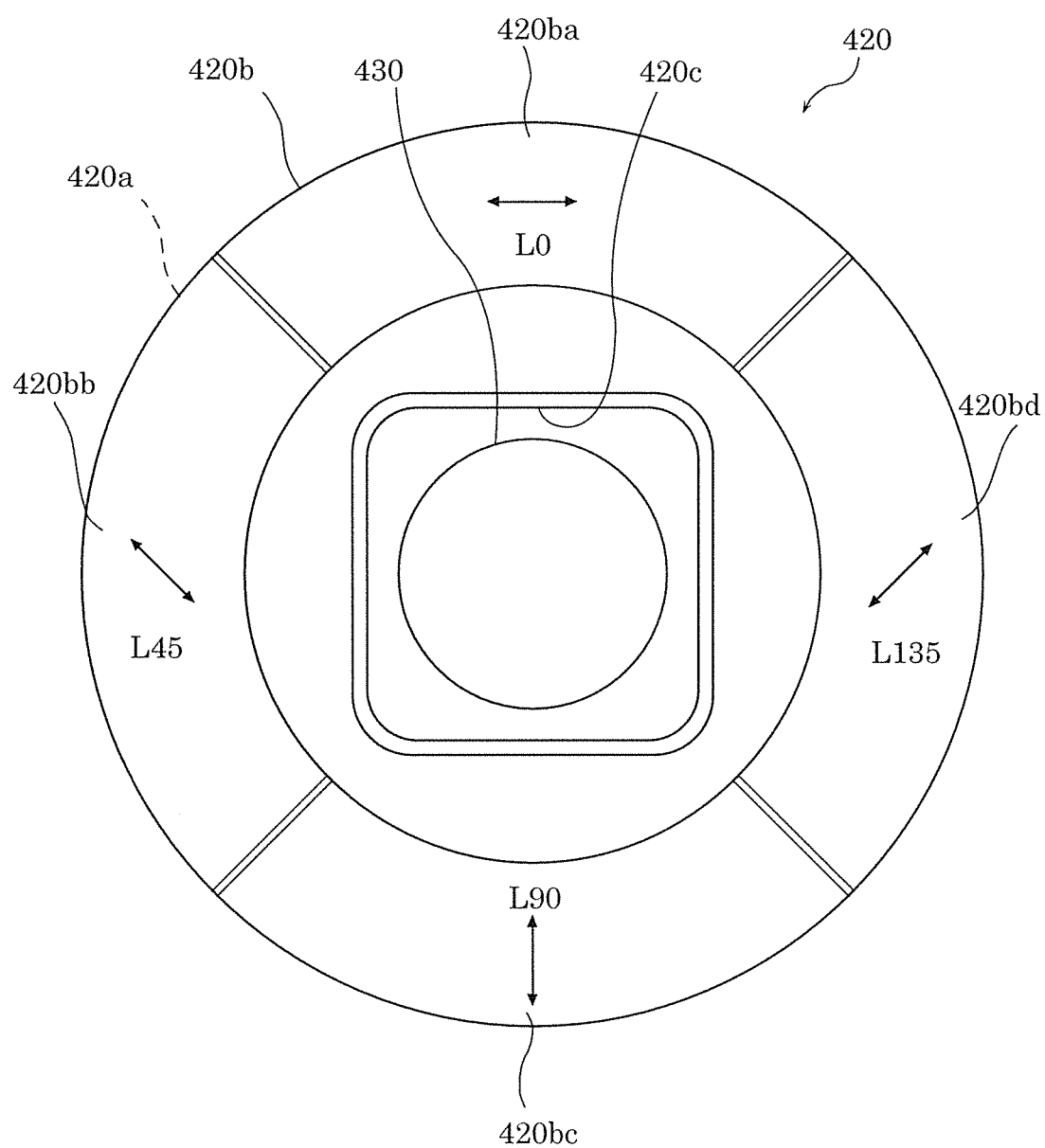
FIG. 29 is a schematic front view of an illuminating device according to the fourth embodiment.

As shown in FIGS. 28 and 29, illuminating device 420 includes illuminator 420a and polarizer 420b. FIG. 29 is a schematic front view of illuminating device 420 according to the fourth embodiment. Illuminator 420a has the same configuration as the configuration of light emitter 220ab of illuminating device 220 in the second embodiment. Illuminator 420a configures a ring light of one channel.

Polarizer 420b includes first polarizing filter 420ba, second polarizing filter 420bb, third polarizing filter 420bc, and fourth polarizing filter 420bd disposed in a ring shape around opening 420c. In this embodiment, first polarizing filter 420ba, second polarizing filter 420bb, third polarizing filter 420bc, and fourth polarizing filter 420bd are disposed side by side in this order along the circumference of opening 420c. First polarizing filter 420ba has a polarization transmission axis having an azimuth angle 0°. Second polarizing filter 420bb has a polarization transmission axis having an azimuth angle 45°. Third polarizing filter 420bc has a polarization transmission axis having an azimuth angle 90°. Fourth polarizing filter 420bd has a polarization transmission axis having an azimuth angle 135°. The number of polarizers may be any number equal to or larger than one. Disposition of the polarizers may be any disposition. An azimuth angle is defined by a camera coordinate system based on a camera. Therefore, when illuminating device 420 is viewed from the front, left and right directions of arrows of the azimuth angles 45° and 135° are reversed.

Illuminating device 420 explained above simultaneously emits linearly polarized lights in polarization directions 0°, 45°, 90°, and 135° and irradiates illumination light L obtained by mixing these linearly polarized lights on eyeball E of an authentication target person. Return light reflected in cornea and iris portions of eyeball E passes through opening 420c in the center of illuminating device 420, further passes through band-pass filter 40, and is made incident on camera 430.

Figure 30A:
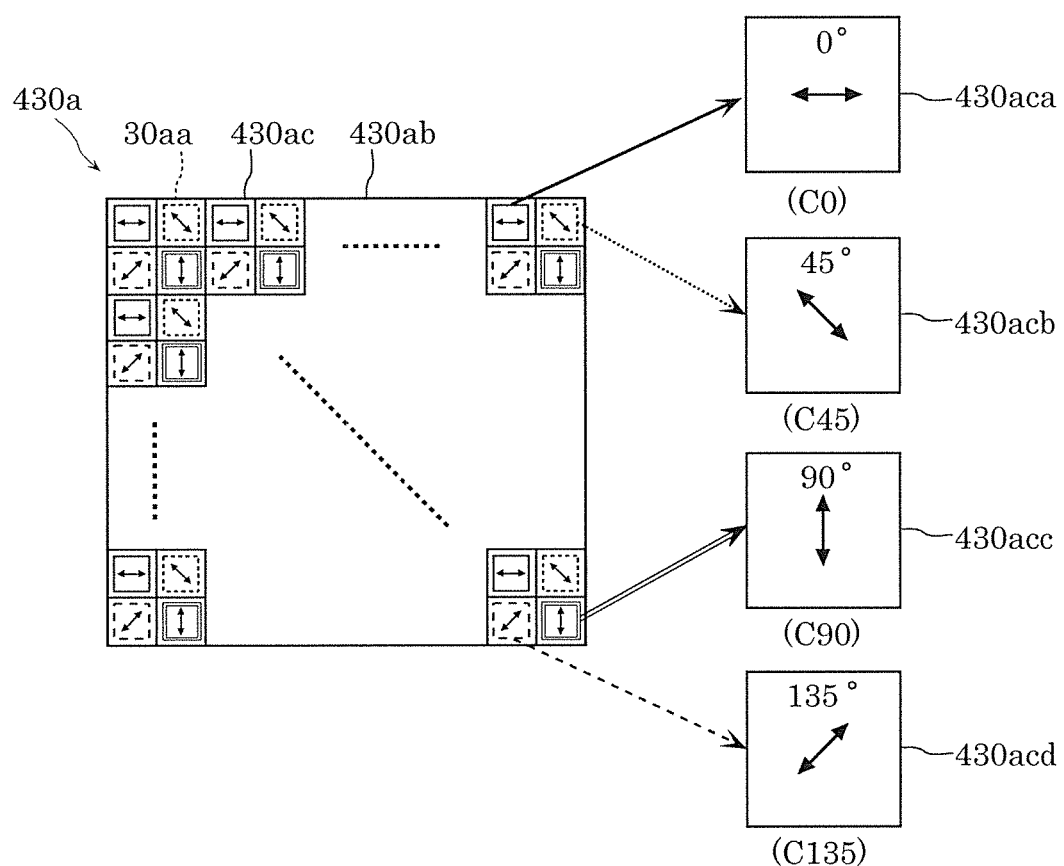
FIG. 30A is a plan view schematically showing the configuration of an imaging sensor of a camera according to the fourth embodiment.
Figure 30B:
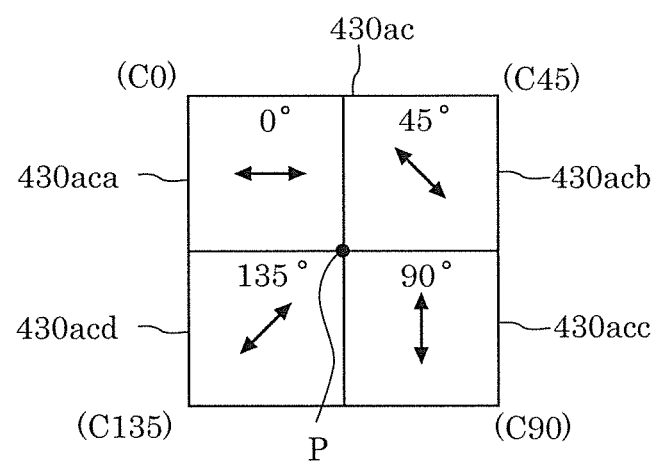
FIG. 30B is a plan view showing one unit of a group of polarizing filters in a mosaic polarizing filter shown in FIG. 30A.

As shown in FIG. 28, camera 430 includes polarization imaging element 430a. Further, as shown in FIGS. 30A and 30B, as in the first embodiment, polarization imaging element 430a includes imaging element 30aa and mosaic polarizing filter 430ab. In mosaic polarizing filter 430ab, a plurality of polarizing filter groups 430ac are arrayed in a lattice shape. FIG. 30A is a plan view schematically showing the configuration of polarization imaging element 430a of camera 430 according to the fourth embodiment. FIG. 30B is a plan view showing one unit of groups 430ac of polarizing filters in mosaic polarizing filter 430ab shown in FIG. 30A.

Each polarizing filter group 430ac includes first linear polarizing filters 430aca, second linear polarizing filters 430acb, third linear polarizing filters 430acc, and fourth linear polarizing filters 430acd. First linear polarizing filters 430aca, second linear polarizing filters 430acb, third linear polarizing filters 430acc, and fourth linear polarizing filters 430acd are disposed in this order in a right rotating direction centering on point P. First linear polarizing filter 430aca has a polarization transmission axis having an azimuth angle 0°. Second linear polarizing filter 430acb has a polarization transmission axis having an azimuth angle 45°. Third linear polarizing filter 430acc has a polarization transmission axis having an azimuth angle 90°. Fourth linear polarizing filter 430acd has a polarization transmission axis having an azimuth angle 135°.

A light receiving element of such polarization imaging element 430a forms micro polarized pixels having polarization transmission axes having the respective azimuth angles 0°, 45°, 90°, and 135°. Camera 430 can acquire one captured image including polarized pixels C0, C45, C90, and C135 in four polarization directions of 0°, 45°, 90°, and 135° different from one another by 45°. That is, camera 430 can simultaneously acquire polarized images in different polarization directions from substantially the same visual point.

Pixel selector 413 of processor 410 re-accumulates, in a captured image, polarized pixels C0 acquired by light receiving elements corresponding to first linear polarizing filters 430aca to thereby generate a polarized image formed by polarized pixels C0. Pixel selector 413 re-accumulates, in the captured image, polarized pixels C45 acquired by light receiving elements corresponding to second linear polarizing filters 430acb to thereby generate a polarized image formed by polarized pixels C45. Pixel selector 413 re-accumulates, in the captured image, polarized pixels C90 acquired by light receiving elements corresponding to third linear polarizing filters 430acc to thereby generate a polarized image formed by polarized pixels C90. Pixel selector 413 re-accumulates, in the captured image, polarized pixels C135 acquired by light receiving elements corresponding to fourth linear polarizing filters 430acd to thereby generate a polarized image formed by polarized pixels C135.

Polarized image synthesizer 414 of processor 410 combines the polarized image formed by polarized pixels C0, the polarized image formed by polarized pixels C45, the polarized image formed by polarized pixels C90, and the polarized image formed by polarized pixels C135 to generate a new synthesized image. As shown in FIG. 31, polarized image synthesizer 414 performs synthesis processing to thereby remove an image of specular reflection on the cornea or the eyeglasses from an image. FIG. 31 is a schematic diagram showing an example of processing of polarized image synthesizer 414 for removing a bright spot of specular reflection.

In polarized image C0 generated by pixel selector 213, a specular reflection image of ring-like illumination light is projected on the cornea of eyeball E. However, from a characteristic of camera 430, a ring portion corresponding to linearly polarized light L0 emitted from first polarizing filter 420ba in the polarization direction 0° of polarizer 420b is observed as extremely strong bright spot BSs. Ring portions corresponding to linearly polarized lights L45 and L135 respectively emitted from second linear polarizing filters 430acb and fourth linear polarizing filters 430acd are observed as weak bright spots BSw. A ring portion corresponding to linearly polarized light L90 emitted from third linear polarizing filters 430acc is not observed.

Similarly, in polarized image C45, a ring portion corresponding to linearly polarized light L45 is observed as extremely strong bright spot BSs on the cornea of eyeball E. Ring portions corresponding to linearly polarized lights L0 and L90 are observed as weak bright spots BSw. A ring portion corresponding to linearly polarized light L135 is not observed.

Similarly, in polarized image C90, a ring portion corresponding to linearly polarized light L90 is observed as extremely strong bright spot BSs on the cornea of eyeball E. Ring portions corresponding to linearly polarized lights L45 and L135 are observed as weak bright spots BSw. A ring portion corresponding to linearly polarized light L0 is not observed.

Similarly, in polarized image C135, a ring portion corresponding to linearly polarized light L135 is observed as extremely strong bright spot BSs on the cornea of eyeball E. Ring portions corresponding to linearly polarized lights L0 and L90 are observed as weak bright spots BSw. A ring portion corresponding to linearly polarized light L45 is not observed.

Linearly polarized lights L0, L45, L90, and L135 in the four polarization directions of 0°, 45°, 90°, and 135° at equal intervals of 45° are made incident on an iris region behind the cornea and the eyeglass. However, linearly polarized lights L0, L45, L90, and L135 form nonpolarized light by adding up one another and are made incident on the iris region as nonpolarized light. Therefore, a black cross pattern due to birefringence is absent in an image of the iris region.

Therefore, when acquiring four polarized images C0, C45, C90, and C135 generated from the same captured image, polarized image synthesizer 414 compares, through image processing, pixel values of pixels in substantially the same pixel positions on images among four polarized images C0, C45, C90, and C135 and selects a pixel having a smallest pixel value (a darkest pixel). Further, polarized image synthesizer 414 applies the pixel selected as explained above to the pixel positions to thereby synthesize new one image 4001. With such synthesized image 4001, it is possible to obtain an iris image with a bright spot due to specular reflection eliminated. This iris image is substantially equal to an iris image captured by normal nonpolarized illumination. Therefore, the personal authentication using the iris authentication processing in the past can be applied.

As explained above, image synthesizing apparatus 4100 according to the fourth embodiment simultaneously irradiates the four kinds of linearly polarized lights on the eyeball of the authentication target person and acquires a captured image captured by one shot. Further, image synthesizing apparatus 4100 acquires a plurality of polarized images from one captured image. While removing, from the plurality of polarized images, an image of specular reflection that occurs on the eyeglass and the cornea, image synthesizing apparatus 4100 simultaneously removes a pattern due to birefringence on the cornea and generates an iris image for which iris authentication is possible. In this embodiment, the number of polarized images generated from the same captured image is larger than the number in the second embodiment. Polarization directions in the polarized images are different. When the number of polarized images to be combined increases in this way, a possibility of appearance of an image of specular reflection of the cornea in the same position in all the polarized images decreases. Accordingly, a pixel having a smallest pixel value (a darkest pixel) among pixels in substantially the same pixel positions on all the polarized images can accurately reflect the iris.

In image synthesizing apparatus 4100 according to the fourth embodiment, polarized image synthesizer 414 determines, as the pixels of the synthesized image, the pixel having the smallest pixel value (the darkest pixel) among the four pixels in substantially the same pixel positions on the four polarized images. However, polarized image synthesizer 414 is not limited to this. As explained in the first embodiment, polarized image synthesizer 414 may determine a pixel value by weighting the pixel values of the four pixels or may determine an average of the pixel values of the four pixels as a pixel value.

In image synthesizing apparatus 4100 according to the fourth embodiment, the linearly polarized lights in the four different polarization directions are irradiated by illuminating device 420. Polarization imaging element 430a of camera 430 generates the image including the polarized pixels in the four different polarization directions. However, illuminating device 420 and polarization imaging element 430a are not limited to this. Illuminating device 420 only has to irradiate linearly polarized lights in at least three different polarization directions. Polarization imaging element 430a only has to generate an image including polarized pixels in at least three different polarization directions. The number of polarization directions of linearly polarized lights and the number of polarization directions of polarized pixels are desirably the same.

[Others]

The image synthesizing apparatuses and the like according to the one or the plurality of forms are explained above on the basis of the embodiments and the modifications. However, the present disclosure is not limited to these embodiments and modifications. Forms obtained by applying various modifications conceived by those skilled in the art and forms constructed by combining the components in the different embodiments and modifications may be included in the scope of the one or the plurality of forms without departing from the gist of the present disclosure.

For example, in the first to fourth embodiments, all the illuminating devices are explained as having the ring shape. However, the illuminating device does not always need to have a ring-like configuration. The illuminating device only has to be capable of emitting at least two polarized lights having different polarization directions simultaneously or one by one. For example, the illuminating device may be configured by two different kinds of illuminating devices disposed in angle positions asymmetrically shifted from the optical axis of the camera. The two kinds of illuminating devices may sequentially or simultaneously irradiate the eyeball of the authentication target person.

In the second embodiment, illuminating device 220 includes diffusing plate 220aa between light emitter 220ab of illuminator 220a and polarizer 220b. However, diffusing plate 220aa may be disposed in the illuminating devices in the first, third, and fourth embodiments as in the second embodiment.

For example, in the casual iris authentication, the authentication target person is imaged in a state in which a fixed distance from the authentication target person is maintained. When ring light is used, if the optical axis of illumination light and the optical axis of the camera coincide, reflected light from the retina surface returns on an optical path of incident light. Consequently, a so-called "red eye" phenomenon occurs. The pupil does not become black and is imaged brightly at luminance higher than luminance of the iris. In order to prevent this phenomenon, it is effective to shift the optical axis of the illumination light from the optical axis of the camera by a small angle. In this case, the illumination light is not made incident on the cornea from the front of the cornea and an angle of incidence of the illumination light on a transparent medium on a cornea curved surface changes. Therefore, a black cross pattern shape due to birefringence slightly changes. However, there is no problem in implementation of the processing of the image synthesizing apparatus.

In the fourth embodiment, illuminating device 420 emits the linearly polarized lights in the four different polarization directions. Polarization imaging element 430a of camera 430 acquires an image via the four linear polarizing filters 430aca, 430acb, 430acc, and 430acd having the polarization transmission axes in the different directions. However, illuminating device 420 and polarization imaging element 430a are not limited to this. The illuminating device only has to emit at least three linearly polarized lights in different polarization directions. The polarization imaging element only has to acquire an image via at least three linear polarizing filters, directions of polarization transmission axes of which are different.

In the embodiments and the modifications, the azimuth angle of the polarization transmission axis of the illuminating device is set in units of 45°. The azimuth angle of the polarization transmission axis of the polarizing filter is set in units of 45°. However, the azimuth angles are not limited to this. The azimuth angles of the respective polarization transmission axes may be set to angles in any units. An azimuth angle of a polarization transmission axis of an existing polarizing plate is set in units of 45°. Therefore, when the azimuth angle of the polarization transmission axis is set in units of 45°, the existing polarizing plate can be directly used. Accordingly, it is possible to reduce cost.

As explained above, the technique of the present disclosure may be realized as a system, an apparatus, a method, an integrated circuit, a computer program, or a computer-readable recording medium such as a recording disk or may be realized as any combination of the system, the apparatus, the method, the integrated circuit, the computer program, and the recording medium. The computer-readable recording medium includes a nonvolatile recording medium such as a CD-ROM.

For example, the processors included in the image synthesizing apparatuses and the like according to the embodiments and the modifications are typically realized as an LSI (Large Scale Integration), which is an integrated circuit. The processors may be individually formed as one chip or may be formed as one chip including a part or all of the processors.

Circuit integration is not limited to the LSI and may be realized as a dedicated circuit or a general-purpose processor. An FPGA (Field Programmable Gate Array) that can be programmed after LSI manufacturing or a configurable processor capable reconfiguring connection and setting of circuit cells inside the LSI may be used.

In the embodiments and the modifications, the components may be configured by dedicated hardware or may be realized by executing software programs suitable for the components. The components may be realized by a program executer such as a processor such as a CPU reading out and executing software programs recorded in a recording medium such as a hard disk or a semiconductor memory.

A part or all of the components may be configured from a detachable IC (Integrated Circuit) card or a stand-alone module. The IC card or the module is a computer system configured from a microprocessor, a ROM, a RAM, and the like. The IC card or the module may include the LSI or a system LSI. The microprocessor operates according to a computer program, whereby the IC card or the module achieves functions of the IC card or the module. The IC card and the module may have tamper resistance.

The image synthesizing method and the like of the present disclosure may be realized by a processor such as an MPU (Micro Processing Unit) and a CPU, a circuit such as an LSI, an IC card, a stand-alone module, or the like.

Further, the technique of the present disclosure may be realized by a software program or a digital signal formed by the software program or may be a non-transitory computer-readable recording medium in which computer programs are recorded. It goes without saying that the computer programs can be distributed via a transmission medium such as the Internet.

All of the numbers such as ordinal numbers and quantities used in the above explanation are illustrated to specifically explain the technique of the present disclosure. The present disclosure is not limited to the illustrated numbers. The connection relations among the components are illustrated to specifically explain the technique of the present disclosure. Connection relations for realizing the functions of the present disclosure are not limited to this.

The divisions of the functional blocks in the block diagrams are an example. A plurality of functional blocks may be realized as one functional block, one functional block may be divided into a plurality of functional blocks, or a part of the functions may be transferred to other functional blocks. Single hardware or software may process, in parallel or in a time division manner, functions of a plurality of functional blocks having similar functions.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The technique of the present disclosure can be widely applied to techniques for generating an image of an iris useful for iris authentication from images including the iris. For example, the technique of the present disclosure can be widely used in iris authentication techniques in fields such as driver monitoring in a vehicle-mounted camera and individual specification in a signage or a monitoring camera where cooperation of an authentication target person is not easily obtained during imaging.

What is claimed is:

1. An image synthesizing apparatus, comprising:
an illuminating device that simultaneously outputs first linearly polarized light having a first polarization direction, second linearly polarized light having a second polarization direction, third linearly polarized light having a third polarization direction, and fourth linearly polarized light having a fourth polarization direction;
a camera that captures a first image in the first polarization direction including a plurality of pixels, a second image in the second polarization direction including a plurality of pixels, a third image in the third polarization direction including a plurality of pixels, and a fourth image in the fourth polarization direction including a plurality of pixels; and
a control circuit that synthesizes, on a pixel-by-pixel basis, the first image, the second image, the third image, and the fourth image into an authentication image for iris authentication, wherein
the first polarization direction, the second polarization direction, the third polarization direction, and the fourth polarization direction are different from one another by 45 degrees, and
the camera acquires the first image, the second image, the third image, and the fourth image respectively using the first linearly polarized light, the second linearly polarized light, the third linearly polarized light, and the fourth linearly polarized light.

2. The image synthesizing apparatus according to claim 1, wherein
the illuminating device includes:
at least one light source;
a first polarizing plate having the first polarization direction and located in front of the light source;
a second polarizing plate having the second polarization direction and located in front of the light source;
a third polarizing plate having the third polarization direction and located in front of the light source; and
a fourth polarizing plate having the fourth polarization direction and located in front of the light source,
the light source outputs linearly polarized light having the first polarization direction via the first polarizing plate,
the light source outputs linearly polarized light having the second polarization direction via the second polarizing plate,
the light source outputs linearly polarized light having the third polarization direction via the third polarizing plate, and
the light source outputs linearly polarized light having the fourth polarization direction via the fourth polarizing plate.

3. The image synthesizing apparatus according to claim 1, wherein,
in the synthesizing of the authentication image, the control circuit compares pixel values of pixels corresponding to one another among the first image, the second image, the third image, and the fourth image and determines a smallest pixel value among the pixel values of the corresponding pixels as a pixel value of a corresponding pixel in the authentication image.

4. The image synthesizing apparatus according to claim 1, wherein,
in the synthesizing of the authentication image, the control circuit compares pixel values of pixels corresponding to one another among the first image, the second image, the third image, and the fourth image and determines an average of the pixel values of the corresponding pixels as a pixel value of a corresponding pixel in the authentication image.

5. An image synthesizing method, comprising:
simultaneously outputting first linearly polarized light having a first polarization direction, second linearly polarized light having a second polarization direction, third linearly polarized light having a third polarization direction, and fourth linearly polarized light having a fourth polarization direction;
capturing an image when the first linearly polarized light, the second linearly polarized light, the third linearly polarized light, and the fourth linearly polarized light are output;
acquiring, from the image, a first image in the first polarization direction including a plurality of pixels, a second image in the second polarization direction including a plurality of pixels, a third image in the third polarization direction including a plurality of pixels, and an fourth image in the fourth polarization direction including a plurality of pixels;
synthesizing, on a pixel-by-pixel basis, the first image, the second image, the third image, and the fourth image into an authentication image for iris authentication, wherein the first polarization direction, the second polarization direction, the third polarization direction, the fourth polarization direction are different from each other by 45 degrees, and
at least one of the simultaneously outputting, the capturing, the acquiring, and synthesizing is executed by at least one control circuit.

6. The image synthesizing method according to claim 5, wherein,
in the synthesizing of the authentication image, pixel values of pixels corresponding to one another are compared among the first image, the second image, the third image, and the fourth image, and a smallest pixel value among the pixel values of the corresponding pixels is determined as a pixel value of a corresponding pixel in the authentication image.

7. The image synthesizing method according to claim 5, wherein,
in the synthesizing of the authentication image, pixel values of pixels corresponding to one another are compared among the first image, the second image, the third image, and the fourth image, and an average of the pixel values of the corresponding pixels is determined as a pixel value of a corresponding pixel in the authentication image.

* * * * *